(12) United States Patent
Barsoum et al.

(10) Patent No.: US 11,866,339 B2
(45) Date of Patent: *Jan. 9, 2024

(54) ANODES CRUMPLED MXENE COMPOSITIONS, COMPOSITES, AND DEVICES

(71) Applicant: Drexel University, Philadelphia, PA (US)

(72) Inventors: Michel W Barsoum, Moorestown, NJ (US); Di Zhao, Beijing (CN); Varun Natu, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/063,093

(22) Filed: Dec. 8, 2022

(65) Prior Publication Data

US 2023/0132034 A1    Apr. 27, 2023

Related U.S. Application Data

(63) Continuation of application No. 16/954,786, filed as application No. PCT/US2018/065992 on Dec. 17, 2018, now Pat. No. 11,554,961.

(60) Provisional application No. 62/609,436, filed on Dec. 22, 2017.

(51) Int. Cl.
| | |
|---|---|
| *C01B 32/921* | (2017.01) |
| *B03D 3/06* | (2006.01) |
| *B82Y 30/00* | (2011.01) |
| *B82Y 40/00* | (2011.01) |

(52) U.S. Cl.
CPC .............. *C01B 32/921* (2017.08); *B03D 3/06* (2013.01); *B82Y 30/00* (2013.01); *B82Y 40/00* (2013.01); *C01P 2004/20* (2013.01); *C01P 2004/45* (2013.01); *C01P 2006/16* (2013.01); *C01P 2006/40* (2013.01)

(58) Field of Classification Search
CPC ......... C01B 32/921; B03D 3/06; B82Y 30/00; B82Y 40/00; C01P 2004/20; C01P 2004/45; C01P 2006/16; C01P 2006/40
See application file for complete search history.

(56) References Cited

U.S. PATENT DOCUMENTS

| | | | |
|---|---|---|---|
| 6,086,848 A | 7/2000 | Nakagawa et al. | |
| 6,423,295 B1 | 7/2002 | Huo | |
| 11,554,961 B2 * | 1/2023 | Barsoum | B03D 3/06 |
| 2015/0132654 A1 * | 5/2015 | Yeon | H01M 4/623 |
| | | | 252/511 |
| 2016/0336088 A1 * | 11/2016 | Barsoum | B32B 18/00 |

(Continued)

FOREIGN PATENT DOCUMENTS

| | | | |
|---|---|---|---|
| CN | 104495918 | * | 4/2015 |
| CN | 104495918 A | | 4/2015 |

(Continued)

OTHER PUBLICATIONS

CN106430195MT (Year: 2017).*

(Continued)

*Primary Examiner* — Alexander Usyatinsky
(74) *Attorney, Agent, or Firm* — BakerHostetler

(57) ABSTRACT

The present disclosure describes a crumpled form of Mxene materials, and methods of making and using these novel compositions.

20 Claims, 22 Drawing Sheets

(56) References Cited

U.S. PATENT DOCUMENTS

| | | | |
|---|---|---|---|
| 2017/0294546 A1 | 10/2017 | Ghidiu et al. | |
| 2019/0336932 A1* | 11/2019 | Liu | C01B 13/363 |

FOREIGN PATENT DOCUMENTS

| | | | |
|---|---|---|---|
| CN | 106145951 | * | 11/2016 |
| CN | 106145951 A | | 11/2016 |
| CN | 106430195 | * | 2/2017 |
| WO | 2016/049109 A2 | | 3/2016 |
| WO | 2017/044262 A1 | | 3/2017 |

OTHER PUBLICATIONS

NanoEnergy, 26, 2016, 513-523, (Year: 2016).*
Zhang et al., Journal of Energy Chem., 2008, 73-85 (Year: 2008).*
Ahmed et al., "Atomic Layer Deposition of SnO2 on MXene for Li-Ion Battery Anodes," Nano Energy, 2017, 34, 249-256.
Alcantara R, Jimenez-Mateos JM, Lavela P, et al, "Carbon black: a promising electrode material for sodium-ion batteries," Electrochem Commun, vol. 3, 2001, pp. 639-642.
Ali MA, Tchalala MR,"Chemical Synthesis of Silicon Nanosheets from layered calcium disilicide," J Phys Conf Ser, vol. 491, 2014, 12009.
Anasori et al., "2D Metal Carbides and Nitrides (MXenes) for Energy Storage," Nature Reviews Materials , vol. 2, No. 2, Feb. 2017, 16098.
Barsoum M.W., "Fabrication and electrical and thermal properties of Ti2InC, Hf2InC and (Ti,Hf)2InC," J. Alloys Compd, vol. 340, 2002, pp. 173-179.
Barsoum MW,"The Mn+1AXn phases: A new class of solids," Prog Solid State Chem, vol. 28, 2000, pp. 201-281.
Chowdhury I, Mansukhani ND, Guiney LM, et al, "Aggregation and Stability of Reduced Graphene Oxide: Complex Roles of Divalent Cations, pH, and Natural Organic Matter," Environ Sci Technol, vol. 49, 2015, pp. 10886-10893.
Clites M, "Bilayered vanadium oxides by chemical pre-intercalation of alkali and alkali-earth ions as battery electrodes," Energy Storage Materials, vol. 11, 2018, pp. 30-37.
Clites M, "Effect of aging and hydrothermal treatment on electrochemical performance of chemically pre-intercalated Na—V—O nanowires for Na-ion batteriest," J. Mater. Chem. A, vol. 4, 2016, pp. 7754-7761.
CN104495918MT (Year: 2015).
CN106145951 MT (Year: 2016).
Dall'Agnese, Y, et al, "Two-Dimensional Vanadium Carbide (MXene) as Positive Electrode for Sodium-Ion Capacitors," J. Phys. Chem. Lett, vol. 6, Issue 12, 2015, pp. 2305-2309.
Ding L,"A Two-Dimensional Lamellar Membrane: MXene Nanosheet Stacks," Angew.Chem. Int.Ed, vol. 56, 2017, pp. 1825-1829.
Du F,"Environmental Friendly Scalable Production of Colloidal 2D Titanium Carbonitride MXene with Minimized Nanosheets Restacking for Excellent Cycle Life Lithium-Ion Batteries," Electrochimi. Acta, vol. 235, 2017, pp. 690-699.
Enyashin A. N,"Atomic structure, comparative stability and electronic properties of hydroxylated Ti2C and Ti3C2 nanotubes," Comput. Theor. Chem,vol. 989, 2012, pp. 27-32.
Er D, Li J, Naguib M, et al, "Ti3C2 MXene as a High Capacity Electrode Material for Metal (Li, Na, K, Ca) Ion Batteries," ACS Appl Mater Interfaces, vol. 6, 2014, pp. 11173-11179.
Fard A.K,"Barium removal from synthetic natural and produced water using MXene as two dimensional (2-D) nanosheet adsorbent," Chem. Eng. J, vol. 317, 2017, pp. 331-342.
Fredrickson K.D,"Effects of Applied Potential and Water Intercalation on the Surface Chemistry of Ti2C and Mo2C MXenes," J. Phys. Chem, vol. 120, 2016, pp. 28432-28440.
Ghidiu et al., "Conductive two-dimensional titanium carbide 'clay' with high volumetric capacitance", Nature, Dec. 2014, 516, 78-81.
Ghidiu M, "Ion-Exchange and Cation Solvation Reactions in Ti3C2 MXene," Chem.Mater, vol. 28, 2016, pp. 3507-3514.
Ghidiu M, Barsoum MW, "The {110} reflection in X-ray diffraction of MXene films: Misinterpretation and measurement via non-standard orientation," J Am Ceram Soc, vol. 100, Issue 12, 2017, pp. 5395-5399.
Ghidlu et al., Alkylammonium Cation Intercalation into Ti3C2 (MXene): Effects on Properties and Ion-Exchange Capacity Estimation, Chemistry of Materials, vol. 29, Jan. 10, 2017, pp. 1099-1106.
Gong Y,"Graphene-Network-Backboned Architectures for High-Performance Lithium Storage," Adv. Mater, vol. 25, Issue 29, 2013, pp. 3979-3984.
Han et al., "Ti 3 C 2 MXenes with Modified Surface for High-Performance Electromagnetic Absorption and Shielding in the X-Band", ACS Applied Materials & Interfaces vol. 8, No. 32, Aug. 3, 2016, pp. 21011-21019.
Hou j,"Macroscopic and Strong Ribbons of Functionality-Rich Metal Oxides from Highly Ordered Assembly of Unilamellar Sheets," j.Am. Chem. Soc, vol. 137, 2015, pp. 13200-13208.
J et al: "A Non-Aqueous Asymmetric Cell with a Ti 2 C-Based Two-Dimensional Negative Electrode", A1368 Journal of the Electrochemical Society, Jan. 1, 2012, pp. 1368-1373.
Jiang Y,"Versatile Graphene Oxide Putty-Like Material," Adv. Mater, vol. 28, 2016, pp. 10287-10292.
Kajiyama, S, et al, "Sodium-Ion Intercalation Mechanism in MXene Nanosheets," ACS Nano, vol. 10, Issue 3, 2016, pp. 3334-3341.
Li R, Zhang L, Shi L, et al, "MXene Ti3C2 : An Effective 2D Light-to-Heat Conversion Material," ACS Nano, vol. 11, 2017, pp. 3752-3759.
Lian, P, et al, "Alkalized Ti3C2 MXene nanoribbons with expanded interlayer spacing for high-capacity sodium and potassium ion batteries," Nano Energy, vol. 40, 2017, pp. 1-8.
Lim j, "Kinetically Controlled Layer-by-Layer Stacking of Metal Oxide 2D Nanosheets," Angew.Chem. Int.Ed, vol. 56, 2017, pp. 7093-7096.
Ling, Z., et al., "Flexible and conductive MXene films and nanocomposites with high capacitance," Proceedings of the National Academy of Sciences, vol. 111, Issue 47, Nov. 25, 2014, pp. 16676-16681.
Liu Y, Du H, Zhang X, et al, "Superior catalytic activity derived from a two-dimensional Ti 3 C 2 precursor towards the hydrogen storage reaction of magnesium hydride," Chem Commun, vol. 52, 2016, pp. 705-708.
Liu Y,"Polyoxometalate-Modified Sponge-Like Graphene Oxide Monolith with High Proton-Conducting Performance," Adv. Funct. Mater, vol. 25, Issue 28, 2015, pp. 4480-4485.
Lu k,"Cation Intercalation in Manganese Oxide Nanosheets: Effects on Lithium and Sodium Storage," Angew. Chem. Int. Ed, vol. 55,2016, pp. 10448-10452.
Lukatskaya et al, "Cation Intercalation and High Volumetric Capacitance of Two-Dimensional Titanium Carbide", Science, vol. 341, No. 6153, Sep. 27, 2013, pp. 1502-1505.
Lukatskaya M. R., "Multidimensional materials and device architectures for future hybrid energy storage," Nat. Commun, vol. 7, 2016, 12647.
Luo J,"Pillared Structure Design of MXene with Ultralarge Interlayer Spacing for High-Performance Lithium-Ion Capacitors," ACS Nano, vol. 11, 2017, pp. 2459-2469.
Luo J,"Sn4+ Ion Decorated Highly Conductive Ti3C2 MXene: Promising Lithium-Ion Anodes with Enhanced Volumetric Capacity and Cyclic Performance," ACS Nano, vol. 10, 2016, pp. 2491-2499.
Ma T. Y,"Interacting Carbon Nitride and Titanium Carbide Nanosheets for High-Performance Oxygen Evolution," Angew. Chem. Int. Ed, vol. 55, 2016, pp. 1138-1142.
Maloy JT, "Factors affecting the shape of current-potential curves," J Chem Educ, vol. 60, 1983,285.
Mashtalir, O., et al., "Intercalation and delamination of layered carbides and carbonitrides," Nature Communications, vol. 4, Issue 1, Apr. 16, 2013, pp. 24.
Mashtalir, O., et al., "Kinetics of aluminum extraction from Ti3AlC2 in hydrofluoric acid," Materials Chemistry and Physics, vol. 139, Issue 1, Apr. 15, 2013, pp. 147-152.
Miranda A, "Rendering Ti3C2Tx (MXene) monolayers visible," Mater. Res. Lett, vol. 5, 2017, pp. 322-328.

(56) References Cited

OTHER PUBLICATIONS

Mui J, Ngo J, Kim B, "Aggregation and Colloidal Stability of Commercially Available Al2O3 Nanoparticles in Aqueous Environments," Nanomater, vol. 6, 2016,90.

Naguib et al, "Mxene: A Promising Transition Metal Carbide Anode for Lithium-ion Batteries", Electrochemistry Communications, Mar. 2012, 16, 61-64.

Naguib et al, "Two-Dimensional Nanocrystals Produced by Exfoliation of Ti.sub.3AlC.sub.2", Advanced Materials, 2011, 23, 4248-4253.

Naguib et al, "Two-Dimensional Transition Metal Carbides", American Chemical Society, Feb. 2012, 6(2), 1322-1331.

Naguib M, "25th Anniversary Article: MXenes: A New Family of Two-Dimensional Materials," Adv. Mater, vol. 26, 2014, pp. 992-1005.

Okamoto H, Kumai Y, Sugiyama Y, et al, "Silicon Nanosheets and Their Self-Assembled Regular Stacking Structure," J Am Chem Soc, vol. 132, 2010, pp. 2710-2718.

Palomares V, Serras P, Villaluenga I, et al, "Na-ion batteries, recent advances and present challenges to become low cost energy storage systems," Energy Environ Sci, vol. 5, 2012, pp. 5884-5901.

Rakhi R.B,"Effect of Postetch Annealing Gas Composition on the Structural and Electrochemical Properties of Ti2CTx MXene Electrodes for Supercapacitor Applications," Chem. Mater, vol. 27, 2015, pp. 5314-5323.

Ren CE, Zhao MQ, Makaryan T, et al, "Porous Two-Dimensional Transition Metal Carbide (MXene) Flakes for High-Performance Li-Ion Storage," Chem Electro Chem, vol. 3, 2016, pp. 689-693.

Schofield RK, Samson HR, "Flocculation of kaolinite due to the attraction of oppositely charged crystal faces," Discuss Faraday Soc, vol. 18,1954,135.

Shah et al., "Template-free 3D titanium carbide (Ti3C2Tx) MXene Particles Crumpled by Capillary Forces", The Royal Society of Chemistry, 2016, entire document.

Simon, P., et al., "Where do batteries end and supercapacitors begin?," Science, vol. 343, Mar. 14, 2014, pp. 1210-1211.

Song M.S., "Porously Assembled 2D Nanosheets of Alkali Metal Manganese Oxides with Highly Reversible Pseudocapacitance Behaviors," J. Phys. Chem. C, vol. 114, 2010, pp. 22134-22140.

Sun z., "Generalized self-assembly of scalable two-dimensional transition metal oxide nanosheets," Nat. Commun, vol. 5, 2014,3813, pp. 1-9.

Suryawanshi A, Mhamane D, Nagane S, et al, "Indanthrone derived disordered graphitic carbon as promising insertion anode for sodium ion battery with long cycle life," Electrochim Acta, vol. 146, 2014, pp. 218-223.

Tao Q,"Two-dimensional Mo1.33C MXene with divacancy ordering prepared from parent 3D laminate with in-plane chemical ordering," Nat. Commun, vol. 8, 2017,14949.pp. 1-7.

Thommes M, Kaneko K, Neimark A V., et al, "Physisorption of gases, with special reference to the evaluation of surface area and pore size distribution (IUPAC Technical Report)," Pure Appl Chem, vol. 87, 2015, pp. 1051-1069.

Tzenov et al, "Synthesis and Characterization of Ti3AlC2", Journal of the American Ceramic Society, Jan. 1, 2000, 83(4), 825-832.

Vaughn A, Ball J, Heil T, et al, "Selective Calixarene-Directed Synthesis of MXene Plates, Crumpled Sheets, Spheres, and Scrolls," Chem—A Eur J, vol. 23, 2017, pp. 8128-8133.

Wang L.Z,"Synthesis of a Li—Mn-oxide with Disordered Layer Stacking through Flocculation of Exfoliated MnO2 Nanosheets, and Its Electrochemical Properties," Chem. Mater, vol. 15, 2003, pp. 4508-4514.

Wang, J., et al., "Pseudocapacitive contributions to electrochemical energy storage in TiO2 (anatase) nanoparticles," J. Phys. Chem. C, vol. 111, Issue 40, Sep. 18, 2007, pp. 14925-14931.

Wang, X, et al, "Atomic-Scale Recognition of Surface Structure and Intercalation Mechanism of Ti3C2X," J. Am. Chem. Soc, vol. 137, Issue 7, 2015, pp. 2715-2721.

Wang, X, et al, "Pseudocapacitance of MXene nanosheets for high-power sodium-ion hybrid capacitors," Nat. Commun, vol. 6, 2015, pp. 1-6.

Wu et al., "Stabilizing the MXenes by Carbon Nanoplating for Developing Hierarchical Nanohybrids with Efficient Lithium Storage and Hydrogen Evolution Capability", Advanced Materials, Apr. 24, 2017, 1607017, pp. 1-8.

Xie X, Zhao M-Q, Anasori B, et al,"Porous heterostructured MXene/ carbon nanotube composite paper with high volumetric capacity for sodium-based energy storage devices," Nano Energy, vol. 26, 2016, pp. 513-523.

Xie Y. et al, "Prediction and Characterization of MXene Nanosheet Anodes for Non-Lithium-Ion Batteries," ACS nano, vol. 8, 2014, pp. 9606-9615.

Xu et al., "Ultrathin MXene-Micropattern-Based Field-Effect Transistor for Probing Neural Acivity", Adv. Mater., vol. 28, 2016, pp. 3333-3339.

Xue Q,"Photoluminescent Ti3C2 MXene Quantum Dots for Multicolor Cellular Imaging," Adv. Mater, vol. 29, 2017,1604847.

Yan J,"Flexible MXene/Graphene Films for Ultrafast Supercapacitors with Outstanding Volumetric Capacitance," Advanced Functional Materials, vol. 27, Issue 30, 2017, 1701264.

Ying G, Dillon AD, Fafarman AT, et al, "Transparent, conductive solution processed spincast 2D Ti2CTx (MXene) films," Mater Res Lett, vol. 5, 2017, pp. 391-398.

Ying Y, Liu Y, Wang X, et al, "Two-Dimensional Titanium Carbide for Efficiently Reductive Removal of Highly Toxic Chromium(VI) from Water," ACS Appl Mater Interfaces, vol. 7, 2015, pp. 1795-1803.

Yu Y-X,"Prediction of Mobility, Enhanced Storage Capacity, and Volume Change during Sodiation on Interlayer-Expanded Functionalized Ti3C2 MXene Anode Materials for Sodium-Ion Batteries," J Phys Chem C, vol. 120, 2016, pp. 5288-5296.

Zhang Q, Teng J, Zou G, et al,"Efficient phosphate sequestration for water purification by unique sandwich-like MXene/magnetic iron oxide nanocomposites," Nanoscale, vol. 8, 2016, pp. 7085-7093.

Zhang X, Zhang Z, Zhou Z, "MXene-based materials for electrochemical energy storage," J Energy Chem, vol. 27, Issue 1, 2017, pp. 73-85.

Zhao Di, "Akali-Induced Crumpling of Ti3C2Tx(MXene) to Form 3D Porous Networks For Sodium Ion Storage," Chemical Communications, vol. 54, Issue 36, 2018, pp. 4533-4536.

Zhao M. Q, "Flexible MXene/Carbon Nanotube Composite Paper with High Volumetric Capacitance," Adv. Mater, vol. 27, Issue 2, 2015, pp. 339-345.

Zhao M.Q,"2D titanium carbide and transition metal oxides hybrid electrodes for Li-ion storage," Nano Energy, vol. 30, 2016,pp. 603-613.

Zhao, M. Q. et al, "Hollow MXene Spheres and 3D Macroporous MXene Frameworks for Na-Ion Storage,". Adv. Mater, vol. 29, Issue 37, 2017,1702410.

\* cited by examiner

FIG. 17A  FIG. 17B  FIG. 17C
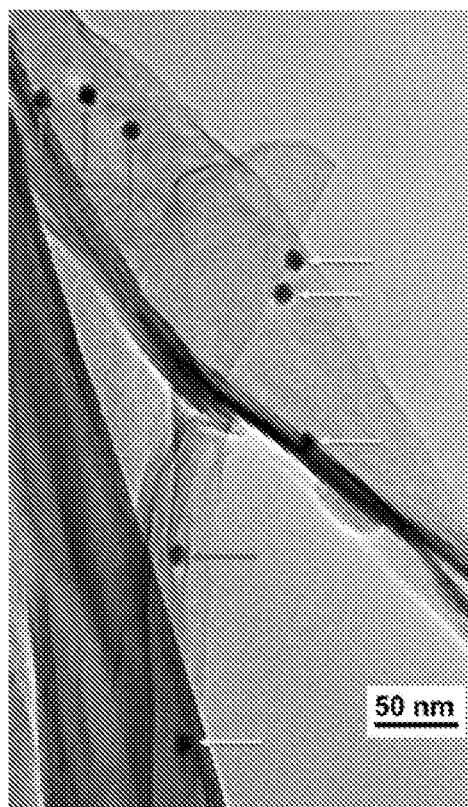
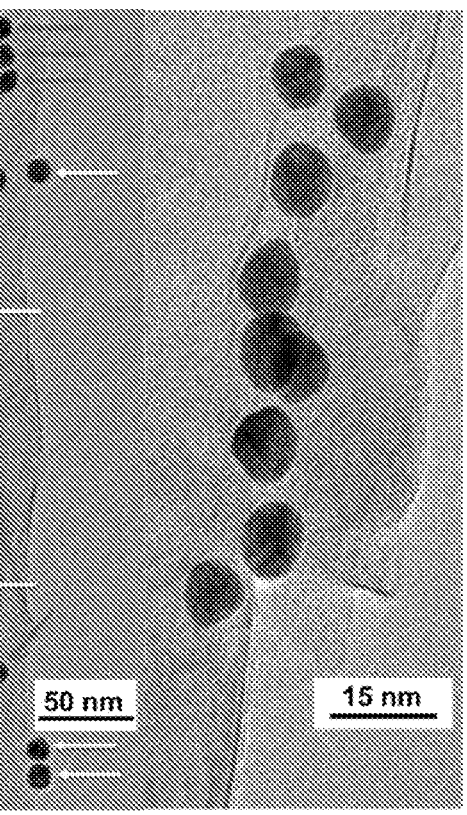
FIG. 17D  FIG. 17E
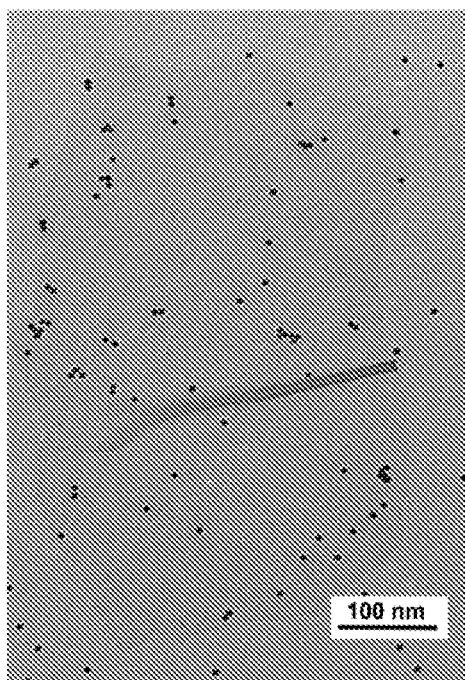
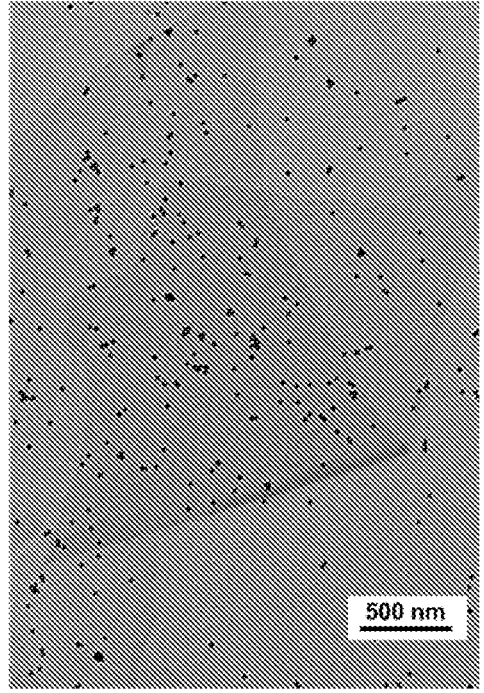

FIG. 18A
FIG. 18B
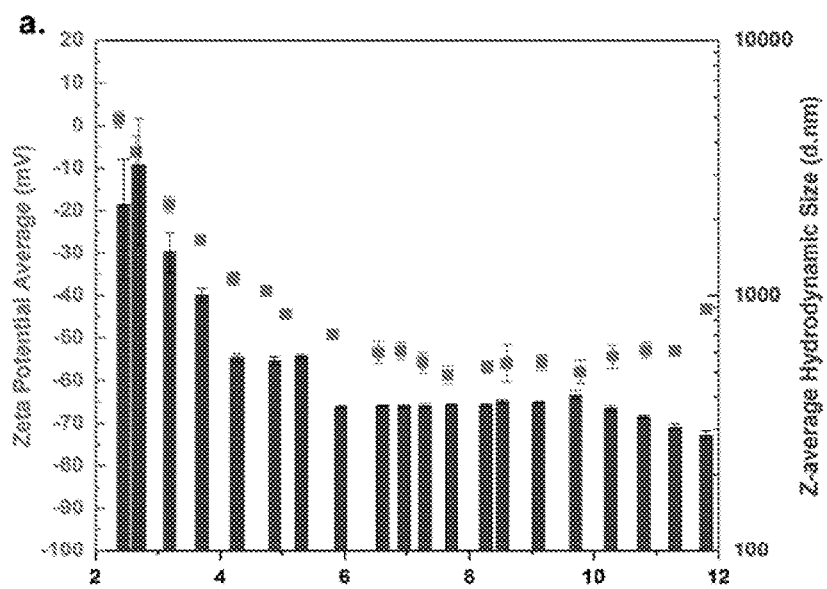
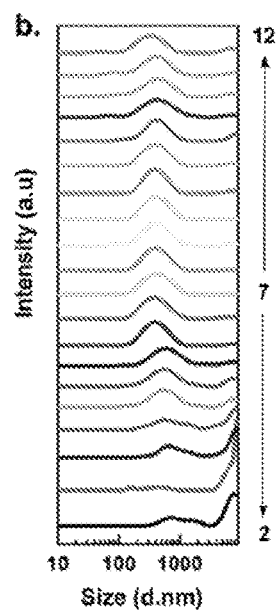
FIG. 18C
FIG. 18D
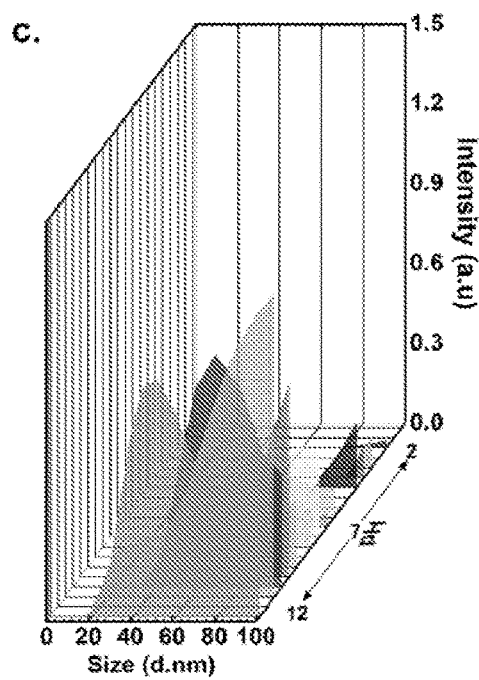
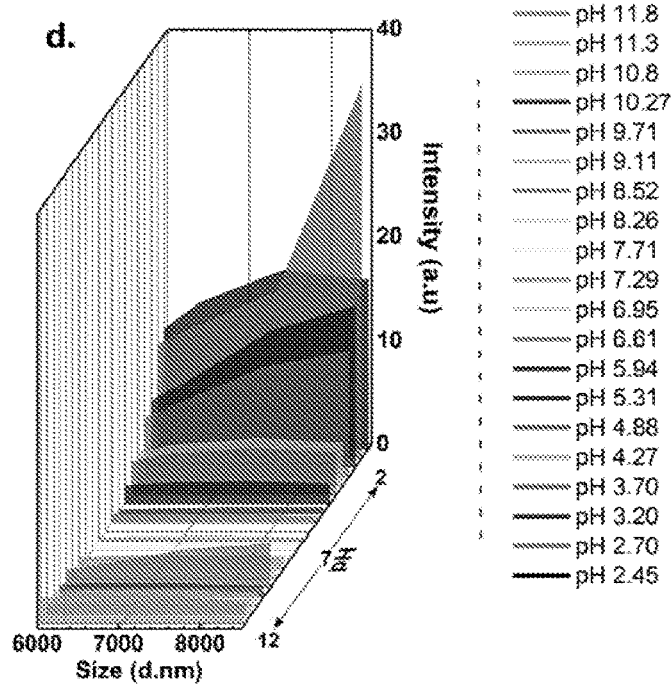

ANODES CRUMPLED MXENE COMPOSITIONS, COMPOSITES, AND DEVICES

CROSS REFERENCE TO RELATED APPLICATIONS

This application is a Continuation of U.S. patent application Ser. No. 16/954,786, filed Jun. 17, 2020; which is the National Stage Application of International Patent Application No. PCT/US2018/065992, filed Dec. 17, 2018; which claims priority to U.S. Patent Application No. 62/609,436, filed Dec. 22, 2017. The contents of the foregoing applications are incorporated by reference herein in their entireties for all purposes.

GOVERNMENT RIGHTS

This invention was made with government support under Contract No. DMR-1609272 and Contract No. DMR-1740795, both of which were awarded by the National Science Foundation. The government has certain rights in the invention.

TECHNICAL FIELD

The present disclosure is directed to novel compositions for use in electrochemical devices, gas sensing, gas capture, and catalysis, where an open, non-layered structure is preferred. More specifically, these novel compositions comprise a new form of MXene materials.

BACKGROUND

Two-dimensional (2D) transition metal carbides and nitrides, known as MXenes, have lately gained interest due to the high carrier densities resulting in metal-like conductivities combined with hydrophilicity and demonstrated potential in applications ranging from energy storage, water purification, hydrogen storage, photovoltaics, and EMI shielding among many others. The MXenes moniker is derived from related layered MAX phase compositions, from which MXenes can be derived.

Computational studies have predicted capacities between 217 and 351 mAh·g$^{-1}$, depending on the type of surface terminations, when $Ti_3C_2T_x$ is used as an anode in Na-ion electrochemical cells. However, experimentally, etched and non-delaminated $Ti_3C_2T_x$ electrodes exhibited an initial capacity of only 100 mAh·g$^{-1}$, and this capacity almost vanishes when electrodes of the same composition were prepared using vacuum filtration of delaminated nanosheets due to the dense packing of the 2D sheets resulting in poor electrolyte penetration.

Several strategies have been attempted to overcome this problem. One approach evaluated has used carbon nanotubes (CNTs) as spacers in vacuum filtered $Ti_3C_2T_x$ MXene films to facilitate electrolyte penetration, which led to a nearly 5 fold increase in capacity compared to that of MXene films without CNTs. Another approach has involved the use of poly(methyl methacrylate) templating to create hollow $Ti_3C_2T_x$ spheres thereby alleviating the issue of dense restacking during vacuum filtering. These hollow MXene spheres showed a capacity of 350 mAh·g$^{-1}$ at 0.25 C. Even though this is the highest capacity value reported for $Ti_3C_2T_x$ in Na-ion cells, the synthesis procedure is complex and not easily scalable and the resulting electrodes are fragile. Still others showed that simple shaking of the etched MXene particles in KOH results in delamination and formation of $Ti_3C_2T_x$ nanoribbons which exhibited a capacity of 150 mAh·g$^{-1}$ at a current densities of 20 mA·g$^{-1}$. However these electrodes do not perform well at current densities above 200 mA·g$^{-1}$ and show nearly the same capacities as those of just etched MXenes at higher currents.

The present invention takes advantage of the discoveries cited herein to avoid at least some of the problems associated with previously known methods.

SUMMARY

The present disclosure is directed to MXene compositions in a novel form described as "crumpled MXenes", and the methods of making and using such materials.

Some embodiments, then, are directed to crumpled MXenes or compositions comprising at least one type of crumpled MXene, wherein the crumpled MXene comprises a two dimensional crystalline transition metal carbide, nitride, or carbonitride arranged in a three-dimensional interpenetrating porous structure. In certain aspects, then, the term "crumpled MXene" refers to a foam-like, three-dimensional interpenetrating porous structure comprising MXene walls. The term "MXene" is well understood by those skilled in the art to refer to a class of compounds described elsewhere herein. These MXene walls may be characterized as being arranged in folded, or crosslinked structures as shown in the Figures and descriptions provided herein as exhibiting macro- and mesoporosity. These structures may also be characterized as foams, comprising elements of both open- and, to a much lesser degree, closed-cell foams. In some embodiments, the crumpled MXenes exhibit data consistent with encompassing mesopores in a range of at least from 2 nm to 6 nm.

In some embodiments, these crumpled MXenes and associated compositions further one or more types of alkali metal cation or alkyl ammonium cation, for example Li$^+$, Na$^+$, K$^+$, or tetra alkyl ammonium cations incorporated within the structures.

In some embodiments, these crumpled MXenes are derived from or are derivable from the pH or salt induced flocculation of a near pH neutral dispersion of delaminated MXene flakes. Such flocculation may be induced by the addition, for example, of strong organic or inorganic mineral acid to the pH neutral dispersion of the delaminated MXene. Such mineral acids include, but are not limited to hydrochloric, nitric, or sulfuric acids, or mixtures thereof. Such flocculation may also be induced by the addition of one or more hydroxide bases to the pH neutral dispersion of the delaminated MXene flakes. Such hydroxide bases include, but are not limited to of LiOH, NaOH, KOH, or an alkyl substituted ammonium hydroxide (for example tetrabutyl ammonium hydroxide). Such flocculation may also be induced by the addition of a salt, such as alkali metal halides, nitrites, phosphates, or sulfates (e.g., NaCl) to a near pH neutral dispersion of the delaminated MXene flakes. Transition metal salts and organic salts (e.g., dyes) also can be used to form these crumpled structures. In such cases, these salts are also incorporated into the crumpled structures.

In other embodiments, compositions comprising these crumpled MXenes may further comprise at least one organic binder. Such bound compositions may be prepared by conventional methods of blending particles and binder matrices. The organic binder may be an organic polymer, such as are known in the art and, in part, described further herein. Polymers exemplified in this disclosure include polyvinylidene fluoride (PVDF) and carboxymethyl cellulose, but the inventive concepts are not limited to these materials.

In additional embodiments, these crumpled MXene-binder composites further comprise an electrically conductive allotrope of carbon. This carbon may be of a form of carbon soot, carbon black, activated carbon, carbon nanotubes, carbon onions, or alliform carbon. In some embodiments, carbon nanotubes as explicitly excluded.

In some embodiments, the crumpled MXene-binder composites, optionally containing carbon, are usefully employed in electrochemical devices. For example, electrodes and current collectors usefully employ these composites, and those embodiments of these electrodes and current collectors are considered within the scope of this disclosure, as are electrochemical storage devices that comprise these compositions and devices. Specific embodiments further consider the use of these compositions and electrochemical devices in ion storage batteries, for example sodium or lithium ion storage batteries.

As suggested above, this disclosure considers the methods of making these crumpled MXenes as within its scope. In particular, the methods comprising adding acids, bases, or salts to dispersions of a delaminated MXene under conditions sufficient to flocculate a crumpled MXene composition from the dispersion, as described generally or specifically herein, are all considered within the scope of this disclosure.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings:

(FIG. 2B) Pristine c-$Ti_3C_2T_x$ electrode with 20% carbon (bottom, black), and same electrode after 30 cycles.

FIG. 14A: CV curves of Na-c-$Ti_3C_2T_x$ at a scan rate of 0.2 mV $s^{-1}$.

FIG. 14B: Discharge/charge curves of Na-c-$Ti_3C_2T_x$ at a current density of 25 mA·$g^{-1}$. FIG. 14C: Cycling stability of Na-c-$Ti_3C_2T_x$, multilayer $Ti_3C_2T_x$ and $Ti_3C_2T_x$ film electrodes at a current density of 100 mA·$g^{-1}$. FIG. 14D: Rate performance of Na-c-$Ti_3C_2T_x$ and multilayer $Ti_3C_2T_x$ electrodes. Current densities used are shown on figure. FIG. 14E: Cycling performance at a current density of 1.5 A $g^{-1}$.

FIG. 15A shows cycling stability at a current density of 100 mA·$g^{-1}$; FIG. 15B shows the rate performance at current densities shown on figure. FIG. 15C shows comparative data with other systems.

FIG. 16A shows XRD patterns of filtered films (top), HCl—$Ti_3C_2T_x$ (second from top), NaOH-$Ti_3C_2T_x$ (second from bottom), NaCl—$Ti_3C_2T_x$ (bottom) samples.

FIGS. 17A to 17E illustrate typical TEM images of $Ti_3C_2T_x$ flakes decorated by Au nanoparticles. In FIGS. 17A-C the gold NPs were negatively charged; in FIGS. 17D-E, the gold NPs were positively charged.

FIG. 18A shows zeta potential (left y-axis) and average hydrodynamic size (right y-axis) vs. pH. Insets show probable aggregate structures formed at low pH (left) and high pH (right) while complete deflocculation is represented by the middle inset. FIG. 18B shows dynamic light scattered intensity vs. size distribution between 10 nm and 9000 nm at various pH values; FIGS. 18C-D shows enlarged sections of FIG. 18B in the 0-100 nm size range (FIG. 18C) and in the 6000-9000 nm size range (FIG. 18D) (x-axis) vs. pH (z-axis) and intensity (y-axis). Color legend shown in bottom right corner is the same for FIG. 18B-D. Intensity scale (y-axis) in FIG. 18B-D are not the same and have been adjusted for better visibility, but the intensity ratios inside each individual plot are comparable.

DETAILED DESCRIPTION OF ILLUSTRATIVE EMBODIMENTS

Figure 1:
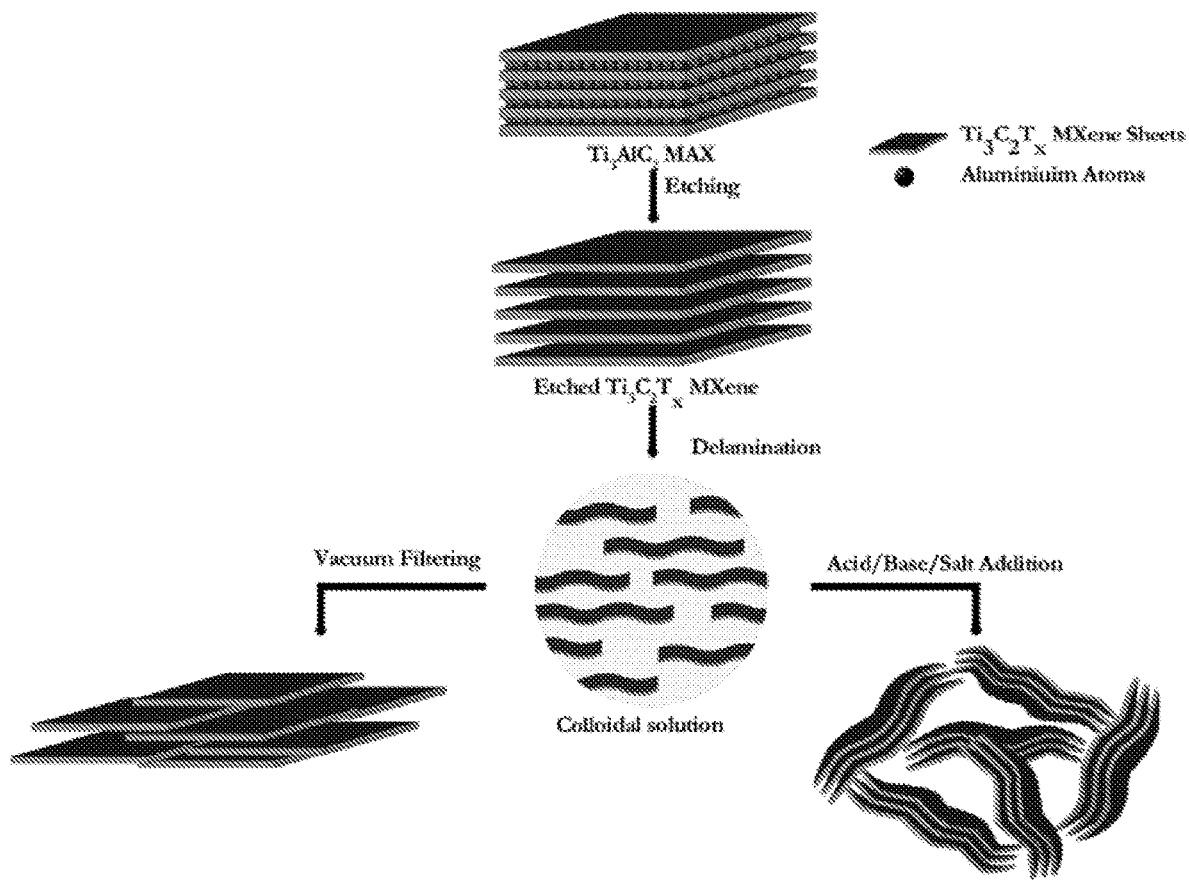
FIG. 1 is a schematic representation of several embodiments for a method of producing crumpled MXene nanosheets. Synthesis of the free-standing MXene films obtained through vacuum filtration is shown for comparison.

The present disclosure is directed to porous, including mesoporous, compositions comprising 3-dimensional networks of crumpled MXene materials (hereinafter c-MXenes, e.g., c-$Ti_3C_2T_x$), and the methods used to prepare them These compositions differ from those 2D or flat MXene materials (hereinafter f-MXenes, e.g., f-$Ti_3C_2T_x$) in that the former has expanded porosities, including those with foam-like, 3D mesoporous open architecture having a more random orientation of the nanosheets, resulting in a number of beneficial attributes described herein. The methods involve the acid-induced, alkali-induced, and salt-induced flocculation of suspensions, typically colloidal suspensions, of MXene flakes. The compositions and each method are discussed separately.

The present disclosure is also directed to the incorporation of these crumpled MXenes into binder matrices, typically organic polymer matrices, and the use of these composites in electrochemical devices, for example as electrodes or current collectors. These composite compositions may further contain one or more allotropes of carbon to enhance the current percolation of the composites. These composites and their described applications are also within the scope of the present disclosure "Crumpled MXenes"

As disclosed herein, the term "crumpled MXene" refers to a material form comprising MXene materials, wherein the normally flat, 2-D MXene crystalline transition metal carbide, nitride, or carbonitride flakes are crumpled and organized into a three-dimensional interpenetrating porous structure.

In certain aspects, this three-dimensional structure appears to comprise aspects of a combination of open- and closed-cell foams. That is, the normally planar "MXene" materials are arranged in folded, wrinkled, or partially "crosslinked" structures as shown in the Figures described. This folding/wrinkling/crumpling provides many irregular macropores with diameters between 100-400 nm. Equally, $N_2$ absorption/desorption data show the materials to exhibit a type-4 behavior indicating the presence of mesopores. The hysteresis loop further matched with H3-type loops, which corresponded to aggregates of plate like particles with slit pores, which is in agreement with the nanosheet morphology. The presence of mesopores was also confirmed by the pore size distribution. In some embodiments, the crumpled MXenes exhibit mesoporous morphology (i.e., with nanopores having diameters greater than 2 nm and less than 10 nm. In some embodiments, the nanopores have 3 to 5 nm pores diameters. In some experiments, the surface area of c-$Ti_3C_2T_x$ was found to be 33 $m^2·g^{-1}$, suggesting that in certain embodiments, the range of such areas is from 25 to 75 $m^2·g^{-1}$, from 25 to 50 $m^2·g^{-1}$, from 30 to 75 $m^2·g^{-1}$, or from 25 to 75 $m^2·g^{-1}$. Such values are comparable to those of etched but un-delaminated MXenes, but are less than the value of ca 105 $m^2 g^{-1}$, reported by others for MXenes, suggesting that some proportion of these MXene "foams" may exhibit closed-cell character.

While the macrostructure of these materials are 3-dimensional porous structures, the walls of these structured "cells" exhibit all of the characteristics of the planar crystalline MXene materials. XRD patterns of crumpled materials showed the characteristic peaks associated with crystalline MXene materials, as described in the references below, all of which are incorporated by reference at least for this purpose.

In the experiments presented herein, the data are consistent with the number of restacked nanosheets in the walls being on the order of 10-15 or 10-20. Indeed, specific analysis on c-$Ti_3C_2T_x$ materials, as described in the Experimental Section, yielded values of about ≈13 nm for the average thickness of the particle dimension along [0001]. This result confirmed that the number of individual MXene layers in the walls, between the pores is of the order of 10-15. At 15 Å, the basal spacing between the layers was consistent with the value of 15.5 Å calculated from the XRD results.

While each of these compositions and methods are described in terms of $Ti_3C_2T_x$, compositions the findings made with respect to $Ti_3C_2T_x$ specifically are believed to be applicable to any or all MXene compositions (for the sake of brevity, $Ti_3C_2T_x$, compositions are also referred to as c-$Ti_3C_2T_x$). Experimental results into the mechanisms of their formation (see, e.g., Example 4) are entirely consistent with this interpretation. As such, the crumpled architecture as demonstrated for c-$Ti_3C_2T_x$ are expected to be available for any of the MXene compositions described in at least one of U.S. patent application Ser. No. 14/094,966 (filed Dec. 3, 2013), 62/055,155 (filed Sep. 25, 2014), 62/214,380 (filed Sep. 4, 2015), 62/149,890 (filed Apr. 20, 2015), 62/127,907 (filed Mar. 4, 2015) or International Applications PCT/US2012/043273 (filed Jun. 20, 2012), PCT/US2013/072733 (filed Dec. 3, 2013), PCT/US2015/051588 (filed Sep. 23, 2015), PCT/US2016/020216 (filed Mar. 1, 2016), or PCT/US2016/028354 (filed Apr. 20, 2016), preferably where the MXene composition comprises titanium and carbon (e.g., $Ti_3C_2$, $Ti_2C$, $Mo_2TiC_2$, etc.). Each of these disclosures is incorporated by reference herein, at least for the variety of MXene compositions available. As such, these represent specific embodiments of this disclosure.

For completeness, in some embodiments, these MXene materials comprise two-dimensional crystalline arrays of transition metal carbide, nitride, or carbonitrides comprising compositions comprising at least one layer having first and second surfaces, each layer comprising:

a substantially two-dimensional array of crystal cells, each crystal cell having an empirical formula of $M_{n+1}X_n$, such that each X is positioned within an octahedral array of M, wherein M is at least one Group IIIB, IVB, VB, or VIB metal, wherein each X is C, N, or a combination thereof;

n=1, 2, or 3.

Within this context M is at least one Group IVB, Group VB, or Group VIB metal, preferably Sc, Y, Lu, Ti, Zr, Hf, V, Nb, Ta, Cr, Mo, W, or more preferably Ti, Nb, V, or Ta. In certain aspects, Ti, and n is 1 or 2. In particular embodiments, as exemplified herein, the MXene comprises a $Ti_3C_2T_x$ or $Ti_2CT_x$ composition.

In other embodiments, the MXene materials comprise two-dimensional crystalline arrays of transition metal carbide, nitride, or carbonitride, comprising at least one layer having first and second surfaces, each layer comprising:

a substantially two-dimensional array of crystal cells, each crystal cell having an empirical formula of $M'_2M''_nX_{n+1}$, such that each X is positioned within an octahedral array of M' and M", and where $M''_n$ are present as individual two-dimensional array of atoms intercalated (sandwiched) between a pair of two-dimensional arrays of M' atoms, wherein M' and M" are different Group IIIB, IVB, VB, or VIB metals (especially where M' and M" are Sc, Y, Lu, Ti, Zr, Hf, V, Nb, Ta, Cr, Mo, W, more preferably Ti, V, Nb, Ta, Cr, Mo, or a combination thereof), wherein each X is C, N, or a combination thereof; and n=1 or 2.

Again, within this latter context, certain embodiments include those MXenes wherein n is 1, M' is Mo, and M" is Nb, Ta, Ti, or V, or a combination thereof or wherein n is 2, M' is Mo, Ti, V, or a combination thereof, and M" is Cr, Nb, Ta, Ti, or V, or a combination thereof. In certain specific embodiments, the term $M'_2M''_nX_{n+1}$ comprises $Mo_2TiC_2$, $Mo_2VC_2$, $Mo_2TaC_2$, $Mo_2NbC_2$, $Mo_2Ti_2C_3$, $Cr_2TiC_2$, $Cr_2VC_2$, $Cr_2TaC_2$, $Cr_2NbC_2$, $Ti_2NbC_2$, $Ti_2TaC_2$, $V_2TaC_2$, or $V_2TiC_2$, or their nitride or carbonitride analogs. In more specific embodiments, $M'_2M''_nX_{n+1}$, comprises $Mo_2TiC_2$, $Mo_2VC_2$, $Mo_2TaC_2$, or $Mo_2NbC_2$, or their nitride or carbonitride analogs. In other independent embodiments, $M'_2M''_nX_{n+1}$ comprises $Mo_2Ti_2C_3$, $Mo_2V_2C_3$, $Mo_2Nb_2C_3$, $Mo_2Ta_2C_3$, $Cr_2Ti_2C_3$, $Cr_2V_2C_3$, $Cr_2Nb_2C_3$, $Cr_2Ta_2C_3$, $Nb_2Ta_2C_3$, $Ti_2Nb_2C_3$, $Ti_2Ta_2C_3$, $V_2Ta_2C_3$, $V_2Nb_2C_3$, or $V_2Ti_2C_3$, or their nitride or carbonitride analogs or $Mo_2Ti_2C_3$, $Mo_2V_2C_3$, $Mo_2Nb_2C_3$, $Mo_2Ta_2C_3$, $Ti_2Nb_2C_3$, $Ti_2Ta_2C_3$, or $V_2Ta_2C_3$, or their nitride or carbonitride analogs.

MXene materials are typically described in terms of single layers or a plurality of stacked layers, wherein at least one of said surfaces of each layer has surface terminations comprising alkoxide, carboxylate, halide, hydroxide, hydride, oxide, sub-oxide, nitride, sub-nitride, sulfide, thiol, or a combination thereof, and such character is confirmed herein. In some embodiments, at least one of said surfaces of each layer has surface terminations comprising alkoxide, fluoride, hydroxide, oxide, sub-oxide, or a combination thereof. In other embodiments, both surfaces of each layer have said surface terminations comprising alkoxide, fluoride, hydroxide, oxide, sub-oxide, or a combination thereof. In other embodiments, one or both surfaces of each layer alternatively or additionally comprises alkoxide, carboxylate, halide, hydroxide, hydride, oxide, sub-oxide, nitride, sub-nitride, sulfide, thiol, or a combination thereof.

As shown and explained in the Examples, these surface functional groups offer the means by which the materials form the crumpled structures described herein. The descriptor "$T_x$," as in "$Ti_3C_2T_x$," refers to these terminal groups, T, which are present in variable stoichiometric, sub-stoichiometric, and super stoichiometric amounts, x, depending on the specific processing conditions used to prepare these materials, and their environments.

In some embodiments, these crumpled MXene compositions further independently comprises one or more types of alkali metal or alkaline earth cation or alkyl ammonium cation incorporated into the crumpled MXene. In independent embodiments, the crumpled MXene materials comprise one or more types of alkali metal cations, such as lithium, sodium, or potassium ions, within its three-dimensional interpenetrating mesoporous structure. These structures may alternatively or additionally contain alkyl ammonium cations, of the general formula $N(H)_m(R)_n^+$, where m is 0-3 and R is a $C_{1-12}$ alkyl, preferably a $C_{1-6}$ alkyl, more preferably a $C_{1-4}$ alkyl. These cations may arise from the methods by which these materials are made, or may be added or exchanged post-synthesis. In some embodiments, the crumpled contain none of these types of cations, but simply contain sufficient protons to balance any charge that may exist on the MXene surfaces. In other embodiments, these crumpled MXene compositions further independently comprises one or more types of transition metal cations. These may be incorporated into the crumpled structures directly (by the use of such cations to crumple the MXene materials, or by ion exchange of the alkali metal, alkaline earth metal, ammonium, or other cations used to flocculate these structures. These cationic transition metals can be "naked" ions (i.e., that exist in solution only as hydrated ions), or may comprise transition metals containing other non-water ligands, and include any of the transition metals of Groups 2-12 (including the lanthanides and actinides) of the Periodic Table. Exemplary cations include one or more comprising Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, or Hg.

In some embodiments, these crumpled structures are derived from or are derivable from the pH-induced or salt-induced flocculation of a near pH neutral dispersion of delaminated MXene flakes. Examples of such methods and materials are described in the Examples.

Mesoporous MXene Powders Synthesized by Acid-Induced Crumpling

In certain embodiments, crumpled MXene powders can be produced by reducing the pH of a near-neutral colloidal $Ti_3C_2T_x$ suspension, this process resulting in the crashing out of the 2D nanosheets. The resulting powders are crumpled, create a 3D mesoporous open architecture. Notably, the latter is achieved without additives or spacers, such as CNTs, graphene sheets and/or complicated templates. This method is simple, inexpensive and imminently scalable and probably applies to most MXenes.

Contrary to previous approaches, the methods disclosed herein involve simple chemical approaches. For example, in one exemplary embodiment, the methods comprise or consist essentially of reducing the pH of a $Ti_3C_2T_x$ colloidal suspension, using a strong acid, such as hydrochloric, sulfuric or nitric acids. See, e.g., FIG. 1 for a schematic of how the c-$Ti_3C_2T_x$ and f-$Ti_3C_2T_x$ are obtained. The experimental details can be found in Examples, specifically Example 2.

Likewise, it is considered within the scope of the disclosure that reference to HCl as a pH adjustor can also refer to any other inorganic or organic acid capable of performing this same function, including mineral acids (e.g., HCl, HBr, $HNO_3$, $H_2SO_4$, $H_3PO_4$) and optionally substituted phenols and fluorinated and non-fluorinated carboxylic acids (e.g., $CF_3COOH$, $CHF_2COOH$, $CH_2FCOOH$, etc.) of sufficiently acidic character.

In certain independent embodiments, the flocculation results from the addition of an organic or inorganic mineral acid to the pH neutral dispersion of the delaminated MXene, under conditions to form the crumpled MXene materials. In certain of these embodiments, the pH induced flocculation results from the addition of hydrochloric, nitric, or sulfuric acid to the pH neutral dispersion of the delaminated MXene. While normal organic carboxylic acids (e.g., pKa ca. 4) have been shown to be ineffective in inducing such flocculation and formation of the crumpled structures, stronger organic acids having pKa's less than about 2 or less than about 1, such as trifluoroacetic acid or sulfonic acids may also serve to affect this transformation.

Mesoporous MXene Powders Synthesized by Alkali-Induced Crumpling

Figure 9A:
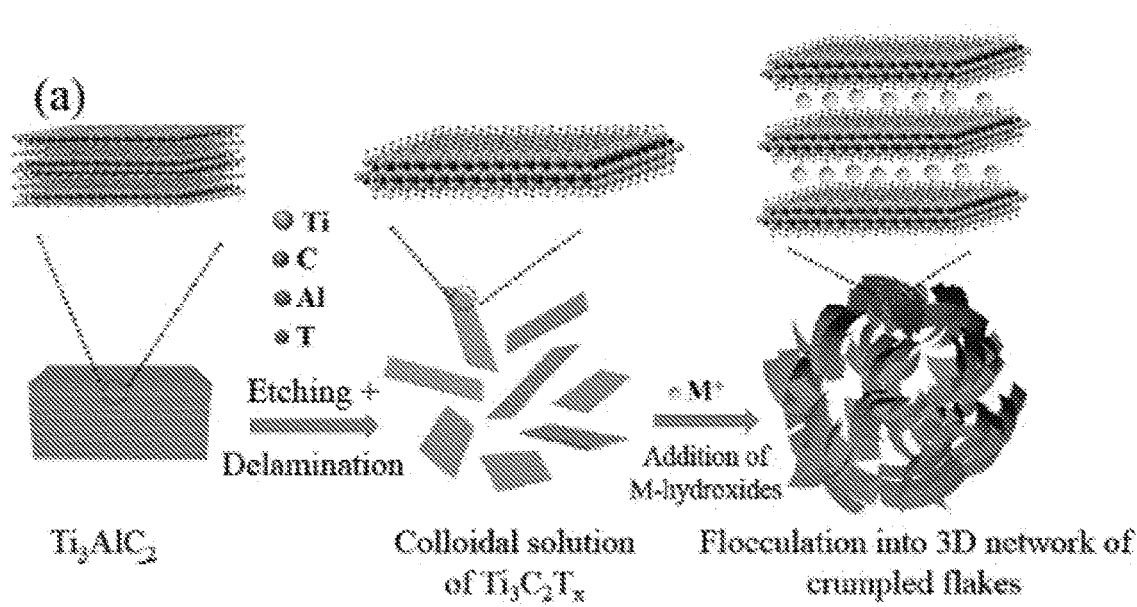
FIG. 9A illustrates a schematic of the fabrication process for M-c-$Ti_3C_2T_x$ ($M^+=Li^+$, $Na^+$, $K^+$, $TBA^+$) by flocculation using MOH.

Similar effects may be seen and similar materials obtained through the use of certain alkali materials. Herein are disclosed a rapid, simple and effective general flocculation approach to fabricate hierarchically porous 3D $Ti_3C_2T_x$ MXene networks composed of crumpled, henceforth referred to as c-$Ti_3C_2T_x$ nanosheets by simply adding alkali M'OH solutions where M' is $Na^+$, $Li^+$, $K^+$ or tetrabutylammonium, $TBA^+$ cations. When these cations end up between the c-$Ti_3C_2T_x$ sheets to differentiate them from each other, these may be described in terms of M'-c-$Ti_3C_2T_x$. A schematic of the overall process is shown in FIG. 9A. The experimental details can be found in Examples, specifically Example 3.

Likewise, it is considered within the scope of the disclosure that reference to tetrabutylammonium hydroxide as a pH adjustor can also refer to any other alkyl ammonium hydroxide, including $(NH_xR_{4-x})(OH)$, where x is 3, 2, 1, 0 and R is independently optionally substituted $C_{1-12}$ alkyl.

Said differently, the flocculation results from the addition of a hydroxide base to the pH neutral dispersion of the delaminated MXene flakes, under conditions to form the crumpled MXene materials. For example, the flocculation and formation of the crumpled MXenes may results from the addition of LiOH, NaOH, KOH, or an alkyl substituted ammonium hydroxide to the pH neutral dispersion of the delaminated MXene flakes. Again here, the term "alkyl substituted ammonium" refers to an ammonium cation of the general formula $N(H)_m(R)_n^+$, where m is 0-3 and R is a $C_{1-12}$ alkyl, preferably a $C_{1-6}$ alkyl, more preferably a $C_{1-4}$ alkyl.

Mesoporous MXene Powders Synthesized by Salt-Induced Crumpling

In other independent embodiments, the flocculation results from the addition of a salt induced flocculation of a near pH neutral dispersion of the delaminated MXene flakes. The salt may be a salt of a strong acid-weak base, weak acid-strong base, or preferably a strong acid-strong base. While the present Examples exemplify the used of NaCl, given the mechanisms attributed to the formation of these crumpled MXene materials. Alkali metal halides, nitrates, sulfates, or phosphates are considered useful in this capacity and within the scope of this disclosure.

As disclosed elsewhere herein, the salts may be effectively applied in the presence or absence of added acid or base. In certain independent embodiments, the addition of the acid may provide that the pH of the dispersion decreases from near neutral to a pH defined by a range of from less than 1, from 1 to 2, from 2 to 3, from 3 to 4, from 4 to 5, from 5 to 6, from 6 to 6.5, or a combination of two or more of such ranges. In certain other independent embodiments, the addition of the hydroxide may provide that the pH of the dispersion increases from near neutral to a pH defined by a range of from 7.5 to 8, from 8 to 9, from 9 to 10, from 10 to 11, from 11 to 12, from 12 to 13, or higher, or a combination of two or more of such ranges. The addition of salt may be effective in the formation of the crumpled MXenes at any of these ranges, and addition where the pH of the original near neutral pH is unaffected.

The results of these experiments using NaCl that also provides an overview discussion of several mechanisms, are described in Example 4.

The concentrations of either the added acids or the added bases are independently greater than or equal to 0.4 M, 0.5 M, 0.6 M, 0.7 M, 0.8 M, 0.9 M, 1.0 M, 1.1 M, 1.2 M up to about 3 M, 2 M, or 1.5 M Crumpled MXene-Binder Composites As a result of such treatments, the individually dispersed MXene nanosheets crumple and readily flocculate resulting in the foam-like, 3D mesoporous open architecture with a more random orientation of the nanosheets. This architecture is completely different from the structures obtained by simple filtering. Because such powders do not form self-supporting films, as do their planar analogs, it is necessary to add binders to form them into physical forms, such as electrodes. Further, in some embodiments, additional electrically conductive materials, such as allotropes of carbon, like carbon black, may be usefully added to the MXene-binder composites to enhance the electrochemical performance in, for example, Li- or Na-ion cells as compared to those of self-supporting electrodes of the same composition made by vacuum filtration.

In some embodiments, the crumpled MXene may be distributed in an organic binder, preferable where the organic binder comprises an organic polymer, so as to form a crumpled MXene-polymer composite. The polymer composite may be comprised of organic polymers, more specifically thermoset or thermoplastic polymers or polymer resins, elastomers, or mixtures thereof. Various embodiments include those wherein the polymer or polymer resin contains an aromatic or heteroaromatic moiety, for example, phenyl, biphenyl, pyridinyl, bipyridinyl, naphthyl, pyrimidinyl, including derivative amides or esters of terephthalic acid or naphthalic acid.

Still other embodiments provide that the polymer or copolymer comprises polyester, polyamide, polyethylene, polypropylene, polyethylenenaphthalate (PEN), polyethylene terephthalate (PET), polybutylene terephthalate (PBT), polyether etherketone (PEEK), polyamide, polyaryletherketone (PAEK), polyethersulfone (PES), polyethylenenimine (PEI), poly (p-phenylene sulfide) (PPS), polyvinyl chloride (PVC), fluorinated or perfluorinated polymer (such as a polytetrafluoroethylene (PTFE), polyvinylidene difluoride (PVDF), a polyvinyl fluoride (PVF). These compositions include those where the polymers/copolymers and crumpled MXenes are present in a weight ratio range of from about 1:99 to about 98:2, for example where the polymer/copolymer is present in the crumpled MXene composite in a range of from 1-5 wt %, from 5-10 wt %, from 10-15 wt %, from 15-20 wt %, from 20-25 wt %, from 25-30 wt %, from 30-40 wt %, from 40-50 wt %, or a range combining two or more of these ranges.

Natural biomaterials are also useful candidates for polymeric matrices since they are abundant, environmentally friendly, and mechanically robust. Sodium alginate (SA), a linear anionic polysaccharide copolymer derived from seaweed, consists of two different repeating units possessing massive oxygen-containing functional groups (—OH, —COO, and =O). This material is water-like in its H-bonding ability and will have strong covalent bonds between the H-bonding-capable repeating units. In terms of molecular design, the molecular structure of SA is more similar to that of the chitin in the organic phase of natural nacre.

Other polymeric materials containing these types of binding units and which are expected to be suitable include aliphatic polyesters, poly(amino acids), copoly(ether-esters), polyalkylene oxalates, polyoxaesters containing amine groups, poly(anhydrides), biosynthetic polymers based on sequences found in collagen, elastin, thrombin, fibronectin, starches, poly(amino acid), poly(propylene fumarate), gelatin, alginate, pectin, fibrin, oxidized cellulose, chitin, chitosan, tropoelastin, hyaluronic acid, poly(vinyl alcohol), ribonucleic acids, deoxyribonucleic acids, polypeptides, proteins, polysaccharides, polynucleotides and combinations thereof, polylactic acid (PLA), polyglycolic acid (PGA), polycaprolactone (PCL), poly(Lactide-co-Glycolide) (PLGA), polydioxanone (PDO), alginate or alginic acid or acid salt, chitosan polymers, or copolymers or mixtures thereof, PLA-PEG, PEGT-PBT, PLA-PGA, PEG-PCL, PCL-PLA, and functionalized poly(β-amino esters). Similarly, the polymer may be comprised of a mixture one or more natural, synthetic, biocompatible, biodegradable, non-biodegradable, and/or biosorbable polymers and co-polymers. Without being bound by any particular the correctness of any particular theory, it is believed that these polyfunctional groups are capable of at least hydrogen bonding, if not covalently bonding with the terminal surface functionalities of the crumpled MXene materials Bonded composite compositions comprising these two-dimensional materials, whose surface functionalities can be or are bonded together by polymers and copolymers comprising oxygen-containing functional groups (—OH, —COO, and =O) and amine functional groups are also considered within the scope of the present disclosure. Such polymers and copolymers are described herein.

The use of polyvinylidene fluoride (PVDF) or polytetrafluoroethylene (PTFE) and carboxymethyl cellulose as binders is exemplified herein.

In some embodiments, these crumpled MXene-polymer composites, further comprise an electrically conductive allotrope of carbon. The amount of this carbon depends on the loading of the crumbled MXene within the polymer/copolymer matrix, and/or the degree of desired electrical conductivity. In certain embodiments, the allotrope of carbon is carbon soot, carbon black, activated carbon, carbon nanotubes, carbon onions, or alliform carbon. In some embodiment, carbon nanotubes as explicitly excluded. The allotrope of carbon may be present in the composite in a range defined as from about 1-2 wt %, from 2-4 wt %, from 4-6 wt %, from 6-8 wt %, from 8-10 wt %, from 10-20 wt %, from 20-30 wt %, from 30 to 50 wt %, or any combination of two or more of these ranges.

Generally, these composite structures may be incorporated into electrodes or current collectors, for use in supercapacitors, or other electrochemical devices. In some embodiments, the composite is in the form of and used as an electrode. Because of the character of these composites, as discussed further in the Examples, these electrodes comprising these composites are especially useful for use in energy storage devices. In some embodiments, these energy storage devices are batteries. In more specific embodiments considered within the scope of this disclosure, the batteries are ion storage batteries. Lithium ion and sodium ion batteries are independent embodiments of this type of device.

When used as electrodes, for example in lithium ion or sodium ion batteries, these inventive materials are capable of showing capacities in a range characterized as of from 150 to 200 mAh·g$^{-1}$, from 200 to 250 mAh·g$^{-1}$, from 250 to 300 mAh·g$^{-1}$, from 300 to 350 mAh·g$^{-1}$, or any combination of two or more of these ranges when tested at 20 mA·g$^{-1}$, or a rate performance in a range defined as from 50 to 75 mAh·g$^{-1}$, from 75 to 100 mAh·g$^{-1}$, from 100 to 1250 mAh·g$^{-1}$, from 1250 to 150 mAh·g$^{-1}$, from 150 to 200 mAh·g$^{-1}$, or any combination of two or more of these ranges when tested at 500 mA·g$^{-1}$.

Other Applications

It should be appreciated that the open nature of these crumpled MXenes, and the ability to incorporate transition metals and other cations within these structures makes these catalysts suitable and attractive for those applications where such properties provide benefit. Such applications are considered within the scope of the present invention. Such applications include, for example:

Gas storage or sensing. In certain embodiments, one or more of the crumpled MXene materials described herein may be incorporated into devices suitable for sensing (either qualitatively or quantitatively) or storing gases. Such devices and their use for this purpose are seen as within the scope of the present disclosure. The compositions useful for this purpose may comprise transition metal cations and/or organic dye salt cations or may be substantially free of such cations. Gases may comprise hydrogen, oxygen, hydrocarbons, or organic or inorganic gases comprising oxygen, nitrogen, or sulfur atoms, such as alcohols, ethers, carboxylic acids or esters, amines (including ammonia), thiols, or thiol ethers. Such devices may be used simply as gas sensors, or be part of larger systems where the monitoring of such gases may be used as a control element in such larger systems. The tunability of the pore sizes, and the range of MXene compositions available in this physical form allows for selective detection or capture of such gases.

Catalysis. In certain embodiments, one or more of the crumpled MXene materials described herein may be used as catalysts for any number of organic or inorganic transformation, or may be incorporated into devices suitable for this purpose. Again, the porosity and ability to incorporate transition metal cations within their three-dimensional inter-penetrating mesoporous structures would appear to make them ideally suited for this purpose. Such compositions may be used to catalyze the transformation of organic or inorganic substrates. In certain aspects, the reaction may comprise an oxidation (e.g., using oxygen or an organic or inorganic peroxide or other suitable oxidant), reduction (e.g., using hydrogen or other suitable reductant), rearrangement, or coupling or decoupling/decomposition of the substrate. Methods for catalyzing such reactions using the compositions described herein are also considered within the scope of this disclosure.

Terms

The present disclosure may be understood more readily by reference to the following description taken in connection with the accompanying Figures and Examples, all of which form a part of this disclosure. It is to be understood that this invention is not limited to the specific products, methods, conditions or parameters described or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to compositions and methods of making and using said compositions. That is, where the disclosure describes or claims a feature or embodiment associated with a composition or a method of making or using a composition, it is appreciated that such a description or claim is intended to extend these features or embodiment to embodiments in each of these contexts (i.e., compositions, methods of making, and methods of using).

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

The transitional terms "comprising," "consisting essentially of," and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those that are independently described in terms of "consisting of" and "consisting essentially of" For those embodiments provided in terms of "consisting essentially of," the basic and novel characteristic(s) is the facile operability of the methods (or the systems used in such methods or the compositions derived therefrom) to prepared so-called crumpled MXenes and the compositions and devices derived from these methods When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C." Similarly, a designation such as $C_{1-3}$ includes $C_1$, $C_2$, $C_3$, $C_{1-2}$, $C_{2-3}$, $C_{1,3}$, as separate embodiments, as well as $C_{1-3}$.

Throughout this specification, words are to be afforded their normal meaning, as would be understood by those skilled in the relevant art. However, to avoid misunderstanding, the meanings of certain terms will be specifically defined or clarified.

The term "crumpled" MXene refers to a three-dimensional open architecture such as described herein. Within the context of MXenes, the term "crystalline compositions comprising at least one layer having first and second surfaces, each layer comprising a substantially two-dimensional array of crystal cells" refers to the unique character of MXene materials. For purposes of visualization, the two-dimensional array of crystal cells may be viewed as an array of cells extending in an x-y plane, with the z-axis defining the thickness of the composition, without any restrictions as to the absolute orientation of that plane or axes.

Also as used herein, the term "derived or derivable from" refers to the fact that these crumpled MXenes may be derived from the methods described herein, or are available by other means or are independent of the way in which they are formed.

Also as used herein, "a substantially two-dimensional array of crystal cells" to describe MXenes refers to an array which preferably includes a lateral (in x-y dimension) array of crystals having a thickness of a single unit cell, or half of a single unit cell of the original MAX phase material, such that the top and bottom surfaces of the array are available for chemical modification.

As used herein, the term "mesoporous" refers to a material containing pores with diameters between 2 and 50 nm, consistent with IUPAC nomenclature. For comparison, the term "microporous" refers to a material having pores smaller than 2 nm in diameter, and "macroporous" refers to a material having pores larger than 50 nm in diameter.

The term "near neutral pH" refers to a pH in a range of from 6 to 8, preferably 6.5 to 7.5. The term "acid" or "acidic" refer to a composition or condition characterized by a pH of less than 7, but can also connote solutions exhibiting a pH of less than 6.5 or less than 6 to about 1 or less. The term "alkaline" refer to a composition or condition characterized by a pH of greater than 7, but can also connote solutions exhibiting a pH of greater than 7.5 or greater than 8 to about 14.

"Optional" or "optionally" means that the subsequently described circumstance may or may not occur, so that the description includes instances where the circumstance occurs and instances where it does not. For example, the phrase "optionally comprising" refers to individual embodiments or claims that both contain and do not contain. Each of these embodiments obviously are considered separate compositions, The following listing of embodiments is intended to complement, rather than displace or supersede, the previous descriptions.

Embodiment 1. A crumpled MXene or a composition comprising a crumpled MXene, wherein the crumpled MXene comprises a two dimensional crystalline transition metal carbide, nitride, or carbonitride arranged in a three-dimensional interpenetrating porous structure. The definition of MXene materials is described elsewhere herein.

Embodiment 2. The crumpled MXene or composition comprising crumpled MXene of Embodiment 1, wherein the crumpled MXene exhibits mesopores in a range of from 2 nm to 6 nm. In some Aspects of this Embodiment, the crumpled MXene also comprises a structure having irregular pores with diameters between 100-400 nm and a surface area per gram consistent with a mixed open-/closed-cell architecture.

Embodiment 3. The crumpled MXene or composition comprising crumpled MXene of Embodiment 1 or 2, further comprising at least one type of alkali metal cation or alkyl ammonium cation incorporated into the crumpled MXene.

Embodiment 4. The crumpled MXene or composition comprising crumpled MXene of any one of Embodiment 1 to 3, comprising at least one ion of lithium, sodium, or potassium ions within its three-dimensional interpenetrating mesoporous structure.

Embodiment 5. The crumpled MXene or composition comprising crumpled MXene of any one of Embodiment 1 to 4, wherein the crumpled MXene is derived or derivable from the pH-induced flocculation of a near pH neutral dispersion of delaminated MXene flakes.

Embodiment 6. The crumpled MXene or composition comprising crumpled MXene of Embodiment 5, wherein the pH induced flocculation results from the addition of an inorganic mineral acid to the pH neutral dispersion of the delaminated MXene.

Embodiment 7. The crumpled MXene or composition comprising crumpled MXene of Embodiment 5 or 6, wherein the pH induced flocculation results from the addition of hydrochloric, nitric, or sulfuric acid to the pH neutral dispersion of the delaminated MXene.

Embodiment 8. The crumpled MXene or composition comprising crumpled MXene of Embodiment 5, wherein the pH induced flocculation results from the addition of a hydroxide base to the pH neutral dispersion of the delaminated MXene flakes.

Embodiment 9. The crumpled MXene or composition comprising crumpled MXene of Embodiment 8, wherein the pH induced flocculation results from the addition of LiOH, NaOH, KOH, or an alkyl-substituted ammonium hydroxide to the pH neutral dispersion of the delaminated MXene flakes.

Embodiment 10. The crumpled MXene or composition comprising crumpled MXene of any one of Embodiment 1 to 4, wherein the crumpled MXene is derived or derivable from the salt induced flocculation of a near pH neutral dispersion of delaminated MXene flakes. In certain Aspects of this Embodiment, the salt comprises an alkali metal, an alkaline earth metal, or a transition metal cation.

Embodiment 11. The crumpled MXene or composition comprising crumpled MXene of any one of Embodiment 1 to 10, further comprising an organic binder in which the crumpled MXene is distributed. The composite material may comprise these ingredients in any proportion described herein.

Embodiment 12. The crumpled MXene or composition comprising crumpled MXene of Embodiment 11, wherein the organic binder is an organic polymer, wherein the organic polymer acts as the binder in which the crumpled MXene is distributed. The organic polymer may comprise one or more of the polymers or copolymers described herein. The present disclosure exemplifies, but is not limited to, a polymer comprising polyvinylidene fluoride (PVDF) and carboxymethyl cellulose as an organic polymer binder.

Embodiment 13. The composite composition of Embodiment 12, further comprising an electrically conductive allotrope of carbon. In certain Aspects of this Embodiment, the allotrope of carbon is carbon soot, carbon black, activated carbon, carbon nanotubes, carbon onions, or alliform carbon. In some Aspect of this Embodiment, carbon nanotubes as explicitly excluded. The allotrope of carbon may be present in the composite in any proportion described elsewhere herein.

Embodiment 14. An electrochemical device comprising the crumpled MXene or composition comprising crumpled MXene of any one of Embodiments 1 to 13.

Embodiment 15. The electrochemical device of Embodiment 14 that is an electrode or current collector.

Embodiment 16. An energy storage device comprising a crumpled MXene or composition comprising crumpled MXene of any one of Embodiments 1 to 13 or an electrochemical device of Embodiment 14 or 15. In certain Aspects of this Embodiment, the energy storage device is an ion storage battery, preferably a lithium ion or sodium ion storage battery.

Embodiment 17. A gas storage or gas sensing device comprising a composition of any one of claims 1-10. The composition may comprise transition metal cations or be free of added transition metal cations. Gases may comprise hydrogen, oxygen, hydrocarbons, or organic or inorganic gases comprising oxygen, nitrogen, or sulfur atoms, such as alcohols, ethers, carboxylic acids or esters, amines, thiols, or thiol ethers.

Embodiment 18. A catalyst comprising a composition of any one of claims 1-10. In certain Aspects of this Embodiment, the crumpled MXene contains within it at least one transition metal within its three-dimensional interpenetrating mesoporous structure. In other Aspects of this Embodiment, the composition is used as a catalyst to catalyze the transformation of an organic or inorganic substrate, the reaction may comprise an oxidation, reduction, rearrangement, coupling, or decoupling/decomposition of the substrate. Other Aspects of this Embodiment include methods for catalyzing such reactions using the compositions described herein.

Embodiment 19. A method of preparing a crumpled MXene composition of any one of Embodiments 1 to 10, the method comprising adding an inorganic acid to a near pH neutral dispersion of a delaminated MXene under conditions sufficient to flocculate a crumpled MXene composition from the dispersion. In certain Aspects of this Embodiment, the near pH neutral dispersion of the delaminated MXene has an initial near neutral pH. In other Aspects, the addition of the inorganic acid drops the pH to less than 5, less than 4, less than 3, less than 2, or 1 or less, the pH adjustment being sufficient to flocculate the crumpled MXene composition.

Embodiment 20. A method of preparing a crumpled MXene composition of any one of Embodiments 1 to 10, the method comprising adding a hydroxide base to a near pH neutral dispersion of a delaminated MXene under conditions sufficient to flocculate a crumpled MXene composition from the dispersion. In certain Aspects of this Embodiment, the near pH neutral dispersion of the delaminated MXene has an initial near neutral pH. In other Aspects, the addition of the hydroxide base raises the pH of the dispersion to greater than 8, greater than 9, greater than 10, or greater than 12, the pH adjustment being sufficient to flocculate the crumpled MXene composition.

Embodiment 21. A method of preparing a crumpled MXene composition of any one of Embodiments 1 to 10, the method comprising adding an alkali metal or alkaline earth metal salt to a near pH neutral dispersion of a delaminated MXene under conditions sufficient to flocculate a crumpled MXene composition from the dispersion.

EXAMPLES

The following Examples are provided to illustrate some of the concepts described within this disclosure. While each Example is considered to provide specific individual embodiments of composition, methods of preparation and use, none of the Examples should be considered to limit the more general embodiments described herein.

Example 1: General Considerations

In the following examples, efforts have been made to ensure accuracy with respect to numbers used (e.g. amounts, temperature, etc.) but some experimental error and deviation should be accounted for. Unless indicated otherwise, temperature is in degrees C., pressure is at or near atmospheric.

While each of these compositions and methods are described in terms of $Ti_3C_2T_x$, compositions the findings made with respect to $Ti_3C_2T_x$ specifically are believed to be applicable to any or all MXene compositions (for the sake of brevity and distinction, crumpled $Ti_3C_2T_x$, compositions are referred to as c-$Ti_3C_2T_x$; filtered or flat $Ti_3C_2T_x$, compositions are referred to as f-$Ti_3C_2T_x$).

Unless otherwise described, the materials were characterized using the following equipment and methods:

X-Ray diffraction (XRD) patterns were recorded using a diffractometer (Rigaku Smart Lab, Tokyo, Japan) using Cu $K_\alpha$ radiation (40 KV and 44 mA), typically at a step scan 0.02°, 3°-65° 2 theta range and a step time of 0.5 s.

The zeta, $\zeta$, potential measurements were conducted using a Zetasizer Nano ZS apparatus from Malvern Instruments.

The structure and morphology of the materials were examined with Scanning Electron Microscopy (SEM), Energy-Dispersive Spectroscopy (EDS) and Transmission electron microscopy (TEM). SEM and EDS were performed on a Zeiss Supra 50VP (Carl Zeiss A G, Germany). The TEM was a JEOL JEM-2010.

Example 2. Mesoporous MXene Powders Synthesized by Acid Induced Crumpling

Introduction: Herein are described methods that comprise decreasing the pH of a $Ti_3C_2T_x$ MXene colloidal suspension, the 2D nanolayers are induced to crash out into crumpled flakes, resulting in randomly oriented powders with a mesoporous architecture. Electrodes made with the latter showed capacities of 250 mAh·g$^{-1}$ at 20 mA·g$^{-1}$ in sodium-ion batteries. The rate performance, 120 mAh·g$^{-1}$ at 500 mA·g$^{-1}$, was also good. This acid-induced, reversible, crumpling approach is facile and scalable and could prove important in electrochemical, biological, and environmental MXene-based applications.

Example 2.1 Synthesis: The parent $Ti_3AlC_2$ phase was synthesized by mixing titanium carbide, TiC, aluminum, Al, and titanium, Ti, powders in molar ratios of 2:1.05:1, respectively. The mixed powders were ball milled at 300 rpm for 24 h and then heated under argon, Ar, flow at 1550° C. for 2 h. The annealed MAX powders are ground using a milling bit on a drill press. The milled powders were passed through a 400 mesh sieve and collected for further experiments.

The MAX phase was converted to $Ti_3C_2T_x$ by etching out Al from $Ti_3AlC_2$ powder using LiF and HCl solution. First, 1 g of LiF was dissolved in 10 ml of 12 M HCl, after which 1 g of the $Ti_3AlC_2$ powder was slowly added to the solution. The solution was stirred for 24 h at 35° C. and 300 rpm. The solution was then transferred into a centrifuge tube and 30 ml DI water was added. It was then centrifuged at 3500 rpm for 10 mins and the supernatant was discarded. This washing process was repeated several times until the pH of the solution was neutral. The latter was sonicated under Argon flow for 1 h in a bath sonicator. To avoid oxidation, the temperature of the bath was kept below 20° C. using ice. The solution was then centrifuged for 1 h at 5000 rpm and the supernatant was pipetted for further use.

The flocculation and crumpling of the MXene nanosheets was achieved through the addition of concentrated hydrochloric acid (HCl) to the colloidal solution. HCl was added drop wise until the pH reached ≈1.0 and all the MXene was precipitated out. The clear supernatant acidic solution was discarded and the formed MXene precipitate was washed with de-ionized water using the above-mentioned process until neutral pH. The resulting powder was dried overnight in a vacuum oven at 70° C. This powder will henceforth be referred to as c-$Ti_3C_2T_x$.

To get the un-crumpled MXene flakes, the neutral supernatant MXene solution obtained after centrifuging was vacuum filtered and dried. These films will henceforth be referred to as f-$Ti_3C_2T_x$. A schematic of the whole process is shown in FIG. 1.

Example 2.2. Electrochemical Testing: To Prepare Electrodes, the c-$Ti_3C_2T_x$ powder was mixed with carbon black and polyvinylidene fluoride (PVDF) binder in a weight ratio of 70:20:10 in N-Methyl-2-pyrrolidone (NMP). This slurry was then cast on aluminum foil using a doctor blade and dried in a vacuum oven overnight at 70° C. to evaporate the NMP, Circular disc electrodes were then punched out and CR-2032 coin cells were assembled in an argon, Ar, filled glove box. Sodium metal served as both counter and reference electrodes. 1M NaClO$_4$ dissolved in ethylene carbonate (EC):propylene carbonate (PC, 1:1 v/v) with 5% fluoroethylene carbonate (FEC) was used as electrolyte. To evaluate electrochemical activity of carbon black, electrodes with 90 carbon black:10 PVDF and 90 c-$Ti_3C_2T_x$:10 PVDF were also produced in a similar way. In this work the capacity was normalized by the weight of the active components only.

Example 2.3. Characterization: In Addition to the Characterization Methods described elsewhere herein, BET measurements were carried out on a Quadrasorb instrument (Quantachrome, Florida, USA). Battery tester (Arbin, College Station, Texas, USA), was used to test the cycling performance and a potentiostat (VMP 3, Biologic, France) was used for cyclic voltammetry.

Figure 2A:
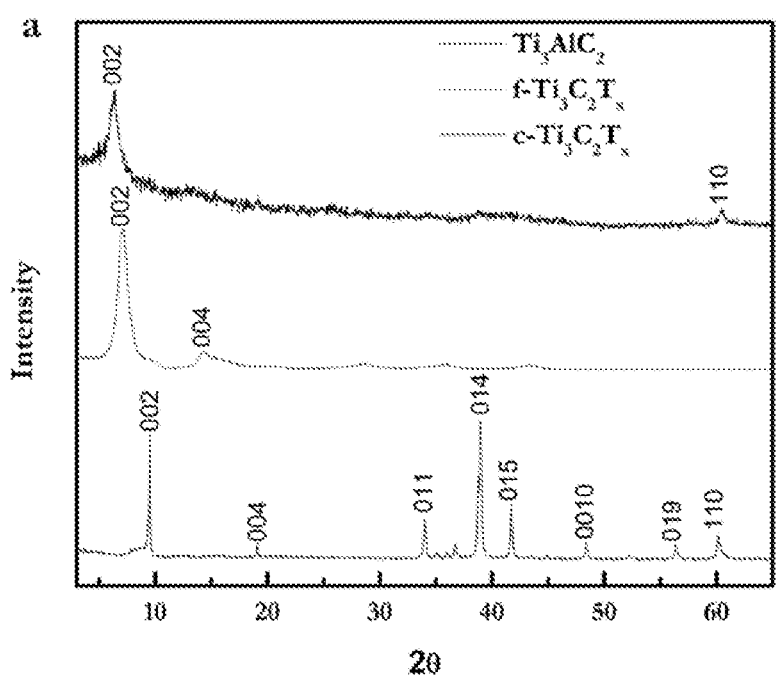
FIGS. 2A and 2B illustrate XRD patterns of (FIG. 2A) c-$Ti_3C_2T_x$ (top, black), f-$Ti_3C_2T_x$ (center, red) and parent $Ti_3AlC_2$ MAX (bottom, blue) powders.
Figure 2B:
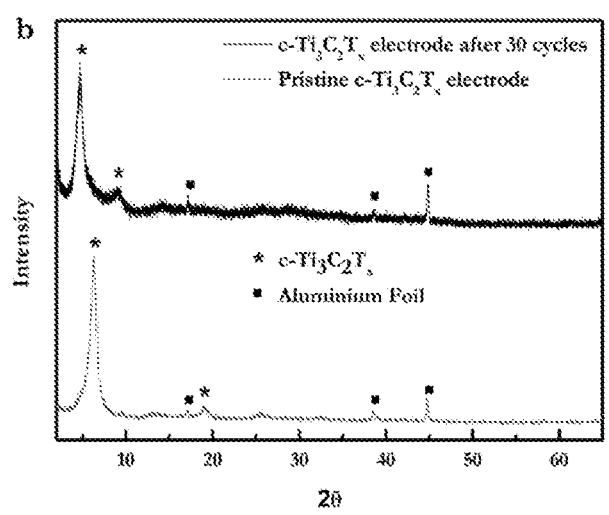

The XRD patterns of $Ti_3AlC_2$, c-$Ti_3C_2T_x$, and f-$Ti_3C_2T_x$ (FIG. 2A) confirmed that the MAX phase was fully converted to MXene. Furthermore, the presence of a (110) peak at ca. 61° 2θ in the XRD pattern of c-$Ti_3C_2T_x$—and its absence in the XRD pattern off-$Ti_3C_2T_x$, indicated that flakes in the f-$Ti_3C_2T_x$ films were more ordered parallel to the substrate than the c-$Ti_3C_2T_x$ flakes. The d-spacings of ~13-14 Å for, both c-$Ti_3C_2T_x$ and f-$Ti_3C_2T_x$, were calculated from the position of (001) peak. These values were significantly higher than the d-spacings (9.7 Å) calculated for MXene powders that were not delaminated. The XRD pattern of the electrodes containing c-$Ti_3C_2T_x$, carbon black and the PVDF binder (FIG. 2B) revealed the absence of the (110) peak. This somewhat unexpected result can be ascribed to the shearing of the MXene nanosheets during the fabrication of the electrode. This shear apparently reduced the intensities of the c-$Ti_3C_2T_x$ peaks in the XRD pattern diminishing the already weak signal from the (110) atomic planes. Using the Scherrer equation the c-$Ti_3C_2T_x$ powders were found to have aggregates with the thickness of ~16-17 layers of MXene. The aggregate thickness reduced to 8-9 layers in the electrodes.

Figure 3:
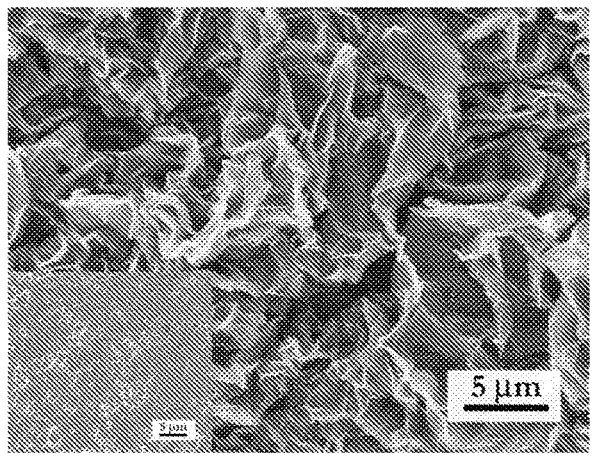
FIG. 3 are top view SEM images of c-$Ti_3C_2T_x$ flakes and f-$Ti_3C_2T_x$ flakes (inset).

Top view SEM images of c-$Ti_3C_2T_x$ powders (FIG. 3) and f-$Ti_3C_2T_x$ films (inset to FIG. 3) revealed that the former comprises a foam-like, three-dimensional (3D) interpenetrating porous structure. The microstructure off-$Ti_3C_2T_x$, on the other hand, was typical of filtered MXene films and showed how well the 2D flakes stacked on top of each other. Energy-dispersive X-ray spectroscopy analysis revealed no appreciable change in chemical composition off-$Ti_3C_2T_x$ and c-$Ti_3C_2T_x$ (Table 1), Specifically, no increase in chlorine ions content after crumpling was observed, indicating that enhancement of the electrochemical performance was mainly attributed to the mesoporous crumpled morphology of the material, and not to the changes in chemical composition.

TABLE 1

Chemical composition of crumpled and filtered MXene flakes determined from energy dispersive X-ray analysis. The results for C are included for completion's sake and are to be taken with a grain of salt

| Element | Crumpled MXene (c-$Ti_3C_2T_x$) Stoichiometry assuming Ti = 3 | Filtered MXene (f-$Ti_3C_2T_x$) Stoichiometry assuming Ti = 3 |
|---|---|---|
| Ti | 3 | 3 |
| C | 1.77 | 2.25 |
| O | 0.9 | 1.62 |
| F | 1.17 | 1.38 |
| Cl | 0.36 | 0.36 |

Figure 4:
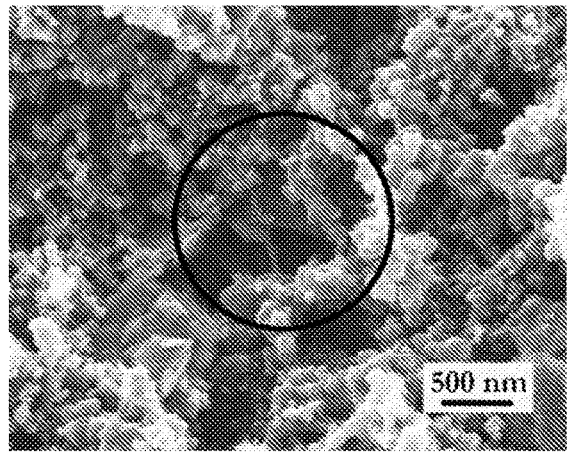
FIG. 4 is a top view SEM image of a c-$Ti_3C_2T_x$ electrode with 20% carbon black and 10% PVDF binder. Circle indicates vertically aligned nanosheets.

The basic premise of this work was that the open, porous architecture of the c-$Ti_3C_2T_x$ powder would facilitate electrolyte penetration and improve accessibility for $Na^+$ ions through the electrodes. It has been previously established that "card house" like morphologies of graphitic sheets in hard carbon show higher capacities than graphite in NIBs. A similar mechanism may also be at play in these c-$Ti_3C_2T_x$ electrodes. The SEM image of the electrode (FIG. 4, the area inside the circle) showed that even though the nanosheets were sheared and carbon black together with PVDF binder was added, the crumpled flake morphology, with random orientation, was still maintained, confirming that the disappearance of (110) peak from the XRD pattern was caused by a diminished intensity of the peaks and not from preferential alignment in the basal direction.

Figure 5A:
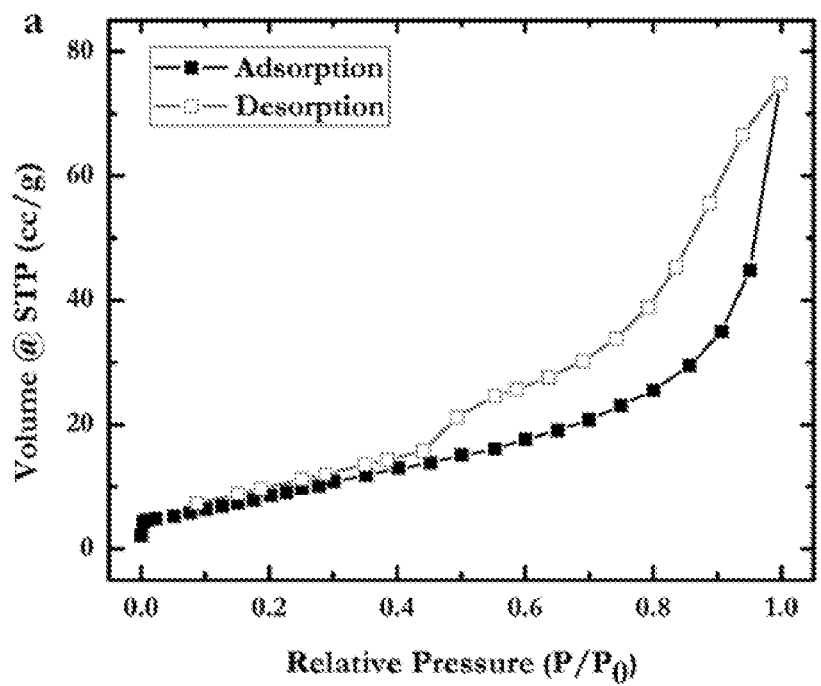
FIGS. 5A and 5B illustrate $N_2$ sorption/desorption curves (FIG. 5A) and pore size distribution (FIG. 5B) of c-$Ti_3C_2T_x$ powders.
Figure 5B:
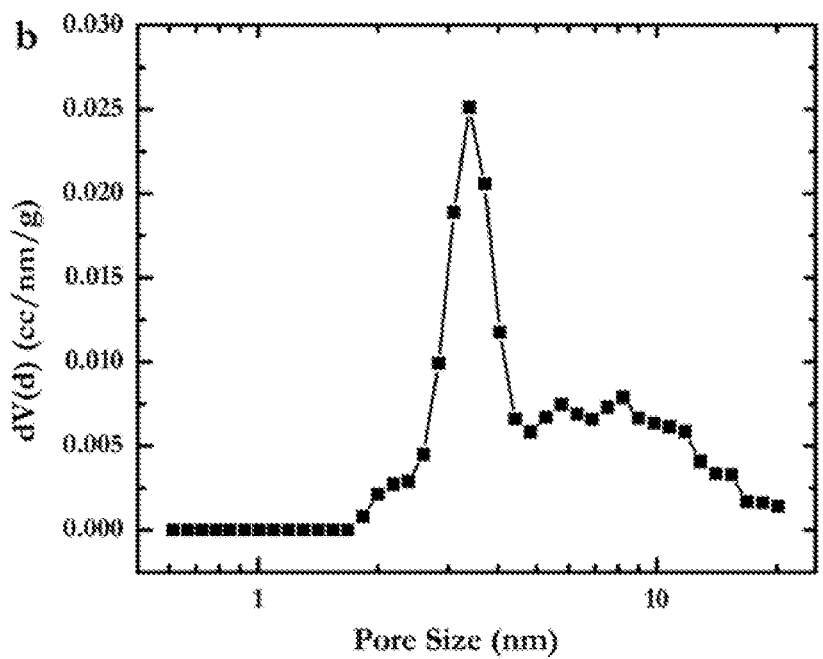

The open structure observed in the SEM images was further investigated by $N_2$ absorption/desorption (FIG. 5A). The isotherm shows a type-4 behavior indicating the presence of mesopores. The hysteresis loop further matched with H3-type loops, which corresponded to aggregates of plate like particles with slit pores, which is in agreement with the nanosheet morphology. The presence of mesopores is also confirmed by the pore size distribution (FIG. 5B), where a high concentration 3 to 5 nm pores was deduced. The surface area of c-$Ti_3C_2T_x$ was found to be 33 $m^2 \cdot g^{-1}$, which was comparable to that of etched but un-delaminated MXenes.

Example 2.4: Discussion: The acid-induced flocculation and crumpling of the 2D $Ti_3C_2T_x$ can be understood by considering the interaction between the charged species involved in the process, though the nature of the invention is not necessarily bound by the correctness of these hypotheses. Colloids based on $Ti_3C_2T_x$ are pH sensitive and below their isoelectric point the flakes can no longer form a stable suspension and as a result they crash out of solution. In a colloidal suspension, the MXene nanosheet surfaces are negatively charged due to the presence of the —O, —OH and —F functional groups. If the electrostatic repulsion between the layers is larger than the Van der Waals attraction the colloid is stable. Upon addition of acid, the $H^+$ ions presumably form an electric double layer reducing the negative surface charge, leading to rapid aggregation due to the Van der Waals attraction and eventually to complete flocculation. These observations are consistent with the Derjaguin, Landau, Verwey and Overbeek (DLVO) theory for colloid stability. Similar crashing phenomenon has been reported for colloidal suspensions of graphene oxide, kaolinite and aluminum oxide.

Figure 6A:
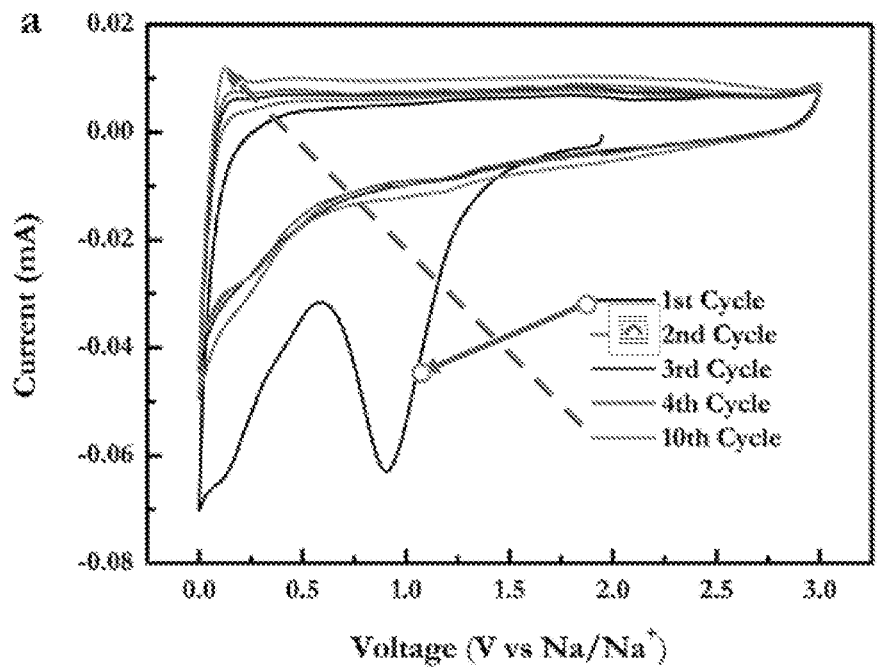
FIGS. 6A and 6B are cyclic voltammograms of the electrodes comprised of c-$Ti_3C_2T_x$ flakes with carbon black (FIG. 6A) and comparative CV's of $5^{th}$ cycle of c-$Ti_3C_2T_x$ alone (green), carbon black alone (red) and c-$Ti_3C_2T_x$ flakes with carbon black (blue) (FIG. 6B). Results in (FIG. 6B) are shown for the fifth $Na^+$ ion intercalation/extraction cycle. In all cases, the electrodes were cycled between 0.001 V and 3 V vs. $Na/Na^+$ at 0.2 mV $s^{-1}$.

Example 2.5: Electrochemical Results: Cyclic voltammetry (CV) was used to probe the intercalation of $Na^+$ ions into c-$Ti_3C_2T_x$ electrodes in a non-aqueous electrolyte. The average areal loading of the tested cells was around 0.3 $mg/cm^2$ and the average volumetric loading was around 0.4 $g/cm^3$. The irreversible anodic peak observed at 0.9 V in the first cycle (FIG. 6A) was believed to be due to the formation of a solid-electrolyte interphase (SEI) layer on the electrode surface. This peak is characteristic to $Ti_3C_2T_x$ MXene electrodes in Na-ion batteries during first discharge. Absence of this peak in further cycles indicated that the SEI formed was stable which helped the electrode retain its capacity over many cycles.

Figure 6B:
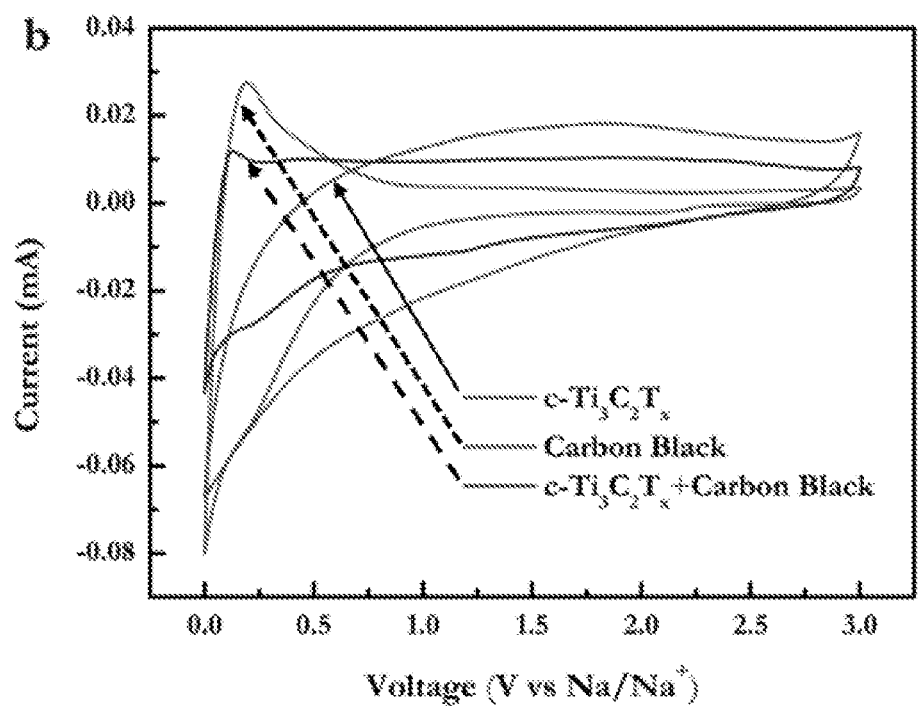
Figure 7A:
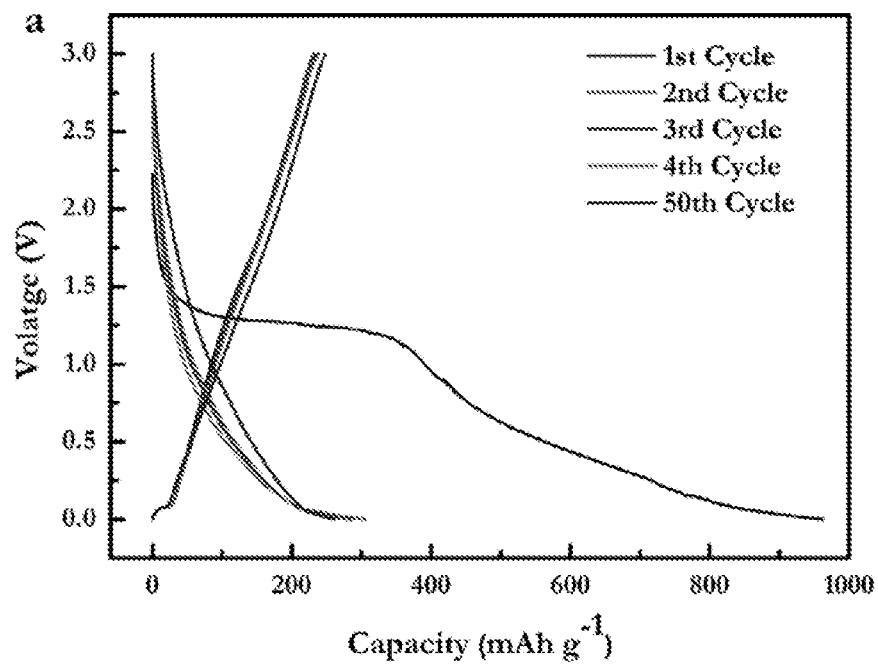
FIGS. 7A and 7B are charge/discharge curves of cells containing c-$Ti_3C_2T_x$ and 20 wt. % carbon black (FIG. 7A) and c-$Ti_3C_2T_x$ only electrodes (FIG. 7B).
Figure 7B:
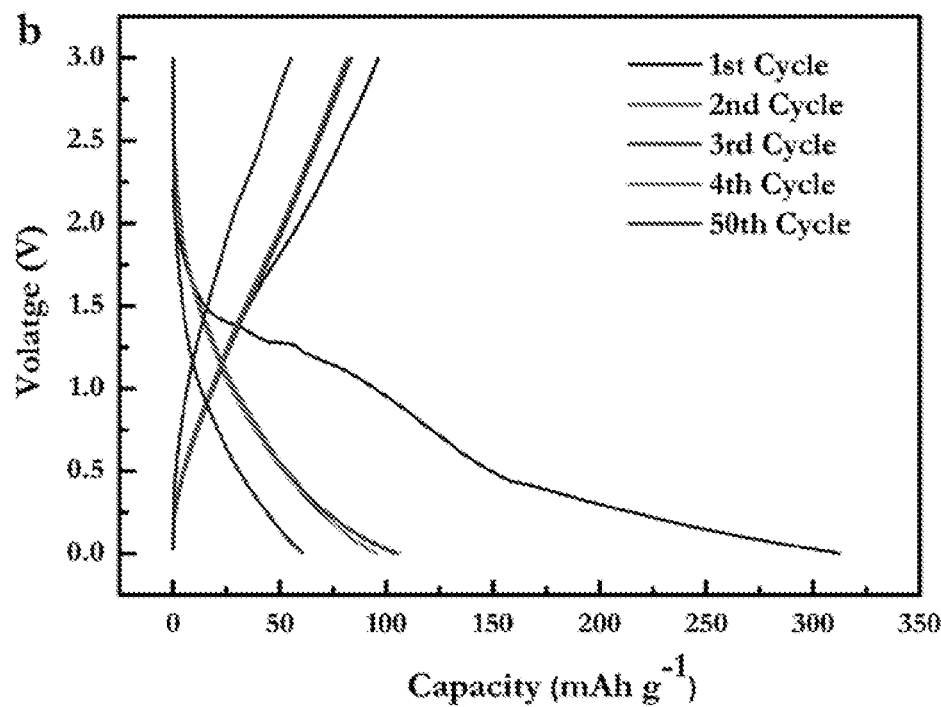

The anodic and the cathodic peaks around 0.1 V were attributed to the intercalation of $Na^+$ into the carbon black used as conductive additive. To verify this, the electrodes were cycled with, and without, carbon black; in the latter curves the aforementioned peaks are absent (FIG. 6B). After initial cycling, the peaks on the CV curve of the cells containing electrodes without carbon black disappeared as shown by the $5^{th}$ cycle curve in FIG. 6B.

Figure 8A:
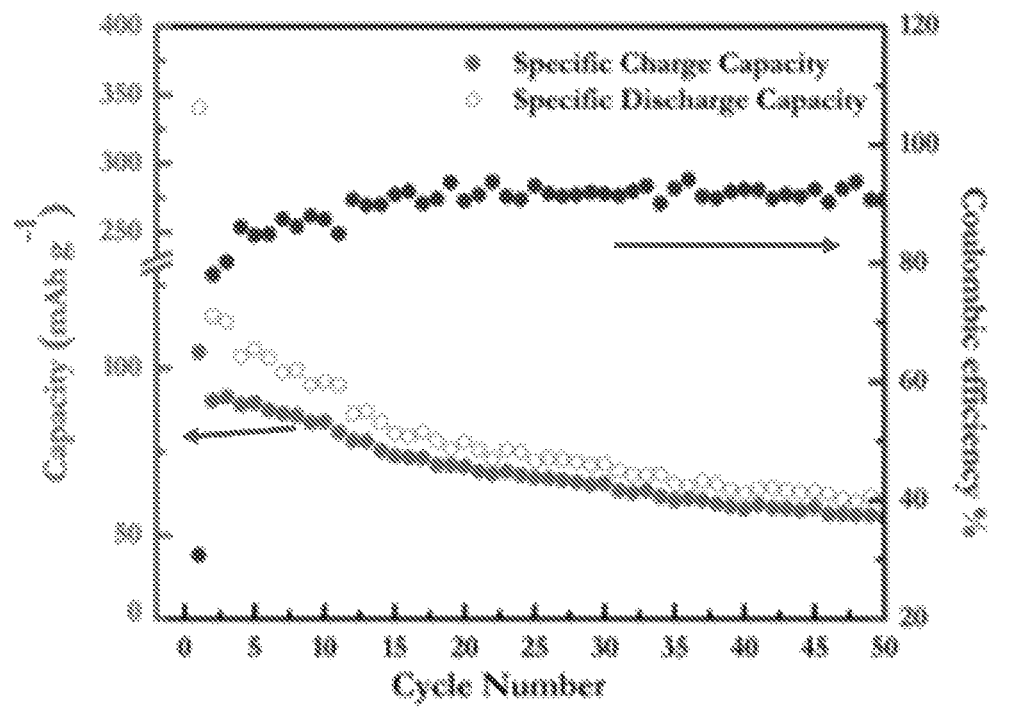
FIGS. 8A to 8C show cycling performance of Na-ion cells containing electrodes made with 10 wt. % PVDF and c-$Ti_3C_2T_x$ alone (FIG. 8A), carbon black alone (FIG. 8B), and f-$Ti_3C_2T_x$ (FIG. 8C). The data were acquired at a 20 mA·$g^{-1}$ current.
Figure 8B:
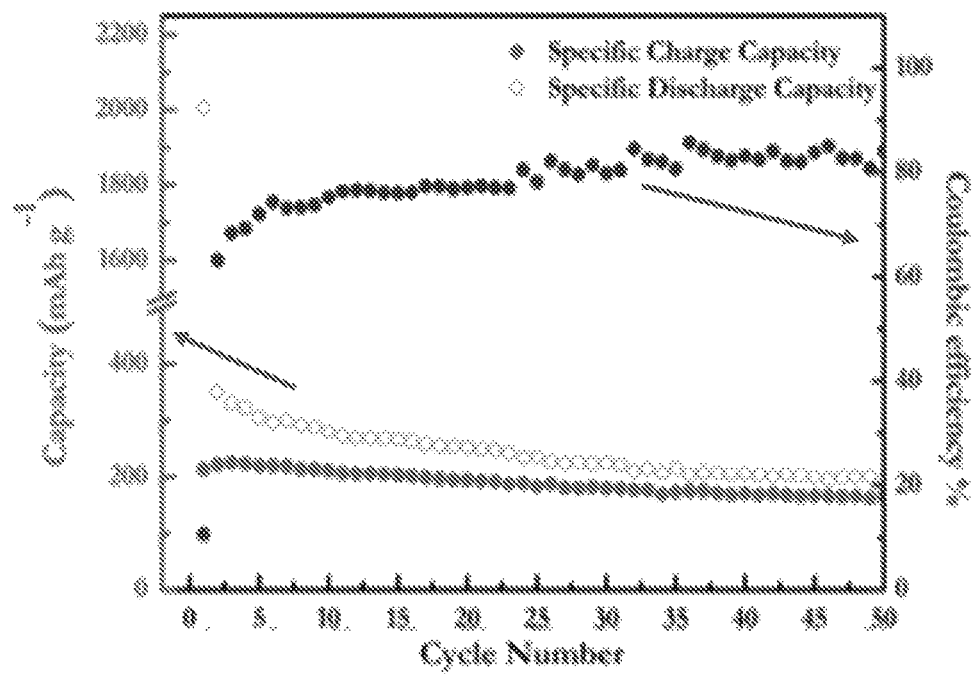
Figure 8C:
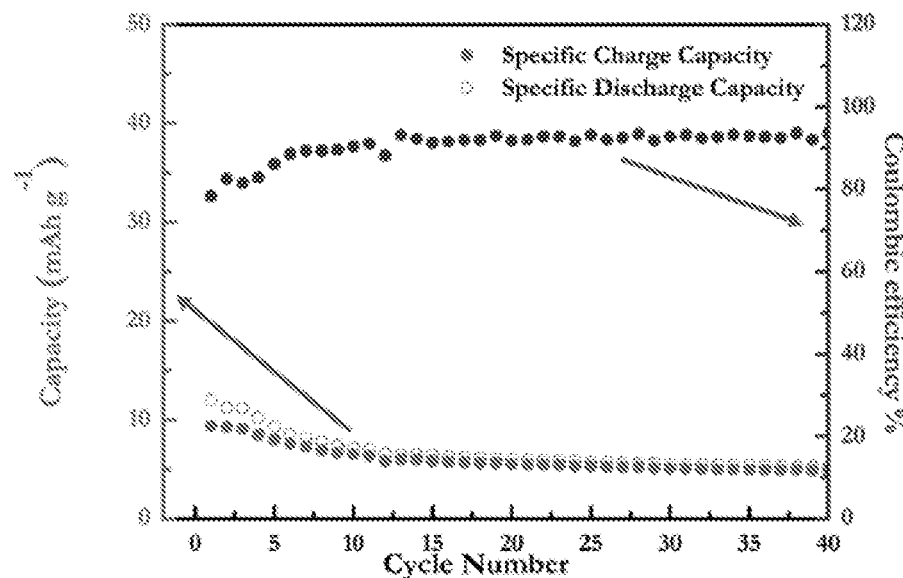

The addition of 20 wt. % carbon to electrodes nearly doubled the capacity of the c-$Ti_3C_2T_x$ electrodes and also improved its cycling performance (FIG. 8A). Even though individual MXene nanosheets are highly conducting, due to crumpling, there is poor electrical contact between the nanosheets which led to poor electronic conductivity within the electrode. The addition of carbon black solved this problem by creating more pathways for electrons transfer. On the down side, the addition of carbon black greatly increased the amount of Na irreversibly consumed in the first cycle presumably again due to the formation of a SEI on the carbon surface.

The crumpled MXene electrode exhibited an initial reversible capacity of 250 $mAh \cdot g^1$ at a current density of 20 $mA \cdot g^{-1}$ (FIGS. 8A-D), which is one of the highest capacities reported for any MXene phase in Na-ion electrochemical system to date (Table 2).

TABLE 2

Comparison of capacities of various Na—$Ti_3C_2T_x$ electrodes reported herein and in the literature.

| Material | $2^{nd}$ cycle capacity, $mAh \cdot g^{-1}$ | Current, $mA \cdot g^{-1}$ | Capacity after n-cycles, $mAh \cdot g^{-1}$ (cycle number) | Ref |
|---|---|---|---|---|
| c-$Ti_3C_2T_x$ | 300 | 20 | 250 (50) | This work |
| $Ti_3C_2T_x$ not delaminated | 150 | 20 | 100 (100) | [4] |
| $Ti_3C_2T_x$ | 150 | 100 | 80 (120) | [5] |
| $Ti_3C_2T_x$-CNT | 150 | 20 | 160 (100) | [6] |
| $Ti_3C_2T_x$ hollow spheres | 350 | 50 | 350 (1,000) | [7] |
| $Ti_3C_2T_x$ nanoribbons | 100 | 200 | 50 (500) | [8] |

[1] Tzenov N V., Barsoum M W. J Am Ceram Soc 2004; 83: 825-832.
[2] Shah S, Habib T, Gao H, et al. Chem Commun 2016; 53: 1-4.
[3] Ghidiu M, Lukatskaya M R, Zhao M-Q, et al.. Nature 2014;
[4] Kajiyama S, Szabova L, Sodeyama K, et al. ACS Nano 2016; 10: 3334-3341.
[5] Xie Y, Dall'Agnese Y, Naguib M, et al. ACS Nano 2014; 8: 9606-9615.
[6] Xie X, Zhao M-Q, Anasori B, et al. Nano Energy 2016; 26: 513-523.
[7] Zhao M-Q, Xie X, Ren C E, et al. Adv Mater 2017; 1702410.
[8] Lian P, Dong Y, Wu Z-S, et al. Nano Energy 2017; 40: 1-8.

As shown in FIG. 8A, after the first 10 cycles the c-$Ti_3C_2T_x$ electrode exhibited stable electrochemical performance with capacities in the $10^{th}$ and $50^{th}$ cycles of 248 $mAh \cdot g^{-1}$ and 246 $mAh \cdot g^{-1}$, respectively. The low Columbic efficiency of the first few cycles was attributed to SEI formation, the irreversible trapping of $Na^+$ ions in the material, and, possibly a reaction between the $Na^+$ ions in electrolyte with the —O, —OH and —F functional groups present on the surface of MXene nanosheets. The gradual increase in Columbic efficiency to around 95% after 50 cycles was observed (FIG. 8A), and is in agreement with previous reports. Additionally, others have shown that solvent molecules tend to intercalate irreversibly between the MXene layers along with $Na^+$ ions, hampering the interconnectivity of MXene nanosheets. The 5 Å increase in d-spacing after cycling (FIG. 2B) suggested that a similar phenomenon occurs in the case of these c-$Ti_3C_2T_x$ electrodes.

Figure 8D:
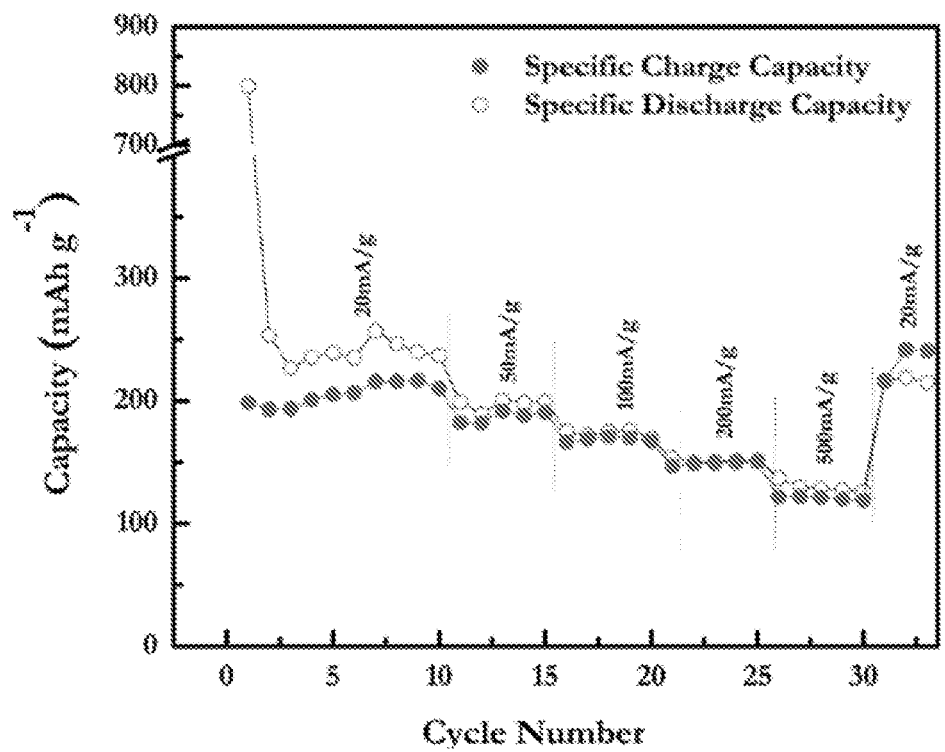
FIG. 8D shows rate performance at currents densities of 20, 50, 100, 200, and 500 mA·$g^{-1}$ of Na-ion cells containing electrodes made with 70% c-$Ti_3C_2T_x$, 20% carbon black, 10 wt. % PVDF.

The evaluation of the rate performances of c-$Ti_3C_2T_x$ electrodes (FIG. 8D) revealed that the discharge capacity dropped down from 240 mAh·$g^{-1}$ at 20 mA·$g^{-1}$ to 190 mAh·$g^{-1}$ at 50 mA·$g^{-1}$, 170 mAh·$g^{-1}$ at 100 mA·$g^{-1}$, 150 mAh·$g^{-1}$ at 200 mA·$g^{-1}$, and 120 mAh·$g^{-1}$ at 500 mA·$g^{-1}$. When the current was decreased to its initial value of 20 mA·$g^{-1}$, the specific capacity returned to 240 mA·$g^{-1}$ (FIG. 8D).

It is important to note that when the process was repeated with nitric or sulfuric acid, the same crumpling phenomenon was observed. The crumpling, however, seems to be readily induced by decreasing the pH, but with mineral acids. Acetic acid ($CH_3COOH$) or propionic acid ($C_2H5COOH$), on the other hand, does not work. Also, the crumpling could be reversed by placing the powders in neutral water.

Example 3. Mesoporous MXene Powders Synthesized by Alkali-Induced Crumpling

Introduction: The metallic conductivity and hydrophilicity of the two dimensional, 2D, transition metal carbides and carbonitrides, known as MXenes, have rendered them attractive for a large number of applications. In some applications, flat 2D flakes are required; in others, crumpled flakes are more useful. In addition to acid-induced flocculation, the present disclosure describes that increasing the pH of a $Ti_3C_2T_x$ aqueous colloidal solution-using a variety of alkali metal, alkali earth metal or organic hydroxides—the 2D flakes rapidly coagulate into a hierarchically porous, 3D network comprised of crumpled, c-$Ti_3C_2T_x$, cation intercalated nanosheets. To demonstrate the advantages of this architecture, anodes were made and tested and shown to be better in capacitance and rate performance than multilayered powders of the same composition. One Na-cell was cycled 1000 times at a current of 1.5 A/g with little degradation.

Example 3.1 Synthesis (FIG. 9A): Powders of $Ti_3AlC_2$ were was prepared by mixing commercial $Ti_2AlC$ powders (Kanthal, Sweden) with TiC in a 1:1 molar ratio (after adjusting for the ≈10 wt % $Ti_3AlC_2$ already present in the commercial powder) followed by ball milling for 1 day. The mixture was placed in an alumina boat and heated at a rate of 5° C./min under continuous Ar flow to 1350° C. and held at that temperature for 2 h. The resulting loosely sintered brick was ground with a TiN-coated milling bit and sieved through a 400 mesh sieve producing a powder with a particle size less <38 μm.

Figure 9B:
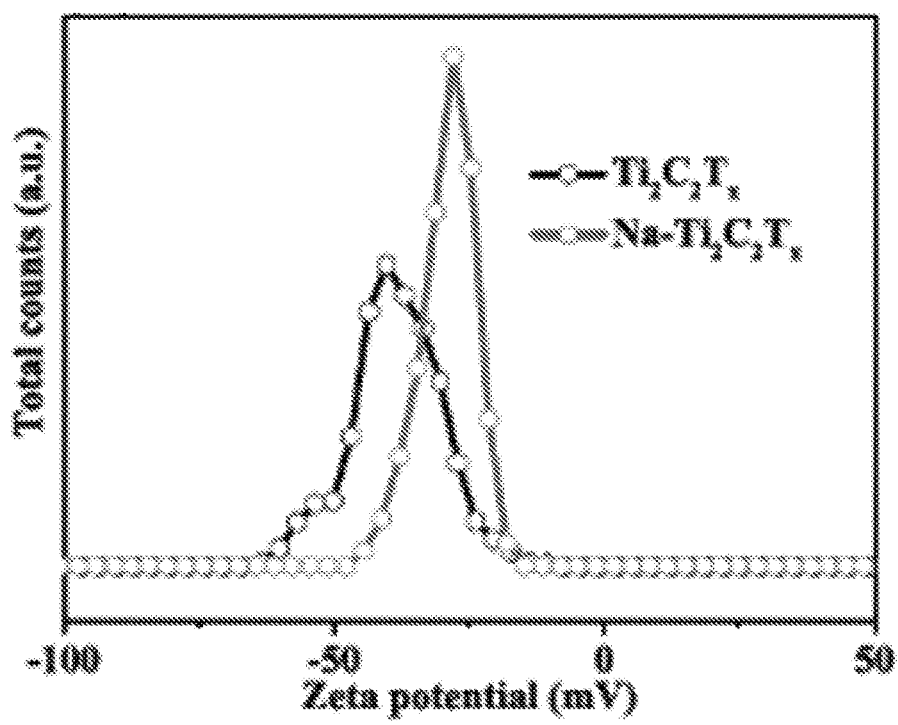
FIG. 9B shows Zeta potentials of $Ti_3C_2T_x$ and Na-c-$Ti_3C_2T_x$ 3D framework at pH 7.
Figure 9C:
FIG. 9C are photographs of $Ti_3C_2T_x$ MXene colloidal suspensions (left), and Na-c-$Ti_3C_2T_x$ after flocculation (middle and right).

To prepare suspensions of delaminated $Ti_3C_2T_x$ MXenes, typically, 0.99 g of LiF (Alfa Aesar, 98.5%) was dissolved in 10 mL of 12 M HCl. Then 1 g of sieved $Ti_3AlC_2$ powders was added. The mixture was kept at 35° C. for 24 h while stirring with a magnetic stirrer. The resulting solid residue was washed several times with deionized water and centrifuged at a speed of 3500 rpm (3 min for each cycle) until the pH of the supernatant was about 6. The resulting powder was mixed with about 40 ml of distilled water and sonicated for 1 h under an ice-bath through which Ar gas was bubbled. The resulting solution was centrifuged for 40 min at a speed of 3500 rpm. Finally, the supernatant colloidal suspension, containing delaminated, mostly single, 2D $Ti_3C_2T_x$ flakes, was obtained. A typical transmission electron microscope, TEM, image shows the $Ti_3C_2T_x$ layers to be mostly single layered, flat and transparent, confirming their 2D nature. At this stage it is fairly well established that because of the surface functional groups (e.g., —O, —OH, and —F), the as-prepared $Ti_3C_2T_x$ in water was negatively charged which in turn results in stable colloidal solutions. (left panel in FIG. 9C) Herein the zeta potential of the $Ti_3C_2T_x$ and the Na-c-$Ti_3C_2T_x$ flakes (see below) were measured to be ≈−40 mV and −25 mV (FIG. 9B), respectively. These values are considered representative of other crumpled MXene materials, which may exhibit zeta potentials in a range of from −15 to 25 mV.

To determine the volumetric density, a syringe was used to pull out 3 mL of the colloidal suspension to filter a film. The remaining suspension was stored in sealed bottles under Ar for further experiments. It was weighed after drying in air. For all the work carried out herein, the as-produced $Ti_3C_2T_x$ MXene solution concentration was about 15 mg $ml^{-1}$.

This colloidal suspension was then mixed, at room temperature, with 1 M solutions of KOH, LiOH and NaOH. And also mixed with $NH_4OH$ (25~28%) and TBAOH (1.5 M). For 2 ml MXene solution, adding about 2 ml alkaline solutions. This resulted in the immediate flocculation of the $Ti_3C_2T_x$ nanosheets. The flocculated deposit was separated from its solution by centrifugation. They were then washed with water one time and ethanol until neutral without shaking very strongly. The resulting materials were dried in a dryer.

The addition of the 1M M'OH to the stable colloidal solutions described above induced the flakes to rapidly (<1 min) flocculate/coagulate/crash out of solution into what appears to be larger flakes. This was true of sodium hydroxide, NaOH (two right panels in FIG. 9C), lithium hydroxide, LiOH, potassium hydroxide, KOH and TBAOH (not shown).

Interestingly, adding 25-28% ammonium hydroxide, $NH_4OH$, did not induce the flocculation for reasons which are not entirely understood.

Example 3.2. Materials Characterization

Figure 10:
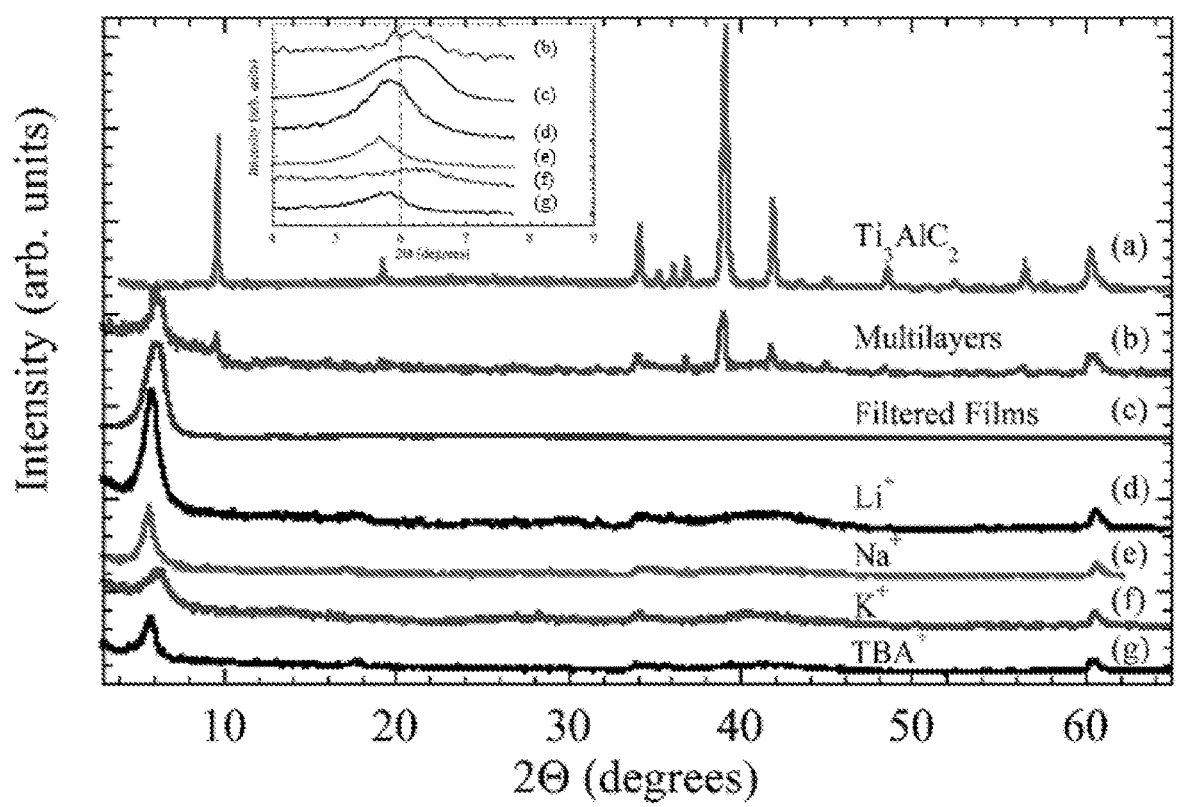
FIG. 10 illustrates XRD patterns of a) $Ti_3AlC_2$, b) $Ti_3C_2T_x$ multilayers, c) drop cast film, d) Li-c-$Ti_3C_2T_x$ e) Na-c-$Ti_3C_2T_x$, f) K-c-$Ti_3C_2T_x$, g) TBA-c-$Ti_3C_2T_x$. Note peak at 2□≈61° in all but c. Inset shows low angle results. Dashed line is a guide to the eye.

Powder X-ray diffraction (XRD): FIG. 10(a-g), respectively, show the XRD patterns of $Ti_3AlC_2$, $Ti_3C_2T_x$ multilayers, drop cast film, Li-c-$Ti_3C_2T_x$, Na-c-$Ti_3C_2T_x$, K-c-$Ti_3C_2T_x$ and TBA-c-$Ti_3C_2T_x$. Form these results it is clear that, i) $Ti_3AlC_2$ is fully converted to its MXene; ii) with the notable exception of the drop cast film (FIG. 2c) all other patterns exhibit a peak at 2θ≈61. This implies that, in all but the drop cast film, a fraction of the basal planes were not parallel to the substrate which is consistent with a multilayer and/or crumpled morphology, iii) Half the c-lattice parameter, dc/2, appears to be a weak function of the nature of the cations between flakes. After etching the multilayers, dc/2 was 14.4 Å. After flocculation with LiOH, NaOH, KOH, or TBAOH, not only do the peaks sharpen, but as importantly, downshift to a 2θ°, which corresponds to a dc/2 of 15.5 Å. It has previously been shown that this value of dc/2 corresponds to ≈3 water layers between the $Ti_3C_2T_x$ layers and was, more or less, independent of the nature of the intercalating cation. The dc/2 value of 15.5 Å is one of the highest values reported for an alkali cation intercalated $Ti_3C_2T_x$.

The structure and morphology of the materials were examined as described above. Representative results are shown in FIGS. 11A-J.

Atomic force microscopy (AFM) images were obtained by Bruker DI MultiMode-8 system under tapping mode. The flocculation products were ground into a fine powder and then dispersed in water under ultrasound. Water was then added to about 2 ml of supernatant to create a very dilute suspension. A drop of that dilute suspension was dropped on a clean mica sheet, and its thickness was measured.

Brunauere-Emmete-Teller (BET) isotherms and specific surface area (BET surface area) were performed on a Kubo X1000 instrument at 77 K. Pore size distribution and pore volume were derived using the analysis methods of BarretteJoynereHalenda (BJH).

Example 3.3. Electrochemical Characterization

Electrochemical Measurements of c-$Ti_3C_2T_x$ as a Na Ion Electrode: The electrochemical tests were performed at room temperature using coin cells (CR2025) on LAND CT2001A, with a cutoff voltage of 0.01-3.00 V vs. Na/Na$^+$. The anodes were prepared by mixing, dried Na-c-$Ti_3C_2T_x$ powders, conductive carbon black, and sodium carboxymethyl cellulose (CMC) in a 80:10:10 weight ratio in a mortar and pestle. Deionized water was used as the solvent to make a homogeneous slurry. The resulting slurry was uniformly pasted on a Cu foil and dried at 60° C. for 12 h and then at 120° C. for another 12 h in a vacuum oven. Final cell assembly was carried out in an Ar-filled glovebox. The loading of the active material was about 0.8 mg cm$^{-2}$. Here Na metal functioned as both counter and reference electrodes. A 1 M $NaClO_4$ in a mixture of EC/dimethyl carbonate (1:1 by volume) with 5 wt. % fluoroethylene carbonate (FEC) acted as the electrolyte. The galvanostatic charge/discharge performance was investigated with a voltage cut off of 0.01-3.00 V (vs. Na/Na$^+$). CV curves were measured by a CHI-760E electrochemical workstation with a scan rate of 0.2 mV s$^{-1}$.

Example 3.3. Results and Discussion

Figure 11A:
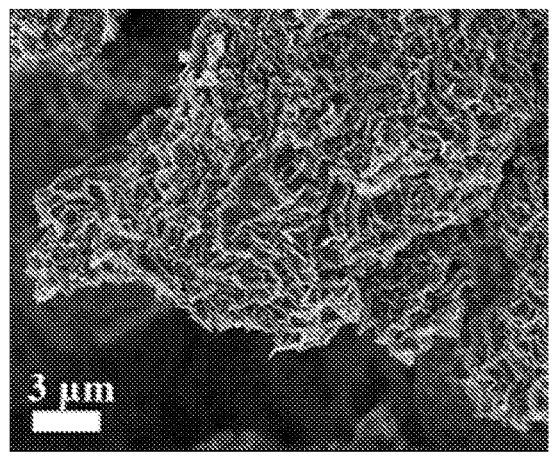
FIGS. 11A to 11F show low and high magnification (FIGS. 11A-C) SEM and (FIG. 11DF) TEM images of Na-c-$Ti_3C_2T_x$ flocculated networks. Inset in FIG. 11E shows a SAED pattern.
Figure 11B:
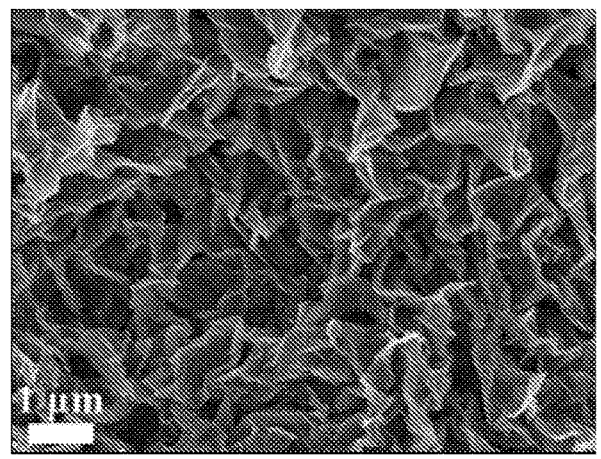
Figure 11C:
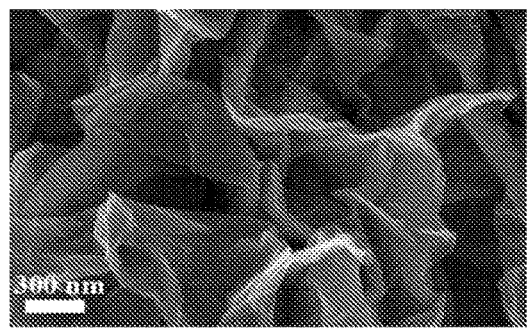

An important aspect of this work is the finding that when the flakes flocculate, they crumpled and settled into an interpenetrating, open, foam-like, 3D architecture (FIGS. 11A-C). Higher magnification SEM images of the Na-c-$Ti_3C_2T_x$ flakes (FIG. 11C) revealed that the porous 3D architecture consists of wrinkled/crumpled, interpenetrating, MXene nanosheets, creating many irregular pores with diameters between 100-400 nm (FIG. 11C). Moreover, it is clear that the pore walls were quite thin and were comprised of a few individual flakes.

Whether KOH or LiOH solutions were used instead, there were no apparent differences in the final 3D networks obtained (compare the SEM micrographs shown in FIGS. 11A-C to those in FIGS. 12A-D).

Figure 11D:
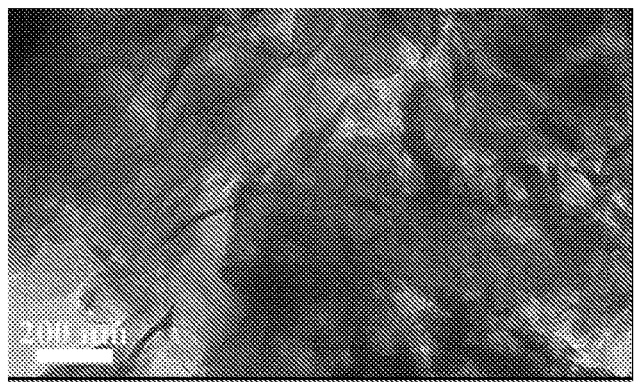
Figure 11E:
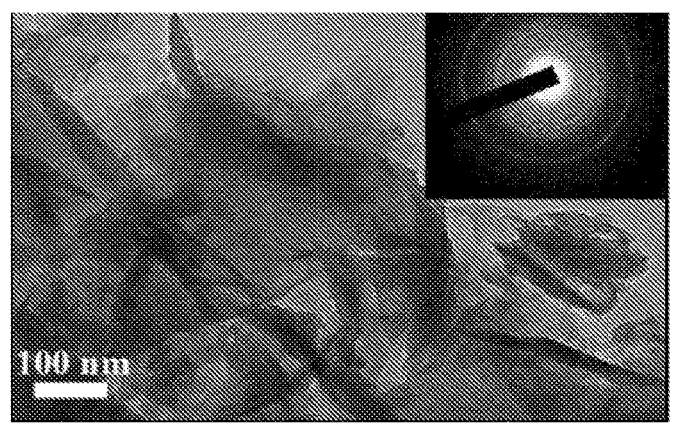
Figure 11F:
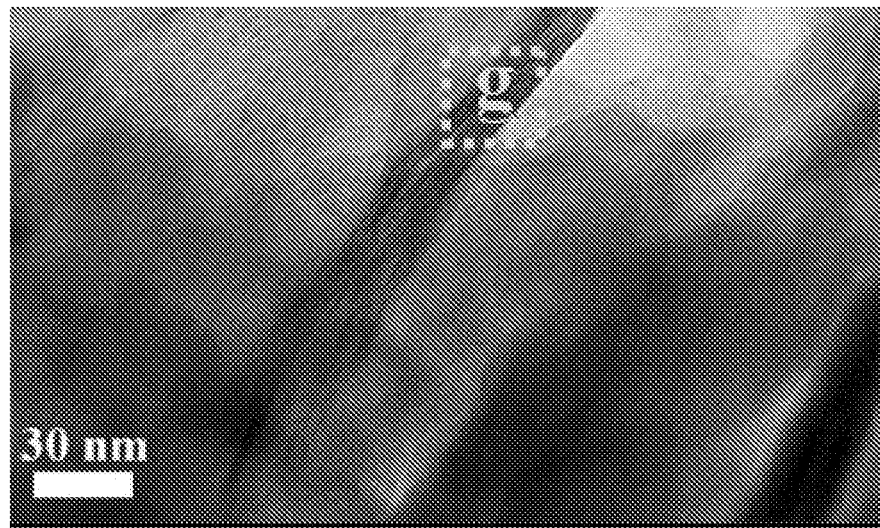
Figure 11G:
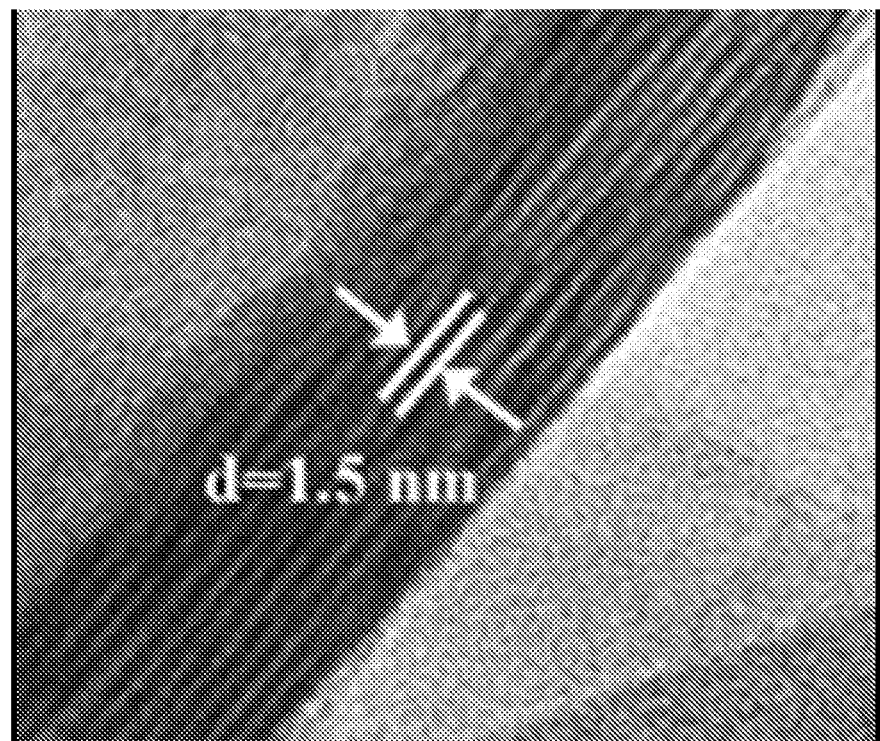
FIG. 11G shows a high magnification TEM image of the region labeled (g) is shown in FIG. 11F.

FIG. 11D-E shows transmission electron microscope (TEM) images of flocculated Na-c-$Ti_3C_2T_x$. Here again, the crumpled structures hade many wrinkles and folds, as well as, many irregular pores. The selected-area electron diffraction pattern (SAED), shown in FIG. 11E, exhibited a series of concentric diffraction rings, that were attributable to the 2D hexagonal lattice of the nanosheets. Furthermore, the higher magnification TEM images (FIGS. 11F-G), showed that the number of restacked nanosheets in the walls was of the order of 10. Applying the Scherer formula to the most intense basal peaks in FIG. 10, yielded a value of ≈13 nm for the average thickness of the particle dimension along [0001]. This result confirmed that the number of individual MXene layers in the walls, between the pores is of the order of 10-15. At 15 Å, the basal spacing between the layers obtained from FIG. 10, trace (g), was consistent with the value of 15.5 Å calculated from the XRD results.

Figure 11H:
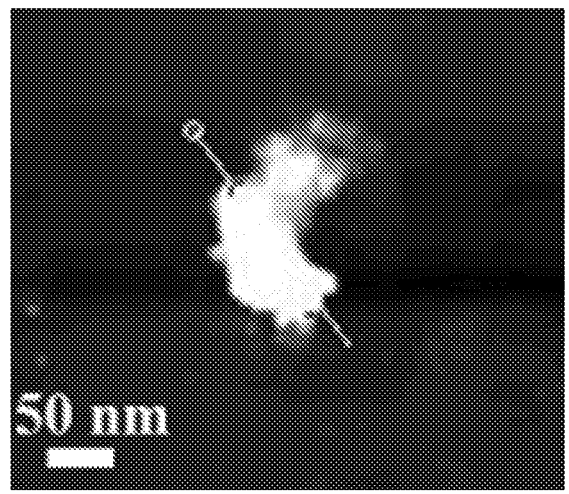
FIG. 11H shows an AFM image and, FIG. 11I shows a height profile measured along the white line shown in FIG. 11H.
Figure 11I:
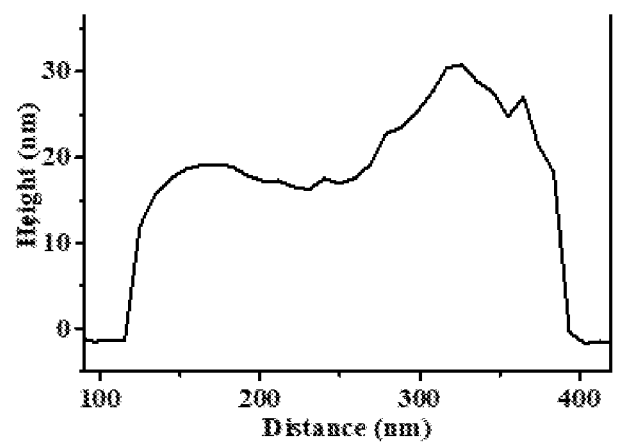
FIG. 11J shows an SEM image and elemental maps of Ti, C and Na in Na-c-$Ti_3C_2T_x$ flocculated network.

In addition, the corrugations of the restacked nanosheets were investigated by atomic force microscopy (AFM), see FIG. 11H, J. The AFM height profile measured along the white line shown in FIG. 11I showed that the $Ti_3C_2T_x$ flakes were ≈20 nm thick (FIG. 11F) near one edge and ≈30 nm near the other edge. It is fairly well established that the thickness of an individual $Ti_3C_2T_x$ flake is ≈1 nm, but when the water between the layers and terminations are taken into account, the distance between layers is closer to 1.5 nm. It follows that the AFM height profile corresponds to roughly 13 MXenes layers on the thinner side and ≈20 on the thicker side. These values are in good agreement with the TEM results and the results obtained from the Scherrer formula. To summarize this section: It is reasonable to assume that the average number of individual $Ti_3C_2T_x$ flakes in our porous 3D networks' walls is ≈15. Compared to the architecture obtained when hollow spheres are burned out of $Ti_3C_2T_x$ films, our walls are slightly thicker.

Figure 13A:
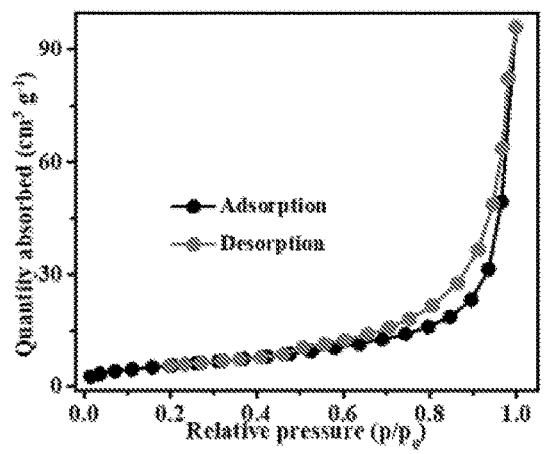
FIG. 13A are $N_2$ adsorption-desorption isotherms and FIG. 13B is a pore distribution curve calculated by the BJH method.
Figure 13B:
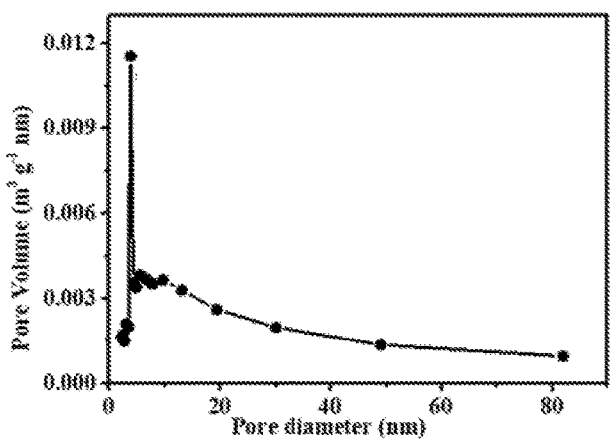

FIG. 13A plots the nitrogen gas, $N_2$, isotherms of the Na-c-$Ti_3C_2T_x$ flakes, that exhibited distinct hysteresis loops in the range of 0.5-1.0 P/P$_0$, suggesting the presence of a mesoporous structure. Just as the corresponding pore size distributions (FIG. 13B), there was a spike around 4 nm. The BET surface area of the Na-c-$Ti_3C_2T_x$ was calculated to be 21.4 m$^2$ g$^{-1}$. This value was not much different than the values obtained for accordion-like MXene powders obtained after etching by HF.

It is well-established that when multilayered MXene flakes are allowed to settle and restack into thin films for example, the resulting electrode architectures are densely packed that do not allow efficient/easy ion penetration from the electrolytes into the electrode. While several strategies, as described elsewhere herein, have been used to prevent such stacking, the results of electrochemical testing reported here show that the open, porous architectures of the present materials as-prepared provide improved electron transport and ion accessibility to redox-active sites, thus enabling fast electrochemical reactions leading to high power densities. This is most effectively shown by electrochemical measurements to demonstrate that the performance of our M'-c-$Ti_3C_2T_x$ powders—when mixed with carbon black and a carboxymethyl cellulose binder—in a Na-ion cell is better than $Ti_3C_2T_x$ multilayers produced by simply etching in HF or filtered films.

Figure 14A:
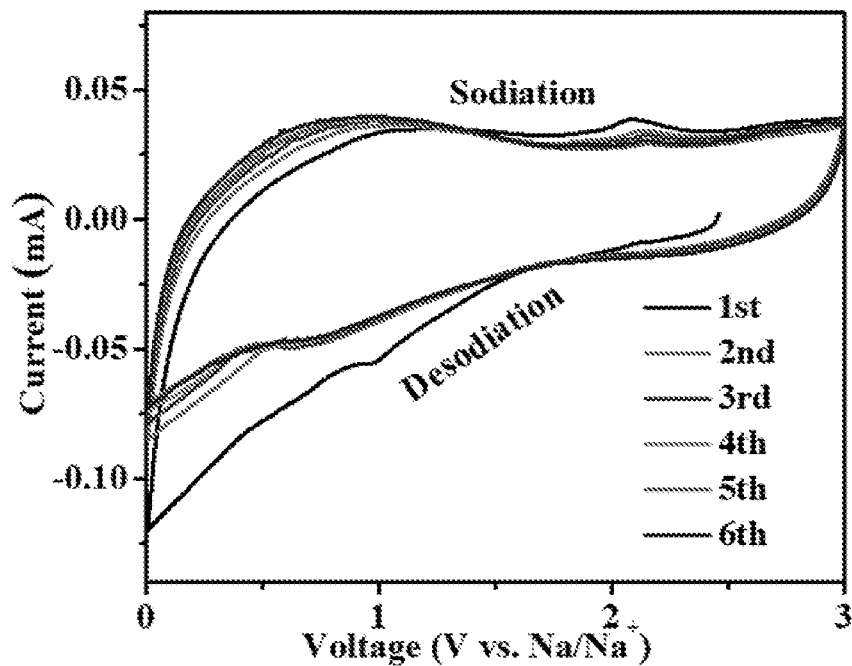
FIGS. 14A to 14E illustrate certain electrochemical characterizations of electrodes in Na-ion cells.

FIG. 14A shows cyclic voltammetry (CV) scans of a Na-c-$Ti_3C_2T_x$ electrode measured at 0.2 mV s$^{-1}$. The cathodic peak observed at 1.0 V during the first sodiation cycle corresponds to Na$^+$ ions intercalation. The increased negative current below 1.0 V in this first sodiation cycle reveals the formation of a solid electrolyte interphase (SEI) film caused by the electrolyte decomposition or other irreversible reactions. From the second cycle on, this peak shifts to a lower voltage of ≈0.62 V, which is lower than that previously reported for $Ti_3C_2T_x$ materials, such as 1.1 V for alkalized $Ti_3C_2T_x$ and maybe attributed to the super-expanded interlayer spacing of ~31 Å.[26b] A pair of cathodic/anodic peaks—located at around 2.15 V versus Na/Na$^+$, corresponding to the Na$^+$ insertion/extraction from the electrodes—are relatively broad, indicating non-diffusion limited and pseudocapacitive mechanism of Na-ion storage at the surface of MXene flakes.[14c]

Figure 14B:
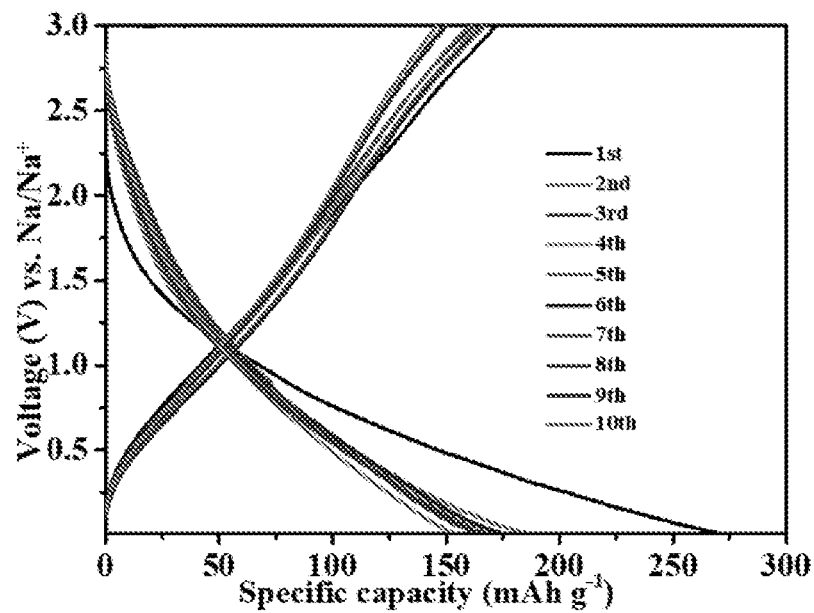

FIG. 14B shows discharge/charge curves in the voltage range of 0.01-3.0 V at a current density of 25 mA·g$^{-1}$. In the first cycle, the Na-c-Ti$_3$C$_2$T$_x$ electrode exhibited a discharge capacity of 267 mAh·g$^{-1}$. In the second cycle the specific capacity dropped down to 170 mAh·g$^{-1}$ and continued to slowly decrease in further cycles. The galvanostatic discharge/charge curves do not display a plateau region, indicating that the charge storage mechanism is most probably capacitive.[27] Moreover, after ten cycles, the charge-discharge curves showed better capacity retention, indicating better reversibility of the electrode/ion interaction processes.

Figure 14C:
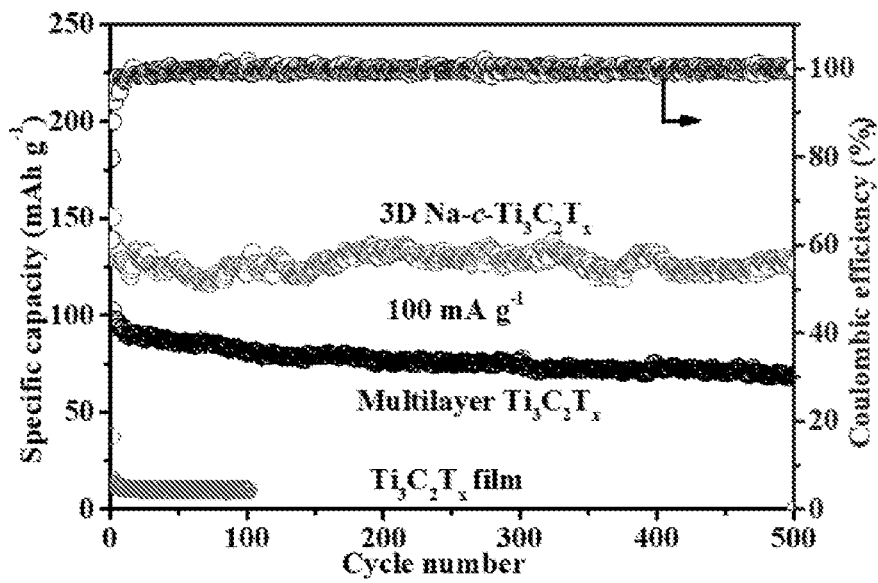
Figure 14D:
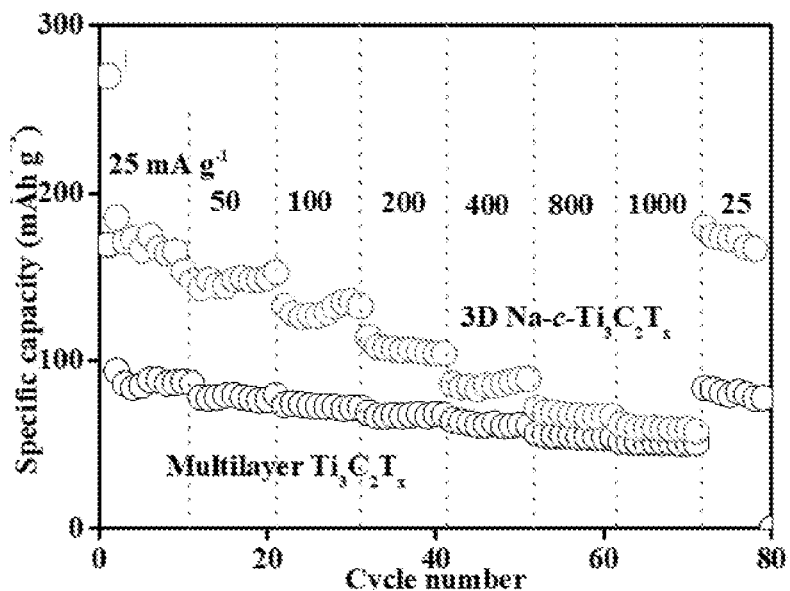
Figure 14E:
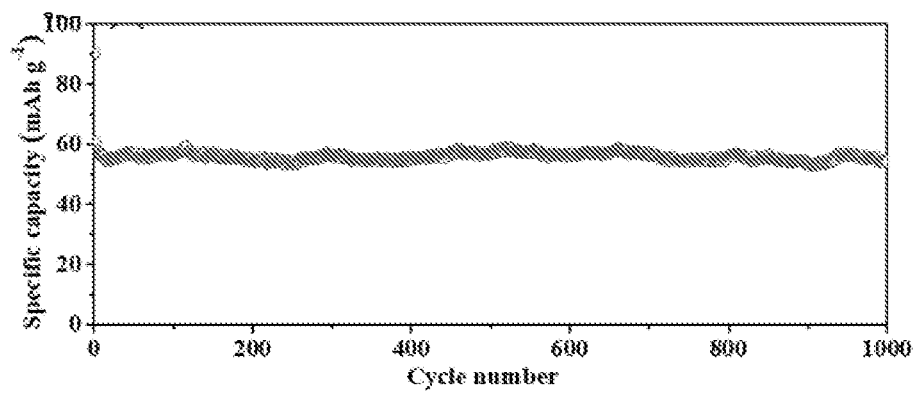

Further cycling tests were carried out to investigate the cyclability of 3D Na-c-Ti$_3$C$_2$T$_x$ electrode. FIG. 14C shows the specific capacity of three cells with different Ti$_3$C$_2$T$_x$ electrodes—3D Na-c-Ti$_3$C$_2$T$_x$, multilayers and a filtered film—cycled at 0.1 Ag$^{-1}$ for 500 cycles. The worst performing electrode was the filtered film, the best was 3D Na-c-Ti$_3$C$_2$T$_x$ which demonstrated outstanding cycling stability and maintained a capacity of 130 mAh·g$^{-1}$ after 500 cycles. The electrode made of the multilayer Ti$_3$C$_2$T$_x$ powder showed in-between performance (FIG. 14C). The average discharge capacities of our Na-c-Ti$_3$C$_2$T$_x$ electrode were calculated to be 172.5, 148.3, 130.4, 108.7, 87.5, 68.8 and 61 mAh·g$^{-1}$ at current densities of 25, 50, 100, 200, 400, 800 and 1000 mA·g$^{-1}$, respectively (FIG. 14D). The specific capacity increased back to 170.5 mAh·g$^{-1}$ when the current density was reduced to 25 mA·g$^{-1}$, indicating the ability of the crumpled MXene electrodes to tolerate higher currents. That capability and excellent reversibility is even better demonstrated by the results shown in FIG. 14E, where a capacity of 54 mAh·g$^{-1}$ was maintained at a current density of 1.5 A/g for 1000 cycles (FIG. 14E). These values are more reminiscent of supercapacitors than batteries.

Figure 11J:
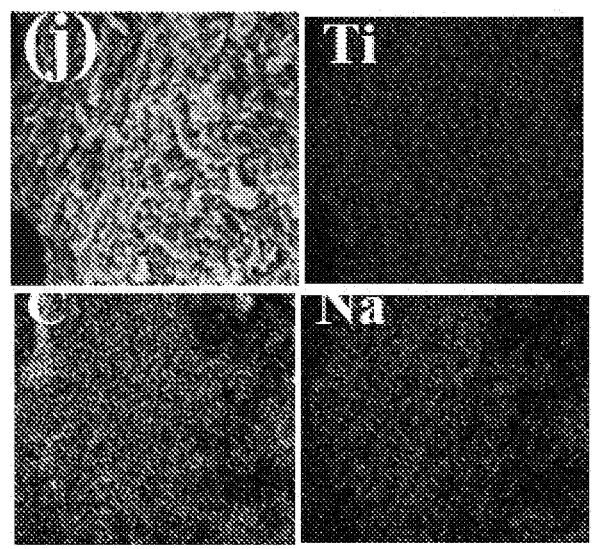
Figure 12A:
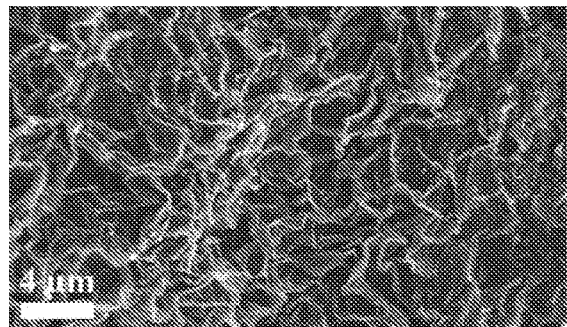
FIGS. 12A to 12D show low and high magnification SEM micrographs of products obtained when LiOH (FIGS. 12A and 12B) and KOH (FIGS. 12C and 12D) solutions are added to a colloidal suspension of $Ti_3C_2T_x$.
Figure 12B:
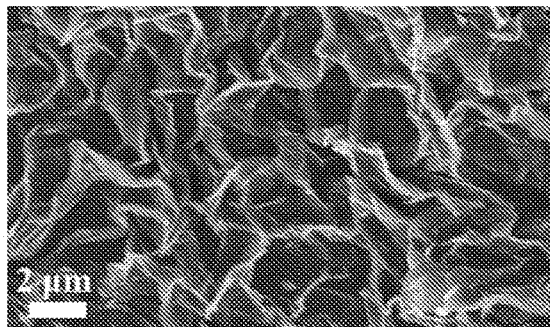
Figure 12C:
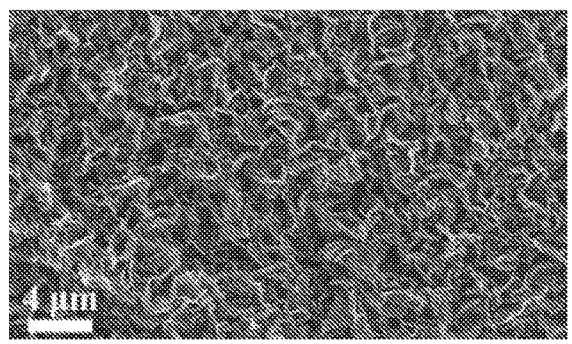
Figure 12D:
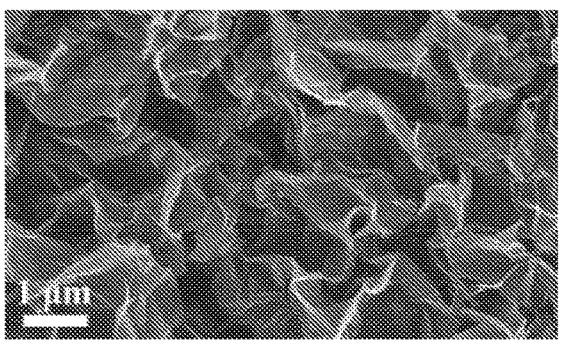

The relatively low—for MXenes—first cycle irreversibility and the excellent cycling performance stand out as exceptional and unexpected. Elemental mapping of Na-c-Ti$_3$C$_2$T$_x$ confirmed the homogeneous distribution of Ti, and C and Na (FIG. 11J). This was corroborated by the energy-dispersive X-ray spectroscopy (EDS) spectrum of Na-c-Ti$_3$C$_2$T$_x$), which showed that the sample consisted of Ti, C, Na as well as other surface terminations elements (O, Cl and F). The atomic ratio of Na was ≈3% (Table 3). In general, the alkali content was quite low in the electrodes studied. Their small concentration is thus not believed to affect the measured capacitances compared to the pre-intercalated Na ions in the electrolyte.

TABLE 3

Elements contents of Na—Ti$_3$C$_2$T$_x$ flocculation
with NaOH solution obtained from EDS spectrum.

| Elements | C | O | F | Na | Cl | Ti | Total |
|---|---|---|---|---|---|---|---|
| wt % | 9.18 | 11.92 | 6.43 | 2.34 | 3.56 | 66.58 | 100.00 |
| Atomic ratio (%) | 22.22 | 21.66 | 9.84 | 2.96 | 2.92 | 40.41 | 100.00 |

That is not to imply that the role of pre-intercalated alkali ions is unimportant, however. Large irreversible losses during the first cycle are more often encountered when MXenes electrodes are tested. For example, where c-Ti$_3$C$_2$T$_x$ flakes were induced to crumple by lowering the pH—i.e. in the absence of Na$^+$ cations—and using electrodes that are comparable to the ones tested here the first cycle capacity was ≈1000 mAh·g$^{-1}$. Here the corresponding value is 275 mAh·g$^{-1}$ (FIG. 14B). Said otherwise pre-sodiation of the electrode that occurs during the crumpling process when NaOH is used appears to mitigate irreversible cationic losses in the first cycle. The technological importance of this result cannot be overemphasized. As importantly, this electrode demonstrates an ultra-long cycle life when cycled at a high current density of 1.5 A g$^{-1}$, exhibiting a capacity of 54 mAh·g$^1$ (FIG. 14E).

Figure 15A:
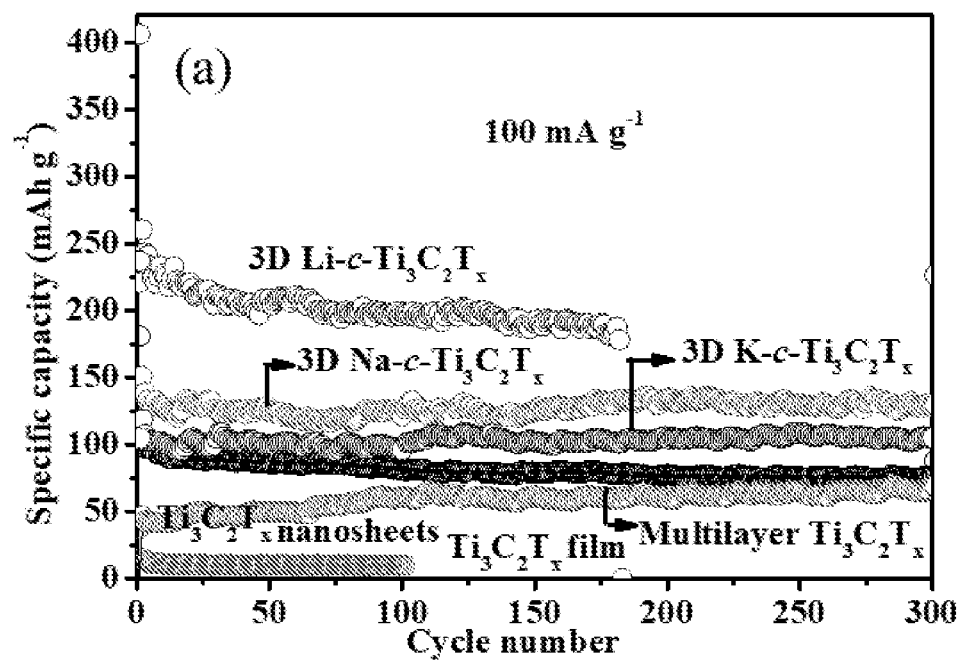
FIGS. 15A to 15C illustrates the electrochemical performance of Na-c-$Ti_3C_2T_x$, Li-c-$Ti_3C_2T_x$, K-c-$Ti_3C_2T_x$, $Ti_3C_2T_x$ multilayered particles and filtered film electrodes.
Figure 15B:
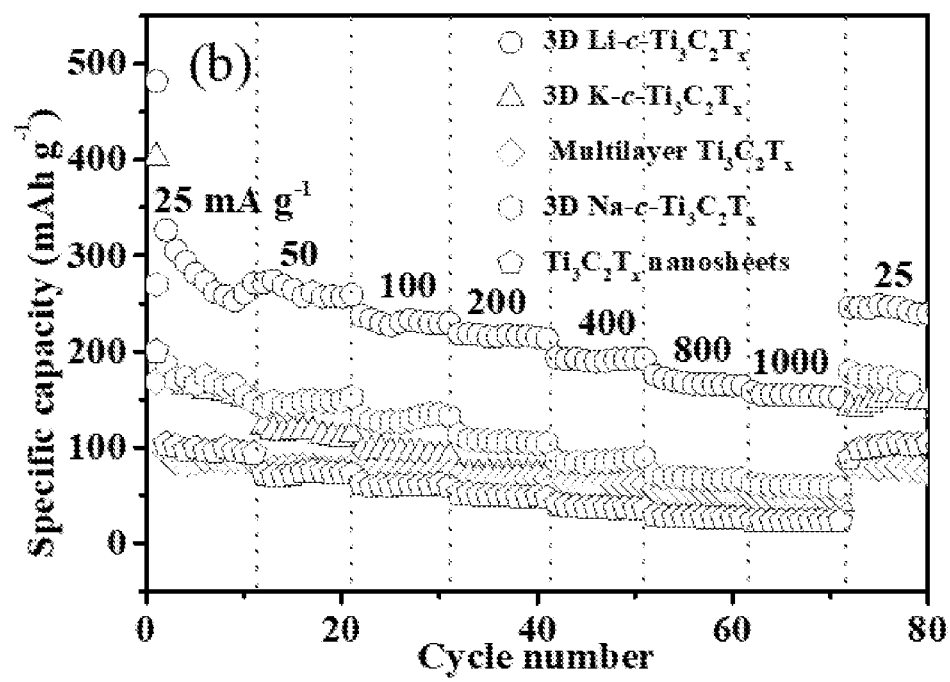

FIGS. 15A-B compare the electrochemical properties of K-c-Ti$_3$C$_2$T$_x$, Li-c-Ti$_3$C$_2$T$_x$, and Na-c-Ti$_3$C$_2$T$_x$ electrodes. Somewhat surprisingly, the Li-c-Ti$_3$C$_2$T$_x$-based anode exhibited the best performance by a substantial margin. At 1 A·g$^{-1}$, the capacity was ≈150 mAh·g$^{-1}$.

While not wishing to be bound by the correctness of any given theory, it is possible that the excellent capacity retention may be attributed to the pillaring effect of the fraction of electrochemically inactive Na$^+$ ions and the water molecules pre-trapped between the expanded Ti$_3$C$_2$T$_x$ layers in the Na-c-Ti$_3$C$_2$T$_x$ phase, suppressing expansion/contraction of the interlayer spacing caused by the reversible electrochemical ion cycling. It is unclear, however, why the Li-containing electrodes were the best. It is tempting to ascribe the differences to the smaller ionic radius of Li. And while that may be partially correct, it is worth noting out that when the d spacings are compared the inescapable conclusion is that that the cations are surrounded by a robust water hydration shell.

Figure 15C:
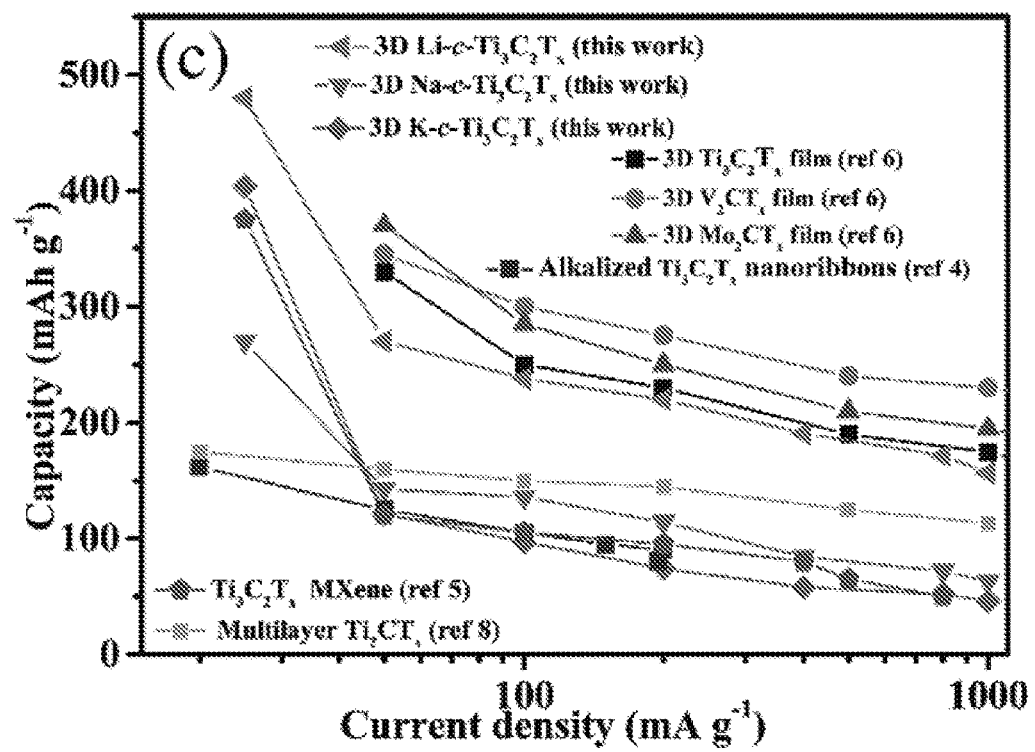

Lastly, FIG. 15C plots the capacity results reported to date for "pure" MXene. Pure here refers to MXene electrodes made without the use of spacers such as carbon nanotubes. Based on the results plotted in FIG. 15C, it is clear that these Li-c-Ti$_3$C$_2$T$_x$ rates quite well compared to other reports in the literature.

In this work the flakes were washed with ethanol several times. This was done when it was discovered that if water is used, the crumpled flakes had a tendency to de-flocculate and re-form a colloidal solution. However, after the ethanol flakes were dried, they became more stable with the tendency to de-flocculate suppressed. The long cycle stabilities of our electrodes, however, indicate that this was not a problem at least in this application.

TABLE 4A

Comparison of the capacity of 3D Na—c-Ti$_3$C$_2$T$_x$
in this work with those of other reported Ti$_3$C$_2$T$_x$
or other MXene materials as anodes for SIBs.

| Materials | Capacity [mAh g$^-$] | Current density [mA g$^{-1}$] | Cycle number | Year | Ref. |
|---|---|---|---|---|---|
| 3D Na—c-Ti$_3$C$_2$T$_x$ | 151 | 25 | 10 | | |
| | 130 | 100 | 500 | | |
| | 54 | 1500 | 1000 | | |
| 3D Li—c-Ti$_3$C$_2$T$_x$ | 200 | 100 | 100 | This work | |
| | 167 | 100 | 300 | | |
| 3D K—c-Ti$_3$C$_2$T$_x$ | 100 | 100 | 100 | | |
| | 105 | 100 | 300 | | |
| Multilayer Ti$_3$C$_2$T$_3$ | 79 | 100 | 120 | 2014 | 1 |
| Na$^+$ insertion multilayer Ti$_3$C$_2$T$_x$ | 100 | 20 | 100 | 2016 | 2 |
| Alkalized Ti$_3$C$_2$T$_x$ nanoribbons | 113 | 50 | 200 | 2017 | 3 |
| | 53 | 200 | 500 | | |
| Ti$_3$C$_2$T$_x$ MXene | 100 | 50 | 200 | 2015 | 4 |
| | 68.3 | 200 | 1000 | | |
| Hollow Ti$_3$C$_2$T$_x$ spheres | 210 | 500 | 1000 | 2017 | 5 |
| Hollow Mo$_2$CT$_x$ spheres | 210 | 500 | 1000 | | |
| Multilayer V$_2$CT$_x$ | 75 | 30 | 50 | 2015 | 6 |
| | 67 | 30 | 100 | | |
| Ti$_2$CT$_x$ | 143 | 20 | 100 | 2015 | 7 |

TABLE 4B

Comparison of $d_{c/2}$ values in Å, for 3D Na—c-$Ti_3C_2T_x$ measured in this work and those reported cations intercalated $Ti_3C_2T_x$ MXene.

| Materials | c-LP (Å) | Ref. |
|---|---|---|
| 3D Na—c-$Ti_3C_2T_x$ | 15.5 | This work |
| $Ti_3C_2$ MXene nanoribbons | 12.5 | 3 |
| Cations intercalated MXene with | | |
| KOH | 10.15 | 8 |
| $NH_4OH$ | 12.7 | 8 |
| $Ti_2CT_x$ | 10.1 | 7 |
| $Ti_3C_2T_x$ treated with | | |
| Hydrazine monohydrate | 12.74 | 9 |
| Hydrazine monohydrate in DMF | 13.4 | 9 |
| MXene $Ti_3C_2T_x$ in a nonaqueous $Na^+$ electrolyte | 12.5 | 2 |

REFERENCES (1) Xie, Y.; Dall'Agnese Y.; Naguib, M.; Gogotsi, Y.; Barsoum, M. W.; Zhuang, H. L.; Kent, P. R. C. *ACS nano* 2014, 8, 9606-9615.
(2) Kajiyama, S.; Szabova, L.; Sodeyama, K.; Iinuma, H.; Morita, R.; Gotoh, K.; Tateyama, Y.; Okubo, M.; Yamada, A. *ACS Nano* 2016, 10, 3334-3341.
(3) Lian, P.; Dong, Y.; Wu, Z. S.; Zheng, S.; Wang, X.; Sen, W.; Sun, C.; Qin, J.; Shi, X.; Bao, X. *Nano Energy* 2017, 40, 1-8.
(4) Wang, X.; Shen, X.; Gao, Y.; Wang, Z.; Yu, R.; Chen, L. *J. Am. Chem. Soc.* 2015, 137, 2715-2721.
(5) Zhao, M. Q.; Xie, X.; Ren, C. E.; Makaryan, T.; Anasori, B.; Wang, G.; Gogotsi, Y. *Adv. Mater.* 2017, 10.1002/adma.201702410.
(6) Dall'Agnese, Y.; Taberna, P. L.; Gogotsi, Y.; Simon, P. *J. Phys. Chem. Lett.* 2015, 6, 2305-2309.
(7) Wang, X.; Kajiyama, S.; Iinuma, H.; Hosono, E.; Oro, S.; Moriguchi, I.; Okubo, M.; Yamada, A. *Nat. Commun.* 2015, 6, 6544.
(8) Maria R. Lukatskaya, O. M., Chang E. Ren, Yohan Dall'Agnese, Patrick Rozier, Pierre Louis Taberna, Michael Naguib, Patrice Simon, Michel W. Barsoum, Yury Gogotsi. *Science* 2013, (341), 1502-1505.
(9) Mashtalir, O.; Naguib, M.; Mochalin, V. N.; Dall'Agnese, Y.; Heon, M.; Barsoum, M. W.; Gogotsi, Y. *Nat. Commun.* 2013, 4, 1716.

Example 4. Mesoporous MXene Powders Synthesized by Salt Induced Crumpling

Example 4.1. Introduction. Herein, the stabilities of aqueous $Ti_3C_2T_x$ (MXene) colloidal suspensions were studied as a function of pH and sodium chloride concentrations using zeta potential and dynamic light scattering measurements. Complete sedimentation was observed when the pH was changed to 5 or 10. In the low pH regime, protons saturate the surface functional groups, rendering the zeta potential less negative that, in turn, leads to aggregation. In the high pH regime, the zeta potential remained constant up to a pH of almost 12. As the molarity of NaCl increases from nil to 0.04 the zeta potential goes from −35 mV to −22.5 mV. At a molarity of 0.02, sedimentation was observed. When the pH or NaCl concentration is high, sedimentation occurred, presumably, because of a reduction in the double layer thickness. In all cases, the sediment was comprised of crumpled $Ti_3C_2T_z$ flakes. After adding charged nanoparticles to the colloidal suspension, at neutral pH, subsequent transmission electron microscope micrographs showed that the negative gold nanoparticles preferred the edges, while the positive ones preferred the surfaces. The charge differences between the edges and faces open opportunities for direct edge or face specific organic functionalizations, similar to work done on other 2D materials.

The previous examples showed that the addition of HCl, or alkali metal hydroxides, such as NaOH, not only resulted in the flocculation of $Ti_3C_2T_x$ colloid suspensions, but, as importantly, the flocculation, after drying, resulted in a mesoporous interconnected network of crumpled MXene sheets. Another important result was that the cations of the base used for flocculation intercalated between MXene sheets. This method of creating crumpled MXenes ws rapid, facile and showed significantly higher capacity as anodes in Na-ion batteries compared to vacuum filtered films or multi-layered MXene powders. One of the motivations for this work was to try and understand the aggregation mechanisms that leads to complete flocculation. To that effect we systematically study the stabilities of $Ti_3C_2T_x$ colloidal suspensions at various pHs and NaCl concentrations.

Example 4.2. Materials and Methods

Example 4.2.1 Sample preparation: The $Ti_3AlC_2$ powders were synthesized by mixing titanium carbide (Alfa Aesar, 99.5% 2 microns), aluminium (Alfa Aesar, 99.5%, 325 mesh), and titanium (Alfa Aesar, 99.5%, 325 mesh), powders in a molar ratio of 2:1.05:1, respectively. The mixed powders were ball milled at 100 rpm for 24 h and then heated under argon, Ar, flow at 1350° C. for 2 h. The heating and cooling rates were set at 5° C./min. The resulting loosely sintered blocks were ground using a milling bit on a drill press. The milled powders were passed through a 400 mesh (particle size <38 μm) sieve for further experiments.

The $Ti_3AlC_2$ powder was etched in a LiF and HCl solution. First, 1 g of LiF (Alfa Aesar, 99.5%, 325 mesh) was dissolved in 10 mL of 12 M HCl (Fisher Scientific), after which 1 g of the $Ti_3AlC_2$ powder was slowly added to the solution. The latter was stirred for 24 h at 35° C. and 300 rpm, and the slurry was later transferred into a 50 mL centrifuge tube and DI water was added to completely fill the remaining volume. It was then centrifuged at 3500 rpm/2300 rcf for 2 min. and the resulting clear supernatant was discarded. This washing was repeated several times until the pH of the solution was ≈7, at which point deionized, DI, water was added to the resulting $Ti_3C_2T_x$ "clay" and the mixture sonicated under bubbling Ar flow for 1 h. To avoid oxidation, the bath temperature was kept below 20° C. using ice. The solution was then centrifuged for 1 h at 5000 rpm/4700 rcf and the supernatant was pipetted off for further use. The solid content of the supernatant was determined by vacuum filtering a known solution volume and measuring the weight of the resulting free standing MXene film upon drying in a vacuum oven at 100° C. overnight. These films will henceforth be referred to as filtered films.

For all electrophoretic measurements, the colloidal suspension was diluted with DI water to a concentration of ≈1 mg/mL, while maintaining a pH of ≈7. To study the sedimentation characteristics, the pH was slowly reduced by adding drops of 1 M HCl or slowly increased by adding drops of 1M NaOH (Aldrich, 97 wt. %), or in case of salts a 0.2 M NaCl (Aldrich, >99%) solution was used.

In order to obtain X-Ray diffraction, XRD, patterns of the powders, image them in the scanning electron microscope, SEM, and carry out electron dispersive spectroscopy, EDS, analysis, excess NaOH and HCl from the sedimented MXene powder was removed as follows: the powders were first washed 5 times with DI water, followed by 5 washes with ethanol, EtOH, and then left overnight in vacuum and stored for further analysis. The samples treated with NaOH will henceforth be referred to as NaOH-$Ti_3C_2T_x$; those treated with HCl as HCl—$Ti_3C_2T_x$.

In another set of experiments, an aqueous 0.5 M NaCl solution was prepared and added to the colloid suspension until all the flakes flocculated and later sedimented at the bottom. This was followed by a centrifugation for 10 mins at 5000 rpm/4700 rcf to collect the sediments. After centrifuging the clear supernatant water was discarded and 40 mL of 200 proof EtOH was added to the centrifuge tube, and the mixture thoroughly shaken for 5 mins. This was followed by a centrifugation at 5000 rpm/4700 rcf for 10 mins and the clear supernatant EtOH was discarded. This EtOH washing step was repeated 10 more times (along with 5 mins of shaking in the added EtOH between every wash) after which the sedimented powders were vacuum dried overnight and stored for further characterization. The samples treated with NaCl will henceforth be referred as NaCl—$Ti_3C_2T_z$.

EDS measurement showed some fluorine (—F terminations) loss upon treatment with NaOH. To determine whether this loss was to due to the formation of fluoride salts or simply due to an exchange with hydroxyls in solution, one part of the sedimented powders, obtained by the addition of NaOH, was washed with EtOH only, instead of water, and then dried. Since in general, fluoride salts have higher solubilities in water than $EtOH^{34,35}$ the use of the latter, increased the chances that any fluoride salts formed are not washed away.

In an attempt to better understand the nature of the charges present on the MXene surfaces/edges, colloidal suspensions of gold, Au, nanoparticles, NPs, were mixed with a colloidal suspension of MXenes. Here, 2 mL of negatively charged Au-NPs, (10 nm diameter, citrate stabilized, nanoComposix, San Diego, USA) colloidal suspension, at a concentration of 0.054 mg/mL, was added to 50 mL of a $Ti_3C_2T_z$ suspension with a concentration of 1 mg/mL at a pH of ≈7. After briefly shaking the mixture, a few drops were immediately dropped on a lacy carbon TEM grid (Cu-400LC, Pacific Grid-Tech) and dried under vacuum. A similar experiment using the same concentration and volume of colloidal suspensions was also carried out but with positively charged Au NPs colloid (10 nm diameter, polyethylenimine functionalized, nanoComposix, San Diego, USA).

Example 4.2.2 Characterization: XRD patterns were recorded using a diffractometer (Rigaku Smart Lab, Tokyo, Japan) using Cu $K_\alpha$ radiation (40 kV and 30 mA) with a step size of 0.02° and dwell time of 1 s, in the 3-65° 2θ range. A SEM (Zeiss Supra 50VP, Germany) was used to examine the morphology of the samples. EDS (Oxford Instruments, Abingdon, UK) was used to quantify the elements present, the accelerating voltage used was 10 kV and 5 spots were randomly chosen over each sample and the results averaged.

To analyse the morphology and distribution of the as-dispersed Au NPs on MXene flakes, TEM (JEOL 2100 $LaB_6$, Tokyo, Japan) was used in bright field mode with a high-resolution objective-lens pole piece (GATAN Orius SC1000 CCD camera, Pleasanton, USA). The accelerating voltage was set to 200 kV.

A Zetasizer (nano ZS, Malvern Panalytical, Malvern, UK) was used for the electrophoretic mobility measurements and the Smoluchowski equation was used to convert the electrophoretic mobility values to zeta potentials, $ς^{36}$. The hydrodynamic diameter, $d_H$, was also measured on the same machine using DLS. Zeta potential measurements and size measurements were repeated 3 times at each pH or salt concentration and averaged. A titrator (MPT-2 Autotitrator) was used to in situ add volumes of titrant to change the pH (0.1 M HCl or 0.1 M NaOH) or salt (0.2 M NaCl) concentrations. Between each electrolyte concentration change, the mixture was allowed to equilibrate for 5 mins. before measuring ς and $d_H$.

Example 4.2.3. Results

Figure 16A:
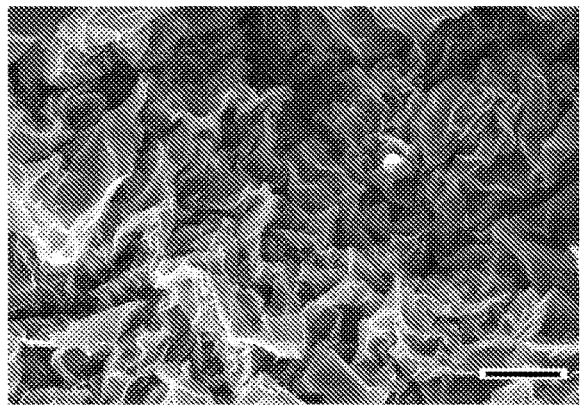
FIGS. 16A to 16C are SEM micrographs of HCl—$Ti_3C_2T_x$ (FIG. 16A); NaOH-$Ti_3C_2T_x$ (FIG. 16B); and NaCl—$Ti_3C_2T_x$ (FIG. 16C); crumpled powders. The scale bar=5 μm
Figure 16B:
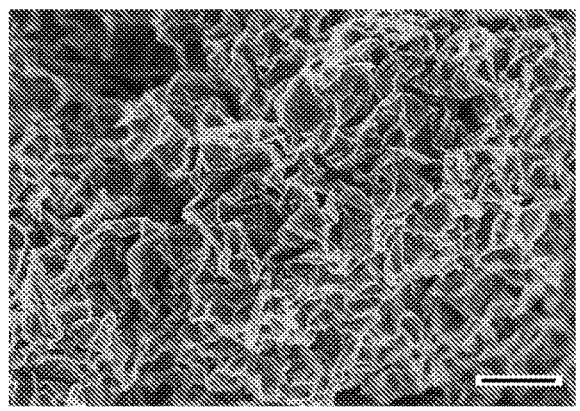
Figure 16C:
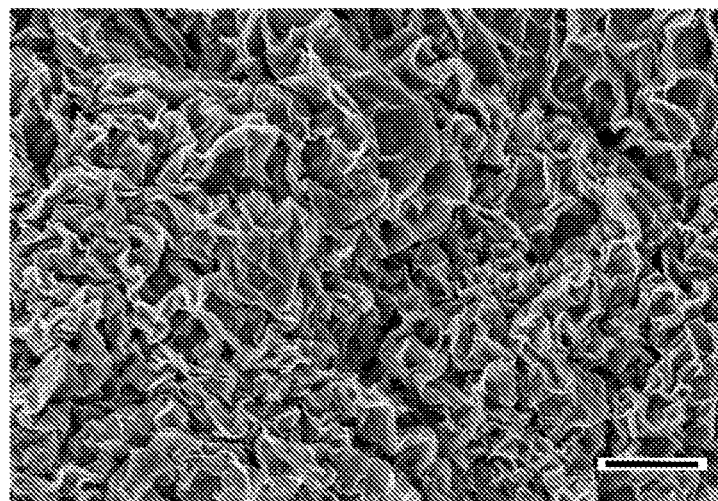
Figure 16D:
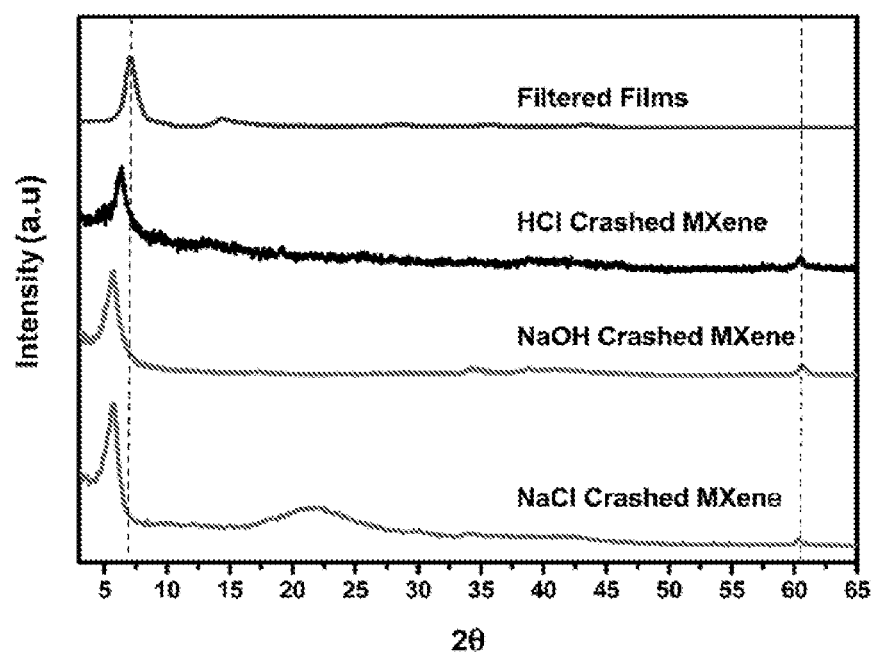
FIG. 16D provides corresponding XRD patterns for the samples of FIGS. 16A-16C.

Example 4.2.3.1 Effects of pH: Typical SEM micrographs of the HCl—$Ti_3C_2T_z$ and NaOH-$Ti_3C_2T_z$ crumpled powders—shown in FIGS. 16A&B respectively—are identical to those shown in previous work. Those of the NaCl—$Ti_3C_2T_x$ powders are shown in FIG. 16C. The corresponding XRD patterns are shown in FIG. 16D. For the filtered films, one strong peak corresponding to the 002 planes at 7.1° 2θ is observed. For the HCl—$Ti_3C_2T_z$, NaOH-$Ti_3C_2T_x$ and NaCl—$Ti_3C_2T_x$ samples the 002 peaks are located at 6.3°, 5.6° and 5.7°, respectively. Also a peak at ≈61° that corresponds to the (110) plane is observed for all patterns except in those of the filtered films.

TEM images (FIG. 17A-C) of individual sheets obtained from the colloidal suspension of $Ti_3C_2T_x$ flakes and negatively charged Au NPs clearly showed that the majority of Au NPs were aligned at, or near, the edges. The Au NPs marked by (yellow) arrows were clearly on, or near, the edges of the MXene sheets. And while some of the Au NPs did not at first sight appear to be located at the edges, careful observation of FIG. 17A, showed that indeed they were. For example, the three gold NPs marked with (red) arrows in the right-hand top corner were aligned near the edge of a MXene sheet lying just underneath them. The same is true for the two Au NPs in FIG. 17B, again denoted by (red) arrows, that seemed to lie directly in the middle of the sheet, but were actually on the edge of a MXene sheet underneath them. The alignment of Au NPs at the edges was most evident in FIG. 17C. Not surprisingly, when the starting Au NPs were positive, their distribution (FIGS. 17D-E) was much more uniform, and quite different, than when they were negative. In this case a more or less uniform distribution was observed.

FIG. 18A plots the dependencies of ς (left y-axis) and $d_H$ (right y-axis) on pH. The fact that at pH ≈7, ς=−53 mV (FIG. 18A) explained why the colloid suspension was stable. Both ς and $d_H$ were asymmetric around neutral pH. Upon the addition of HCl, ς increased with decreasing pH ($ς_{pH=7}$=−53 mV, $ς_{pH=2}$=0 mV). Upon increasing the pH, and up to a pH of ≈10, ς was more or less constant, after which it increased slightly ($ς_{pH=7}$=−53 mV, $ς_{pH=12}$=−45 mV).

From DLS, the average $d_H$ was calculated to be around 500 nm at pH ≈7 (FIGS. 18A-B). This size range was in good agreement with literature values of MXene sheets synthesised by similar methods. This peak around 500 nm shifted towards higher values with decreasing pH. As importantly, new peaks started to appear at higher values (>6000 nm, FIG. 18D) indicating the formation of quite large aggregates. FIG. 18B also showed that an increasing number of larger aggregates (>6000 nm) started to form up to pH 10. Above pH 10, the intensity of these large aggregates started to decrease, presumably due to the settling of bigger flocs and/or disaggregation or the breaking up of larger flocks in smaller ones. This trend was also seen from the average $d_H$ values in FIG. 18A, where the aggregate size increased slightly, up to pH 10 before it started decreasing thereafter.

With increasing pH, peaks—that were absent at pH<7—started to appear below 100 nm (FIG. 18C).

According to EDS results (Table 5) the amounts of fluorine in the NaOH—$Ti_3C_2T_z$ powders were lower than those in the HCl—$Ti_3C_2T_x$, NaCl—$Ti_3C_2T_x$ or filtered film samples. The oxygen content, on the other hand, was higher in NaOH—$Ti_3C_2T_z$ powders compared to the others. The NaOH—$Ti_3C_2T_z$ and NaCl treated samples also contained Na.

TABLE 5

EDS results—normalized to 3 Ti atoms—for the HCl—$Ti_3C_2T_x$, NaOH—$Ti_3C_2T_x$, NaCl—$Ti_3C_2T_x$ crumpled powders and filtered film samples.

| Element | HCl—$Ti_3C_2T_x$ | NaOH—$Ti_3C_2T_x$ | Filtered films | NaCl—$Ti_3C_2T_x$ |
|---|---|---|---|---|
| Ti | 3 | 3 | 3 | 3 |
| O | 1.7 ± 0.2 | 2.5 ± 0.1 | 1.5 ± 0.15 | 1 ± 0.15 |
| F | 1.3 ± 0.1 | 0.9 ± 0.05 | 1.5 ± 0.1 | 1.5 ± 0.2 |
| Cl | 0.46 ± 0 | 0.4 ± 0 | 0.4 ± 0 | 0.3 ± 0.05 |
| Na | — | 0.2 ± 0.05 | — | 0.15 ± 0.05 |

Figure 19A:
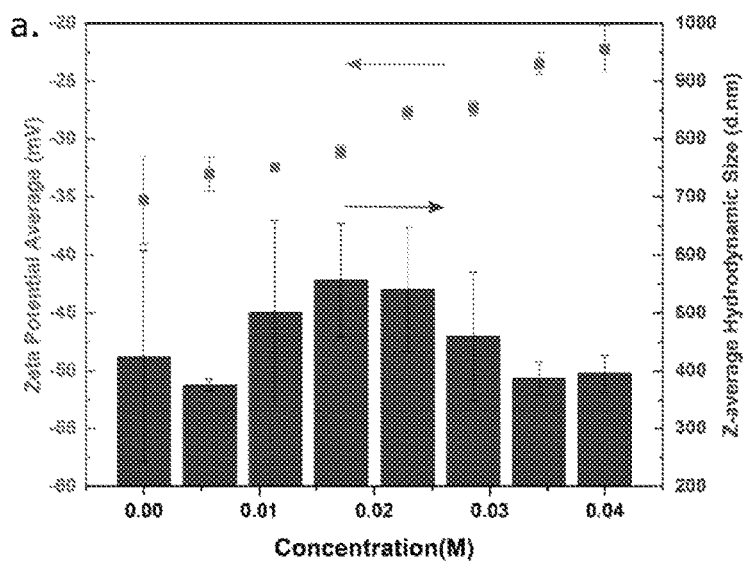
FIG. 19A shows zeta potential (left y-axis) and average dH (right y-axis) vs. NaCl molarity.

Example 4.2.3.2 Effects of NaCl: As shown in FIG. 19A, that plots the changes in ç (left axis) and $d_H$ (right axis) with NaCl concentration, ç increased monotonically ($ç_{0M}$=−35 mV to $ç_{0.04M}$=−22 mV) with increasing electrolyte concentration and $d_H$ went through a small maximum at a concentration of ≈0.02 M. As the salt was added, the pH was found not to change substantially.

Figure 19B:
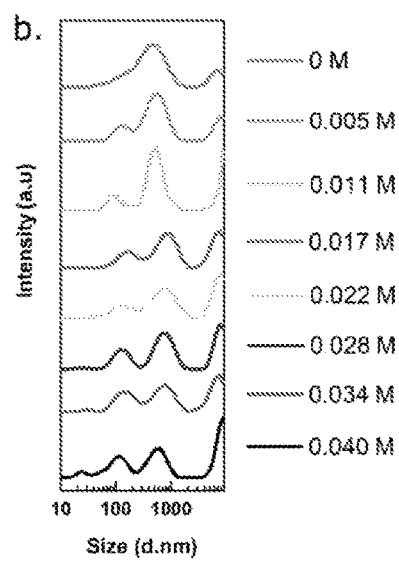
FIG. 19B shows intensity of scattered light vs. size distribution between 10 and 9000 nm at various NaCl salt concentrations values

As shown in the size distribution plot of FIG. 19B, in the absence of NaCl, the major peak was observed around 500 nm. The minor peak at ~8000 nm was probably due to some impurities like dust or multilayer MXene stacks not removed during centrifugation. This was confirmed by the absence of such peak in DLS data at neutral pH as seen in FIG. 18B where the light scattering experiments were performed on an equivalent sample. It was also confirmed by TEM observations of the sample that showed predominantly single to few layers of MXene flakes. The data in FIG. 19A being from the same batch of MXene solution shows that with increasing NaCl concentrations, a second peak started to appear around 100-200 nm. Further, the intensity ratio of the peak at 500 nm to the peak at 100 nm decreased with increasing NaCl concentration. Meanwhile, with increasing salt concentration the intensity ratio of the peak at 500 nm to that of 8000 nm started to decrease, meaning that larger aggregates were forming.

Example 3.4.2.4. Discussion: The addition of an acid, a base or a salt to a colloidal suspension of $Ti_3C_2T_x$ flakes induced an aggregation of the flakes that eventually led to their sedimentation, the resulting sediment being crumpled. Even at neutral pH, the addition of NaCl induced crumpling. Although the MXenes, flocculated with HCl, NaOH and NaCl, have the same morphology, the DLS and ç measurements suggest different mechanisms for their aggregation.

Charge of MXenes flakes in water at pH neutral: differences between edges and faces. It was previously believed that bare $Ti_3C_2$ blocks are positively charged because there are 3 Ti atoms with a +2.4 charge and only 2 carbon atoms with a charge of ~−2.4. In the simplest configuration, the latter is neutralized by OH terminations. When such flakes are placed in neutral water, deprotonation of some hydroxyl groups results in the development of negative charges on the flakes, resulting in the following equilibrium considering a MXenes flakes with only OH terminations:

$$Ti_3C_2(OH)_2 + zH_2O \leftrightarrow Ti_3C_2(OH)_{2-z}(O^-)_z + zH_3O^+ \quad (1)$$

The reaction is simplified by the assumption that the flakes only had OH terminations. In reality the terminations include F and thus a proper appropriate reaction is given here.

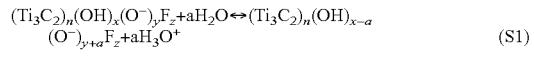

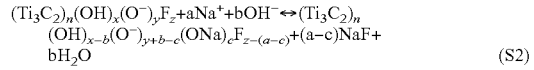

During etching and sonication it is assumed that some of the Ti bonds at the edges remain unsatisfied and are thus positively charged. This is in agreement with the TEM observations: the placement of negatively charged Au NPs around the edges in FIGS. 17A-C and the placement of the positively charged NPs on the surface of the MXene sheets in FIGS. 17D-E indirectly confirmed that the MXene edges were indeed positively charged compared to the surfaces that have long been established to be negatively charged. The number/concentration of the negatively charged Au NPs attached to the MXene flakes' edges (7±3 Au NPs/MXene sheet) (FIGS. 17A-C) was significantly lower than the positively charged Au NPs attached to their surfaces (300±70 Au NPs/MXene sheet) (FIGS. 17D-E). This difference reflected the paucity of edges compared to surfaces.

Aggregation Mechanism at Low pH

With decreasing pH, the equilibrium in reaction (1) shifts towards the left. Such equilibria re-positioning is analogous to similar modes seen in kaolinite clays. As in clays, the edges are shown here to be positively charged at neutral pH. It is also likely that the edges remain positively charged in acidic environments as the H+ ions do not interact with the positive edges because of Columbic repulsion, while the Cl− ions do not completely absorb on the edges due their larger hydration radii ($r_{Cl^-}$=0.175 nm) and lower electronegativity compared to the OH-anions.

FIGS. 18B&D show that large aggregates start forming around pH 4, suggesting lower stability of MXene colloids in acidic media. Even though ç was negative up to pH 2.5, aggregation commenced between pH 5 and 3, as evidenced by the fact that centrifugation in that pH range resulted in clear supernatants. This is possibly due to the fact that the electrostatic repulsion helped to maintain colloidal stability, while gravity caused sedimentation. As the flocs grew larger the electrostatic forces were insufficient to balance the gravitational pull which ultimately led to complete sedimentation.

As the pH decreased further, the electrostatic repulsion decreased, resulting mainly in edge-face interaction (FIG. 18A, left inset). This was reflected in the DLS data, which showed aggregates forming with a size of 6000 nm and above (FIGS. 18B&D), which was consistent with a more open structure formed during edge-face interactions. No signal was observed below 100 nm indicating the lack of substantial lateral stacking in the 00/direction.

Aggregation Mechanism at High pH

When the pH was increased, the following, again considering only —OH terminations, reaction is postulated to occur:

$$Ti_3C_2(OH)_2 + zOH^- \leftrightarrow Ti_3C_2(OH)_{2-z}(O^-)_z + zH_2O \quad (2)$$

A more detailed reaction is provided above as S2. If this were the only reaction occurring, then increasing the pH would have rendered the surface more negative. However, as the pH increased from 7 to 10, no significant changes in ç were observed. It was thus believed the $Na^+$ cations adsorbed onto the $Ti_3C_2T_x$ surfaces most likely at the —O-termination sites and possibly also partially onto —OH and —F sites, in such a way as to maintain the zeta potential more or less constant.

Because of their smaller size ($r_{OH^-}$=0.11 nm) the present inventors believe that, in the high pH range, the hydroxyls neutralized the positive edges, which would greatly reduce the probability of face-to-edge interactions. On the other hands, the face-to-face interactions became more likely. This was confirmed by the appearance of new peaks below 100 nm indicating lateral stacking in c-direction. The zeta potential increased at pH 12, possibly due to passivation of all the positive edge sites by $OH^-$ ions, after which the $Na^+$ ions started to reduce the Debye-Huckle screening lengths both at the edges and faces of the MXene sheet.

Another phenomenon observed upon the addition of NaOH was the loss of F and a gain of O in the NaOH—$Ti_3C_2T_x$ samples compared to the filtered films, HCl—$Ti_3C_2T_x$ and NaCl—$Ti_3C_2T_x$ samples (see Table 4). The suspension sedimented by NaOH, and then only washed with ethanol was characterized by XRD. The NaF solubility in ethanol being lower than in water, the presence of NaF in the XRD pattern indicated that some of the $Na^+$ ions react with the F-terminations to form NaF.

Effect of Salt on Aggregation Mechanism

It is likely that with increasing salt concentration, the Deybe-Huckle length decreases, leading eventually to flocculation. Indirect support for this conjecture is the constancy of the pH at ≈7 with NaCl additions. The inventors believe that the aggregation mechanism here is face-to-face stacking of MXene sheets because, the secondary peak—around 100 nm—formed after the addition of salt around was significantly stronger than in the size distribution curves obtained at high pH (FIG. 18C), indicating a higher degree of stacking in the lateral direction.

Each patent, patent application, and publication cited or described in this document is hereby incorporated herein by reference, each in its entirety, for all purposes, or at least for the subject matter in the context in which it was cited.

What is claimed:

1. An electrochemical device comprising a crumpled MXene or a composition comprising a crumpled MXene, wherein the crumpled MXene comprises a two dimensional crystalline transition metal carbide, nitride, or carbonitride arranged in a three-dimensional interpenetrating mesoporous structure, the electrochemical device comprising an electrode, an energy storage device, a gas storage device, or a gas sensing device.

2. The electrochemical device of claim 1, wherein the electrochemical device is an electrode.

3. The electrochemical device of claim 1, wherein the electrochemical device is an energy storage device.

4. The electrochemical device of claim 3, wherein the energy storage device is an ion storage battery.

5. The electrochemical device of claim 4, wherein the ion storage battery is a lithium ion storage battery.

6. The electrochemical device of claim 4, wherein the ion storage battery is a sodium ion storage battery.

7. The electrochemical device of claim 3, wherein the energy storage device is a supercapacitor.

8. The electrochemical device of claim 1, wherein the electrochemical device is a gas storage device.

9. The electrochemical device of claim 1, wherein the electrochemical device is a gas sensing device.

10. The electrochemical device of claim 1, wherein the gas sensing device comprises a transition metal cation or an organic dye salt cation.

11. A composite, comprising:
    (a) a crumpled MXene or a composition comprising a crumpled MXene having surface functionalities, wherein the crumpled MXene comprises a two dimensional crystalline transition metal carbide, nitride, or carbonitride arranged in a three-dimensional interpenetrating mesoporous structure; and
    (b) a polymer or copolymer, the polymer or copolymer bonding to the surface functionalities of the crumples MXene.

12. The composite of claim 11, wherein the polymer or copolymer comprises oxygen-containing functional groups.

13. The composite of claim 12, wherein the oxygen-containing functional groups comprise any one or more of —OH, —COO, and =O.

14. The composite of claim 11, wherein the polymer or copolymer comprises and amine functional groups.

15. The composite of claim 11, wherein the polymer or copolymer and crumpled MXenes are present in a weight ratio range of from about 1:99 to about 98:2.

16. The composite of claim 15, wherein the polymer comprises a polysaccharide.

17. The composite of claim 16, wherein the polysaccharide comprises sodium alginate.

18. A crumpled MXene or a composition comprising a crumpled MXene, wherein the crumpled MXene comprises a two dimensional crystalline transition metal carbide, nitride, or carbonitride arranged in a three-dimensional interpenetrating mesoporous structure, the crumpled MXene or a composition comprising a crumpled MXene
    (a) comprises a structure having irregular pores with diameters between 100 and 400 nm,
    (b) a surface area in the range of from about 25 to about 75 $m^2/g$.

19. The crumpled MXene or a composition comprising a crumpled MXene of claim 18, wherein the crumpled MXene or a composition comprising a crumpled MXene comprises a structure having a surface area in the range of from about 25 to about 75 $m^2/g$.

20. The crumpled MXene or a composition comprising a crumpled MXene of claim 18, wherein the crumpled MXene or a composition comprising a crumpled MXene comprises a structure having irregular pores with diameters between 100 and 400 nm.

* * * * *